(12) United States Patent
Singer et al.

(10) Patent No.: US 7,620,739 B2
(45) Date of Patent: *Nov. 17, 2009

(54) DYNAMIC SYSTEM CONTROL METHOD

(75) Inventors: Neil Singer, Armonk, NY (US); Mark Tanquary, Needham, MA (US); Kenneth Pasch, North Eastham, MA (US)

(73) Assignee: Convolve, Inc., New York, NY (US)

( * ) Notice: Subject to any disclaimer, the term of this patent is extended or adjusted under 35 U.S.C. 154(b) by 1973 days.

This patent is subject to a terminal disclaimer.

(21) Appl. No.: 10/267,332

(22) Filed: Oct. 9, 2002

(65) Prior Publication Data

US 2003/0147172 A1    Aug. 7, 2003

Related U.S. Application Data

(63) Continuation of application No. 09/873,464, filed on Jun. 4, 2001, now Pat. No. 6,560,658, which is a continuation of application No. 09/262,781, filed on Mar. 4, 1999, now Pat. No. 6,314,473.

(51) Int. Cl.
*G11B 21/02* (2006.01)
*G06F 3/00* (2006.01)

(52) U.S. Cl. .................................. 710/1; 360/75; 710/5

(58) Field of Classification Search ...................... 710/5, 710/15; 360/31, 75, 69, 73.01, 78.06, 78.07; 369/75.1; 345/112, 348
See application file for complete search history.

(56) References Cited

U.S. PATENT DOCUMENTS

| | | | |
|---|---|---|---|
| 2,801,351 A | 7/1957 | Calvert et al | |
| 2,996,689 A | 8/1961 | Constant | |
| 3,660,744 A | 5/1972 | Plummer | |
| 3,960,043 A | 6/1976 | Brand | |
| 4,091,236 A | 5/1978 | Chen | |
| 4,195,265 A | 3/1980 | Vali | |
| 4,356,437 A | 10/1982 | Saito et al. | |
| 4,477,755 A | 10/1984 | Rickert | |
| 4,574,279 A | 3/1986 | Roberts | |
| 4,675,761 A | 6/1987 | Ashbee et al. | |

(Continued)

FOREIGN PATENT DOCUMENTS

EP     0308-062 A2     3/1989

(Continued)

OTHER PUBLICATIONS

"High-Speed/Low-Power Selectable Optical File", 2244 Research Disclosure, Jul. 1990, No. 315.*

(Continued)

*Primary Examiner*—K. Wong
(74) *Attorney, Agent, or Firm*—Oblon, Spivak, McClelland, Maier & Neustadt, L.L.P.

(57) ABSTRACT

Techniques are provided herein for reducing vibrations in various modes of a dynamic system. One such technique comprises incorporating vibration limiting and sensitivity constraints into a partial fraction expansion equation model of the system so as to reduce vibrations to specific levels. Another technique comprises shaping a command determined using the partial fraction expansion equation model to produce a desired output. The entire command may be shaped or only selected portions thereof which produce vibrations. Another technique involves commanding in current to produce saturation in voltage. By doing this, it is possible to command voltage switches. The times at which the switches occur can be set to reduce system vibrations. Other techniques are also provided. These include varying transient portions at the beginning, middle and/or end of a move and using Posicast inputs, among others.

2 Claims, 28 Drawing Sheets

U.S. PATENT DOCUMENTS

| | | | |
|---|---|---|---|
| 4,740,736 A * | 4/1988 | Sidman et al. | 318/608 |
| 4,796,112 A | 1/1989 | Mizukami et al. | |
| 4,873,646 A | 10/1989 | Stoops | |
| 4,879,643 A | 11/1989 | Chakravarty et al. | |
| 4,910,670 A * | 3/1990 | Smith et al. | 345/567 |
| 4,916,635 A | 4/1990 | Singer et al. | |
| 4,929,874 A | 5/1990 | Mizuno et al. | |
| 4,931,889 A | 6/1990 | Osafune | |
| 4,933,785 A | 6/1990 | Morehouse et al. | |
| 4,937,689 A | 6/1990 | Seaver et al. | |
| 4,937,758 A | 6/1990 | Hayden et al. | |
| 4,956,831 A | 9/1990 | Sarraf et al. | |
| 4,963,806 A | 10/1990 | Shinohara et al. | |
| 4,967,293 A | 10/1990 | Aruga et al. | |
| 4,991,129 A | 2/1991 | Swartz | |
| 5,032,776 A | 7/1991 | Garagnon | |
| 5,153,789 A | 10/1992 | Bernett et al. | |
| 5,210,726 A * | 5/1993 | Jackson et al. | 369/32 |
| 5,264,771 A | 11/1993 | Kawauchi | |
| 5,282,100 A * | 1/1994 | Tacklind et al. | 360/97.02 |
| 5,291,110 A | 3/1994 | Andrews, Jr. et al. | |
| 5,412,809 A * | 5/1995 | Tam et al. | 713/324 |
| 5,450,252 A | 9/1995 | Kanda | |
| 5,465,034 A * | 11/1995 | Andrews, Jr. et al. | 318/560 |
| 5,465,035 A | 11/1995 | Scaramuzzo et al. | |
| 5,475,545 A * | 12/1995 | Hampshire et al. | 360/78.06 |
| 5,490,601 A | 2/1996 | Heissat et al. | |
| 5,535,355 A | 7/1996 | Scales | |
| 5,638,267 A | 6/1997 | Singhose et al. | |
| 5,657,179 A * | 8/1997 | McKenzie | 360/78.06 |
| 5,668,680 A | 9/1997 | Tremaine | |
| 5,675,558 A * | 10/1997 | Katoh | 369/32 |
| 5,696,647 A | 12/1997 | Phan et al. | |
| 5,726,825 A | 3/1998 | Phan et al. | |
| 5,751,513 A | 5/1998 | Phan et al. | |
| 5,760,991 A | 6/1998 | Phan et al. | |
| 5,760,992 A | 6/1998 | Phan et al. | |
| 5,825,581 A * | 10/1998 | Morita et al. | 360/78.04 |
| 5,844,396 A * | 12/1998 | Iwabuchi et al. | 318/778 |
| 5,880,587 A | 3/1999 | Annis et al. | |
| 5,901,009 A | 5/1999 | Sri-Jayantha et al. | |
| 5,973,871 A * | 10/1999 | Dunn et al. | 360/69 |
| 5,982,570 A * | 11/1999 | Koizumi et al. | 360/69 |
| 5,986,426 A * | 11/1999 | Rowan | 318/599 |
| 5,988,411 A | 11/1999 | Singer et al. | |
| 6,011,373 A * | 1/2000 | McConnell et al. | 318/560 |
| 6,011,667 A * | 1/2000 | Dunn et al. | 360/69 |
| 6,038,096 A * | 3/2000 | Zhang et al. | 360/78.04 |
| 6,067,203 A | 5/2000 | Ottesen et al. | |
| 6,151,182 A * | 11/2000 | Koizumi et al. | 360/69 |
| 6,178,060 B1 * | 1/2001 | Liu | 360/78.07 |
| 6,229,779 B1 * | 5/2001 | Berry et al. | 720/655 |
| 6,256,163 B1 * | 7/2001 | Schmidt et al. | 360/78.09 |
| 6,256,731 B1 | 7/2001 | Hall et al. | |
| 6,268,845 B1 * | 7/2001 | Pariza et al. | 345/581 |
| 6,295,062 B1 * | 9/2001 | Tada et al. | 715/835 |
| 6,314,473 B1 * | 11/2001 | Singer et al. | 710/5 |
| 6,377,418 B1 | 4/2002 | Kagami et al. | |
| 6,381,087 B1 * | 4/2002 | Koizumi et al. | 360/69 |
| 6,476,994 B2 | 11/2002 | Koizumi et al. | |
| 6,563,658 B2 | 5/2003 | Koizumi et al. | |
| 6,624,964 B1 | 9/2003 | Pirzadeh | |
| 6,704,159 B2 | 3/2004 | Ding et al. | |
| 6,741,414 B1 | 5/2004 | Boyd et al. | |
| 6,757,481 B1 | 6/2004 | Nazarian et al. | |
| 6,865,048 B2 | 3/2005 | Koizumi et al. | |
| 6,876,168 B1 | 4/2005 | Luo et al. | |
| 6,985,316 B1 | 1/2006 | Liikanen et al. | |

FOREIGN PATENT DOCUMENTS

| | | |
|---|---|---|
| EP | 0041-407 A1 | 8/1991 |
| EP | 0543-654 A2 | 5/1993 |
| GB | 2303-732 A | 2/1997 |
| JP | H6-219790 | 9/1994 |
| JP | H6-125375 | 6/1995 |
| JP | H7-334950 | 12/1995 |
| WO | 00/03389 | 1/2000 |
| WO | WO 00/72314 | 11/2000 |

OTHER PUBLICATIONS

U.S. Appl. No. 60/076,951, filed Mar. 5, 1998 entitled "Creating Time-Optimal Commands for Linear Systems".

Article entitled "Fast Servo Bang-Bang Seek Control" by Hai T. Ho, 1997, IEEE.

Seagate ST406/ST412/ST419 Product Manual, Jan. 31, 1984.

Seagate ST506/412 OEM Manual.

Seagate ST4026/ST4038/ST4051 Product Manual, Feb. 5, 1987.

Seagate ST406/412/419 Service Manual, Oct. 17, 1983.

Seagate Technology Paper entitled: "Power Management" by T.Patwardhan, Jun. 1993.

Videotape: "No Sway Crane Controller".

Videotape: "Shaping Commands to Reduce System Vibration".

Article entitled "High-Speed/Low-Power Selectable Optical File", Research Disclosure (1990) Jul. No. 315, Emsworth, GB.

U.S. Appl. No. 90/008,354, filed Dec. 1, 2006, Singer, et al.

U.S. Appl. No. 90/010,251, filed Aug. 22, 2008, Singer, et al.

"ST 406/412/419 Service Manual," Seagate, Oct. 17, 1983.

"Information Technology—AT Attachment with Packet Interface Extension (ATA/ATAPI-4)," Working Draft, Revision 13, May 30, 1997, Ed. McLean, Peter T.

Leonard & Simon, "The Mother of all Windows® 95 Books," Addison Wesley 1996.

"How Input Shaping Works," Convolve, http://www/convolve.com/how.html, as archived by the Internet Archive as of Aug. 30, 1999, and viewable at http://web.archive.org/web/19990830063828/www.convolve.com/how.html.

Chapters 1, 2, 7, 11, 13, 16 and pages 91-93 of Modern Control Engineering by Ogata 1970.

Chapters 4, 11, 13 and 14 of Digital Control of Dynamic Systems by Franklin et al. 1998.

Chapters 4 and 5 of Computer Engineering Handbook by Chen et al.

Proposal for Acoustic Management in ATA Devices (2000) by Haines.

Part 4: Data Storage of How Computers Work by White (pp. 134-183).

AT Attachment with Packet Interface—6 (Part A and B).

F.L. Farrenkoph, "Optimal Open-Loop Maneuver Profiles for Flexible Spacecraft," J. Guidance and Control. vol. 2, No. 6, Nov.-Dec. 1980.

"Adaptive Proximate Time-Optimal Servomechanisms" (1987) by Workman, Exhibit 1011, filed in Interference No. 105,436.

Kelley, Henry J., "Guidance Theory and External Fields", IRE Transactions on Automatic Control, 1962.

Leonhard & Simon, "CD-Mom; The Mother of all Windows™ Books CD Version," Addison Wesley Publishing Company 1993.

Access.bus™ Specification Version 3.0, Sep. 1995.

Breakwell, John A., "Optimal Feedback Slewing of Flexible Spacecraft," J. Guidance and Control, vol. 4, No. 5, 1981.

Samuels, Ferdinand A., "Beyond the Second Order System in Track Flowing Servos", IEEE Transactions on Magnetics, vol. Mag-14, No. 4, Jul. 1978.

William H. Ray V., "The Reduction of Acoustic Noise Emissions from a Hard Disk Drive," Thesis, Master of Science in Electrical Engineering at the Massachusetts Institute of Technology, Jan. 26, 1994.

V. C. Shields and G. Cook, "Application of an approximate time delay to a Posicast control system," Oct. 1970. Int. J. Control, 1971, vol. 14, No. 4.

R.K. Oswald, "Design of a Disk File Head-Positioning Servo", IBM Journal of Research and Development, vol. 18, No. 6 Nov. 1974.
Commander, Robert D. and Taylor J. R., "Servo Design for an Eight Inch Disk File," IBM Disk Storage Technology, Feb. 1980.
Tallman, G. H. and Smith, O.J. M., "Analog Study of Dead-Beat Posicast Control", IRE, Transactions on Automatic Control, 1958.
Meckl, Peter H. and Seering, Warren P., "Reducing Residual Vibration in Systems with Time-Varying Resonances", 1987 IEEE International Conference on Robotics and Automation, vol. 3, 1987.
VESA, Video Electeronics Standards Association, "VBE/AI™ Standard; VESA Bios Extension/ Audio Interface (VBE/AI)," Version 1.0; adopted Feb. 11, 1994.
VESA, Video Electeronics Standards Association, "VbE/AF Standard; VESA Bios Extension/ Accelerator Funcations (VBE/AF)," Version 1.0; revision 0.7; adopted Aug. 18, 1996.
"Smart Drive/ Installation and Setup Manuel," Old No. M93103-Issue 6, New No. MSM000H, Jan. 15, 1996.
Innovation Technolgy Summary Report DOE/EM-0475, "Swing-Reduced Crane Control: Deactivation and Decommissioning Focus Area," prepared for U.S. Department of Energy, Office of Enviromental Management, Office of Science and Technology; Aug. 1999.
"ST4026, ST4038, ST4051 Product Manual," Seagate, Feb. 5, 1987, 36039-001, Revision A.
VESA, Video Electeronics Standards Association, "VBE/SCI™ Standard; VESA Bios Extension/ Serial Control Interface Standard (VBE/SCI)," Version 1.0, revision 2; adopted Jul. 2, 1997.
IBM TDB, R. S. Palmer, "Automatic Notch Frequency Control for Servo Stabilization", vol. 19, No. 10, Mar. 1977, pp. 3860-3862, IBM TDB, R. S. Palmer, Oscillating Notch Filter, vol. 19, No. 10, Mar. 1977.
Samuels, "Beyond the Second Order System in Track Following Servos," IEEE Transcations on Magnetics, vol. Mag.-14, No. 4, Jul. 1978, pp. 178-181.
Patwardhan, "Power Management," Seagate Technology Inc, 1993.
Singer et al., "An Input Shaping Controller Enabling Cranes to Move Without Sway," ANS Proceedings of the $7^{th}$ Topical Meeting on Robotics & Remote Systems, Apr. 27-May 1, 1997.
"ST 506/412 OEM Manuel," Seagate Technology, Apr. 1982.
Werner, Ronald A. And Cruz, Jose B. Jr., "Feedback Control Which Preserves Optimality for Systems with Unknown Parameters," IEEE Transactions on Automatic Control, vol. AC-13, No. 5, Dec. 1958.
Yamada, I., Nakagawa, M., "Reduction of Residual Vibrations in Positioning Control Mechanism," Journal of Vibration, Acoustics, Stress, and Reliability in Design, vol. 107, Jan. 1985.
Control Data Corporation, Cartridge Module Drive Hardware Maintenance Manual, 1979.
Control Data Corporation—Finch Disk Drive Model 9410 hardware Maintenance Manual, 1983.
Phillips & Nagle, "Digital control Systems Analysis and Design," Prentice Hall, Inc., 1984.
Franklin and Powell, "Digital Control," Addison Wesley Publishing Company 1980.
Franklin, Powell, and Enami-Naeini, "Feedback Control of Dynamic Systems," Addison Wesley Publishing Company, 1986.
C.J. Swigert, "Shaped Torque Techniques," 1980.
Seagate Technology, ST-406/412/419 Microwinchester, OEM Manuel, Jan. 31, 1984.
Ossia, "Discrete Polynomial Control" Thesis, University of Toronto, 1991.
Bryson and Ho, "Applied Optimal Control," Hemisphere Publishing Corporation, 1975.
Donald J. Gimpel "Signal Component Control: A Dissertation" Submitted to the Graduate School in Partial Fulfillment of the Requirements for the degree Doctor of Philosophy, Northwestern University Department of Electrical Engineering, Oct. 1952.
Evert S. Cooper, "Design of a Disk-File Reference-Velocity Generator," Sep. 1985, IEEE Transactions of Magnetics, vol. 5.
Gerald Cook, "Control of Flexible Structures Via Posicast," 1986, Dept. of Electrical & Computer Engineering, George Mason University, Fairfax, VA, IEEE.
George G. Gorbatenko, "Posicast Control by Delayed Gain," Feb. 1965, Control Engineering.

\* cited by examiner

DYNAMIC SYSTEM CONTROL METHOD

This application is a continuation of U.S. Ser. No. 09/873,464 filed Jun. 4, 2001, which is a continuation of U.S. Ser. No. 09/262,781 filed Mar. 4, 1999, now U.S. Pat. No. 6,314,473.

BACKGROUND OF THE INVENTION

1. Field of the Invention

The present invention is directed to altering inputs to, and generating feedforward signals for, a dynamic system so as to reduce unwanted vibrations in the system. The invention has particular utility in speeding up computer disk drives by reducing unwanted vibrations which, if unchecked, could lead to disk read/write errors or excessive noise.

2. Description of the Related Art

Movement in dynamic systems typically results in unwanted vibrations that are both mechanical and acoustic in nature. These vibrations can have a detrimental affect on the operation of such systems. One dynamic system that is particularly sensitive to unwanted vibrations is a computer disk drive.

A computer disk drive includes an actuator arm having a head mounted at a distal end of the arm for reading from, and writing to, tracks on a magnetic disk. This head is moved by the arm from track-to-track on the disk. Vibrations in the system result from this movement. That is, the head and actuator arm vibrate after reaching a nominal final position. Reading and writing cannot take place by the disk drive until these vibrations go below a certain level; otherwise read/write errors occur. These vibrations may also cause noise.

The period during which the disk drive waits for these vibrations to reach an acceptable level (i.e., the settling time) increases the disk drive's seek time. The drive's seek time comprises the time it takes for the drive's head to come to rest at a position where the head can perform a read/write operation on a particular track. The increase in seek time can be especially acute in cases where the track-per-inch density of the magnetic disk is high. That is, because tracks in these disks are relatively close together, even small vibrations in the head can seriously affect the accuracy of the disk drive and/or increase noise in the drive. Since even small vibrations cannot be tolerated, the settling time is further increased, thereby further increasing the drive's seek time.

Conventional attempts at addressing the foregoing problems in both disk drives and dynamic systems in general have fallen short of satisfactory. That is, such attempts are too computationally intensive to be practical, have failed to provide sufficient reduction in vibrations for use in high accuracy positioning equipment such as computer disk drives, produce sub-optimal trajectories, and/or are overly sensitive to system parameter variations.

Other related problems also plague conventional disk drives. For example, in conventional disk drives, two different controllers are used to position the drive's head on a track. A first controller controls the drive's head to reach a predetermined position near to a final position, at which point a second controller takes over. This second controller moves the head into the final position and regulates the head on a track. Switching between these two controllers increases settling time and, as a result, increases seek time. Also, in conventional disk drives, little or no control over vibrations is included in the derivation of these controllers. Consequently, conventional disk drives may not be able to discern important variations during motion transients.

In view of the above, there exists a need for a way to control computer disk drives and, more generally, dynamic systems, which reduces both mechanical and acoustic vibrations to an acceptable level without undue computational effort and without a substantial reduction in movement speed.

SUMMARY OF THE INVENTION

The present invention addresses the foregoing needs by providing methods of controlling movement in a dynamic system so as to reduce mechanical and/or acoustic unwanted vibrations in the system. These methods are relatively easy to perform, produce good results, and have few adverse side effects, thereby making them a significant improvement over the prior art.

In one aspect, the invention determines which parameter will cause a dynamic system to saturate. For example, in the case of a computer disk drive, current commands control the system. However, voltage is the fundamental limiting parameter of the system, since voltage supplied by the drive's power supply limits the amount of current in the system. In this aspect, the fundamental limiting parameter is used to generate a command for the system which reduces vibrations without causing the system to saturate. In the specific case of a disk drive, the fundamental limiting parameter (i.e., voltage) is also used to generate current commands that do not exceed the voltage limitations of the system.

In another aspect of the invention, a disk drive system is modeled using partial fraction expansion equations. The digital form of those equations is as follows:

$$Finalpos = \sum_{i=1}^{N} V_i A \Delta t$$

$$0 = \sum_{i=1}^{N} V_i \frac{Ab}{b-a} (e^{-a(T_{end}-T_i+\Delta t)} - e^{-a(T_{end}-T_i)})$$

$$0 = \sum_{i=1}^{N} V_i \frac{Aa}{a-b} (e^{-b(T_{end}-T_i+\Delta t)} - e^{-b(T_{end}-T_i)}),$$

where Finalpos is a final position of the system, A is a scaling factor, a and b are inverse time constants, $t_{end}$ is the time at which a move is completed, $V_i$ are voltage inputs to the system, $T_i$ are the times at which $V_i$ are input, and $\Delta t$ is a time interval at which $V_i$ are input. Using the above equations, system inputs which produce reduced vibrations can be determined. These equations are particularly powerful when used to solve for a system input in terms of its fundamental limiting parameter. Additional constraints may also be included in the above equations in order to provide a more accurate model of the system.

In still another aspect of the invention, techniques are provided for reducing system vibrations in its various modes. These techniques may be used alone or in conjunction with the concepts set forth above. One such technique comprises incorporating vibration limiting and sensitivity constraints into the partial fraction expansion equation model so as to reduce vibrations to specific levels. Another technique comprises shaping (e.g., convolving or filtering) a command determined using the partial fraction expansion equation model to produce a desired output. The entire command may be shaped or only selected portions thereof which produce vibrations. Selective shaping is preferred since it reduces seek time relative to shaping the entire command. Another technique involves commanding in current to produce saturation in voltage. By doing this, it is possible to command voltage switches. The times at which the switches occur can then be set to reduce system vibrations. Other techniques are also provided. These include varying transient portions at the beginning, middle and/or end of a move and using Posicast inputs, among others.

In still another aspect, the invention determines an input to the system that will result in limited (or reduced) vibrations, and uses that input as a feedforward trajectory for the system. Several approaches are provided for generating the input, including performing an optimization method on the partial fraction expansion equations. In one approach, the problem of generating an input is separated into a rigid mode problem and a flexible mode problem. Specifically, terms associated with the rigid mode of the system are determined from the partial fraction expansion equations, and terms associated with oscillating or flexible modes of the system are determined based on a system analysis. The rigid body terms are solved for an input which drives the system so as to satisfy its rigid body constraints. This input is then shaped using, e.g., an Input Shapers™ designed to compensate for the flexible modes of the system. Using this approach, the computational difficulty of obtaining a solution is reduced relative to the optimization approach, while still providing an adequate reduction in levels of vibrations in relevant modes of the system. Another approach to generating the input involves creating a closed-loop model of the system. An input which results in reduced vibrations may then be generated based on this model. In still another approach, voltage switch times for a bang-bang input that reduces vibrations are determined based on the partial fraction expansion equations. Input Shaping™ may then be applied to that input so as to provide a further reduction in vibrations.

In other aspects of the invention, various position-velocity ("PV") table formulations are provided for reducing system vibrations. In one approach, a trajectory which reduces system vibrations is generated in accordance with one or more of the techniques set forth above, and that trajectory stored in a PV table. The trajectory can then be used to control movement of the system. In another approach, a shaper is provided at the output of a PV table, and its inverse is provided along the system's feedback path. This arrangement reduces system dynamics via the feedforward direction, and restores loop stability in the feedback direction. In still another approach, an N (N>2) dimensional PV table is used to control a system, in which velocity is a function of position and one or more other variables, such as movement distance, resistance, temperature, etc. In yet another PV approach, current commands are shaped at transition(s) (e.g., at deceleration) so as to yield desired levels of vibrations. During non-transitional states, a trajectory in a PV table is followed.

While the above-summarized methods significantly enhance the operation of dynamic systems, such as computer disk drives and other data storage devices, it is also preferable to allow end-users some control over the system's operation. For example, a user may want a disk drive that has a relatively low seek time (i.e., a disk drive that is fast), but may not care about acoustics. Similarly, the user may be more focused on acoustics than on seek time. Thus, there exists a need for a way by which an end-user can control operation of a disk drive. In particular, there exists a need for a simple way to control operation of the disk drive, which permits the user to select operational parameters, such as seek time and acoustic levels, in addition to other features.

The present invention addresses these needs by providing a GUI and/or mechanical switch(es) through which an end-user may alter operational parameters of a disk drive, including, but not limited to, the drive's seek time, noise level, and power consumption. By providing these features, the invention enables the user to customize operation of a disk drive relatively easily without requiring significant hardware and/or software modifications.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

The present invention comprises computer-executable code (i.e., computer-executable process steps) for controlling operation of a disk drive or, more generally, any dynamic system. For the specific case of a disk drive, the invention includes code which generates a GUI, which accepts inputs into that GUI, and which outputs commands to a disk drive causing the disk drive to conform its operation to the GUI inputs. The invention can be used in any type of computer/disk drive system, such as a desktop computer, laptop computer, or the like. For the sake of brevity, however, the invention will be described in the context of a desk-top computer system only.

Figure 1:
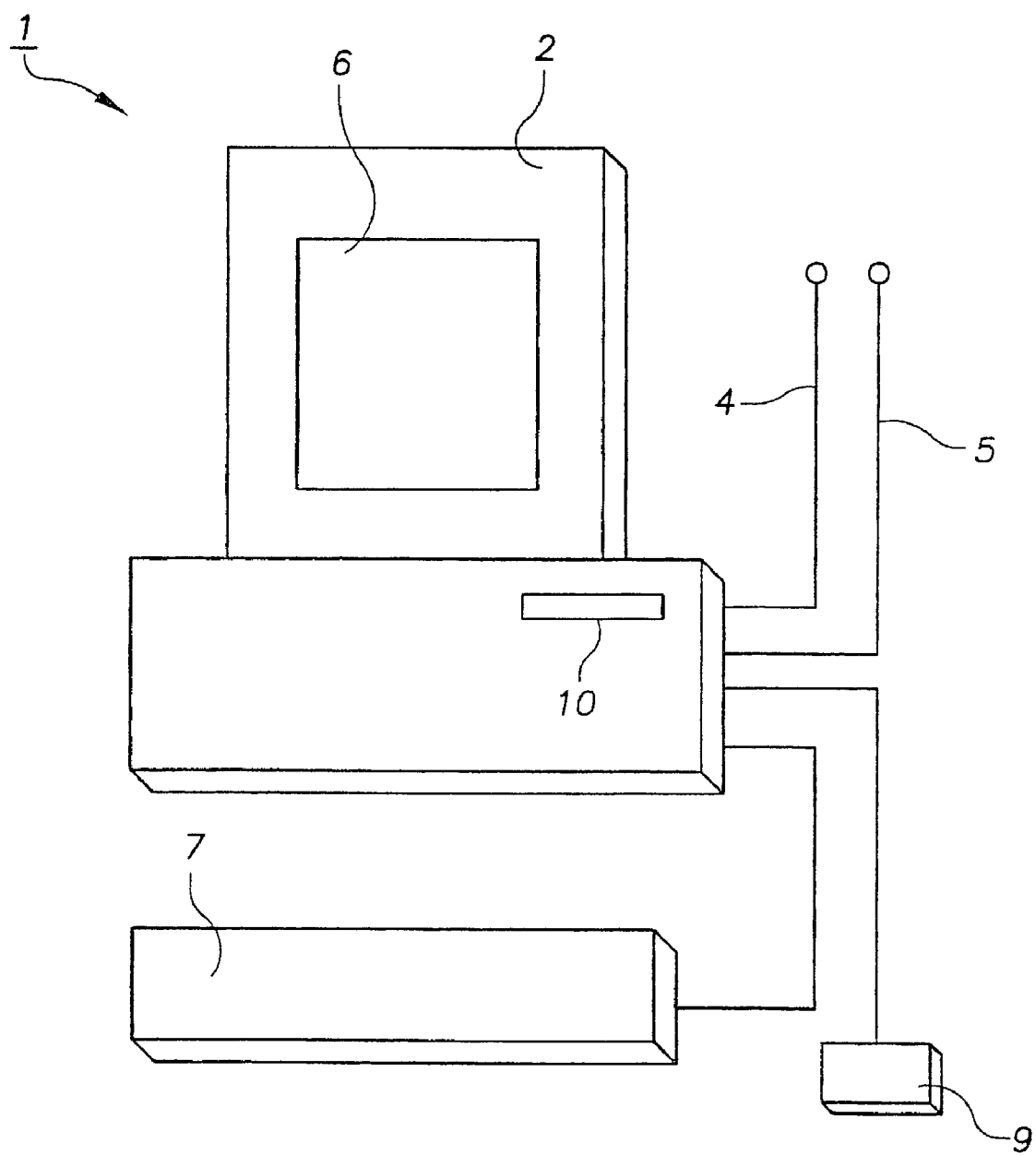
FIG. 1 is a perspective view of a computer system through which the present invention may be implemented.

FIG. 1 shows a representative embodiment of a computer system 1 on which the invention may be implemented. As shown in FIG. 1, personal computer ("PC") 2 includes network connection 4 for interfacing to a network, such as the Internet, an ATM network, or the like, and fax/modem connection 5 for interfacing with other remote devices such as a digital camera, digital video camera, and the like. PC 2 also includes display screen 6 for displaying information to a user, keyboard 7 for inputting text and user commands, mouse 9 for positioning a cursor on display screen 6 and for inputting user commands, and disk drive 10 for reading from and writing to floppy disks installed therein. PC 2 may also have one or more peripheral devices (not shown) attached thereto for inputting text, graphics, images, or the like, and/or for outputting images.

Figure 2:
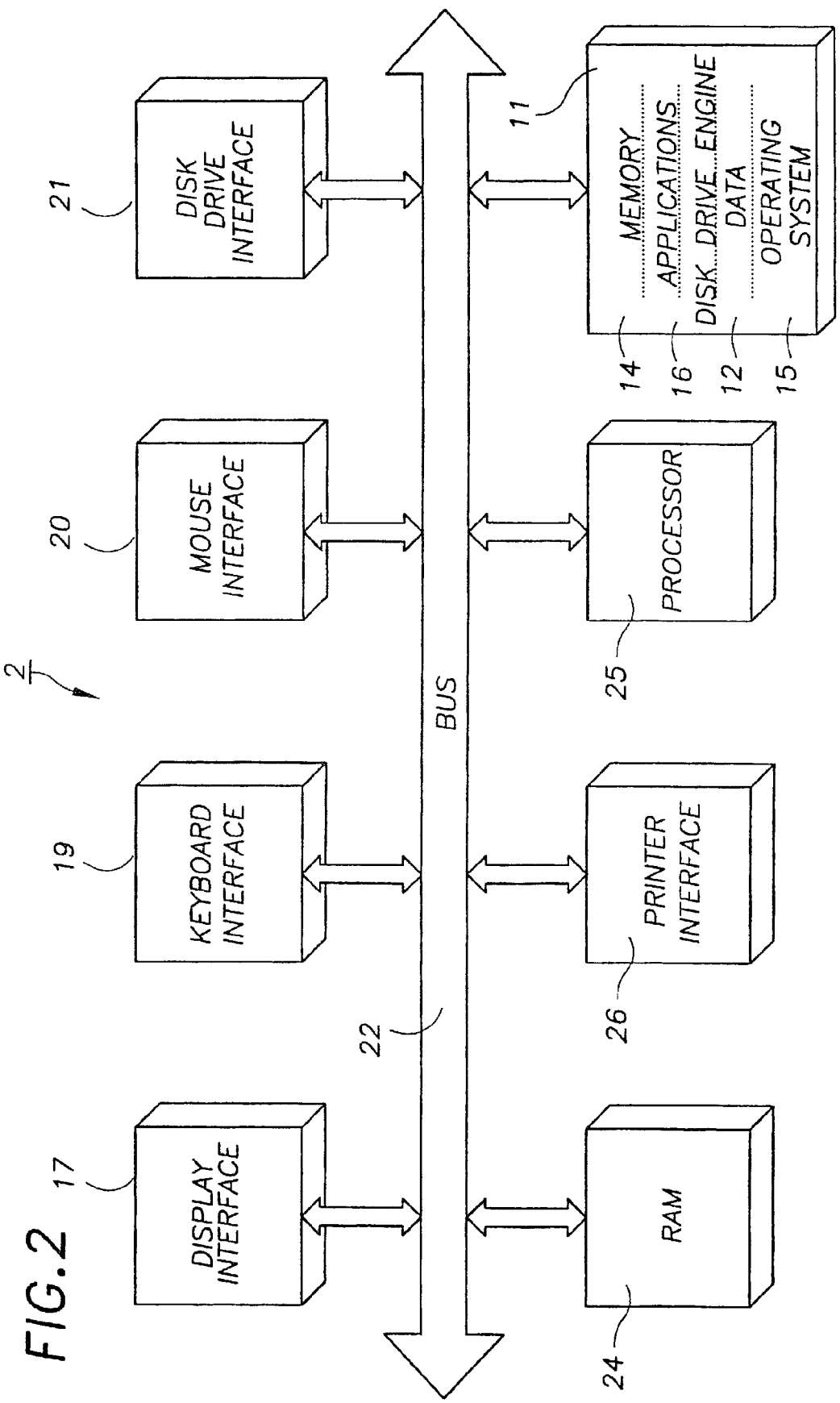
FIG. 2 shows the architecture of the computer system.

FIG. 2 shows the internal structure of PC 2. As shown in FIG. 2, PC 2 includes memory 11, which comprises a computer-readable medium such as a computer hard disk. Memory 11 stores data 12, applications 14, and operating system 15, among other things. In preferred embodiments of the invention, operating system 15 is a windowing operating system, such as Microsoft® Windows98 or Microsoft® Windows NT; although the invention may be used with other operating systems as well. Among the applications stored in memory 11 is computer code to implement the present invention, namely disk drive engine 16. Alternatively, disk drive engine 16 may be stored in a read-only memory ("ROM"), or the like, together with other operational firmware for disk drive 10. In brief, disk drive engine 16 is comprised of computer-executable process steps which, inter alia, generate a GUI for controlling operation of disk drive 10 and output commands to disk drive 10 causing disk drive 10 to conform its operations to settings in the GUI. A more detailed description of disk drive engine 16 is provided below Also included in PC 2 are display interface 17, keyboard interface 19, mouse interface 20, disk drive interface 21, computer bus 22, RAM 24, processor 25, and printer interface 26. Processor 25 comprises a microprocessor or the like for executing applications, such those noted above, out of RAM 24. Such applications may be stored in memory 11 (as noted above) or, alternatively, on a floppy disk in disk drive 10. Processor 25 accesses applications (or other data) stored on a floppy disk via disk drive interface 21.

Application execution and other tasks of PC 2 may be initiated using keyboard 7 or mouse 9, commands from which are transmitted to processor 25 via keyboard interface 19 and mouse interface 20, respectively. Similarly, application execution may be initiated remotely via, e.g., network interface 4 and a network interface card (not shown). Output results from applications running on PC 2 may be processed by display interface 17 and then output via network interface 4 or, alternatively, displayed to a user on display 6. To this end, display interface 17 preferably comprises a display processor for forming video images based on video data provided by processor 25 over computer bus 22, and for outputting those images to display 6. Output results from other applications running on PC 2 may be provided to an attached printer via printer interface 26.

Turning to disk drive engine 16, this application comprises computer code to control operation of disk drive 10 either according to one of a plurality of well-known conventional methods or according to one or more of the proprietary methods described herein. Disk drive engine 16 further includes code for generating a GUI for interactively controlling at least one of a seek time, a noise level, and a power consumption of a disk drive. The GUI includes a controller that is operated by a user so as to alter settings in the GUI for one or more of these parameters. Thereafter, disk drive engine 16 generates and outputs commands to the disk drive causing it to conform its operation in accordance with the altered settings in the GUI.

1.0 User Interface

Figure 3:
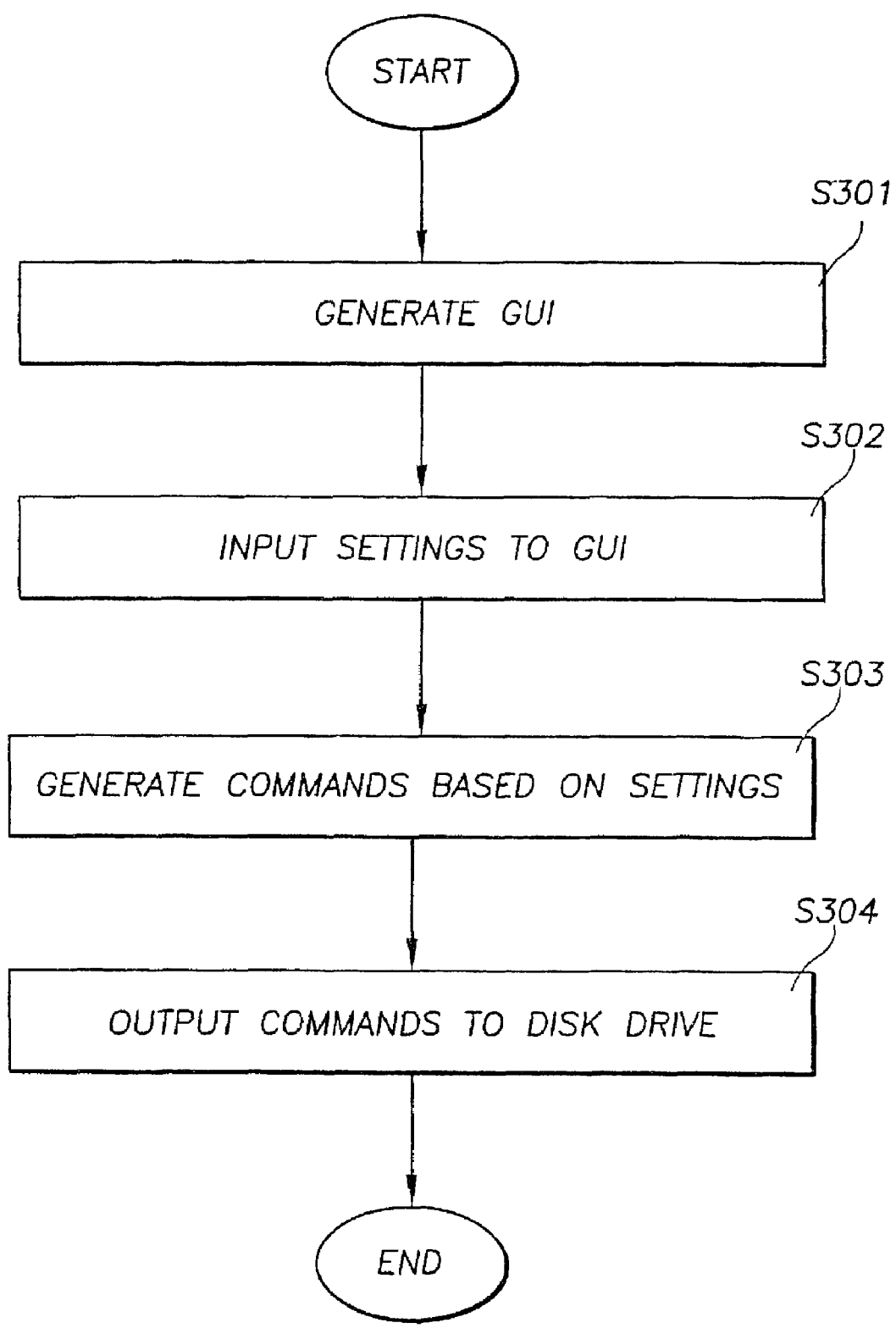
FIG. 3 shows process steps for generating a graphical user interface in accordance with the invention.
Figure 4:
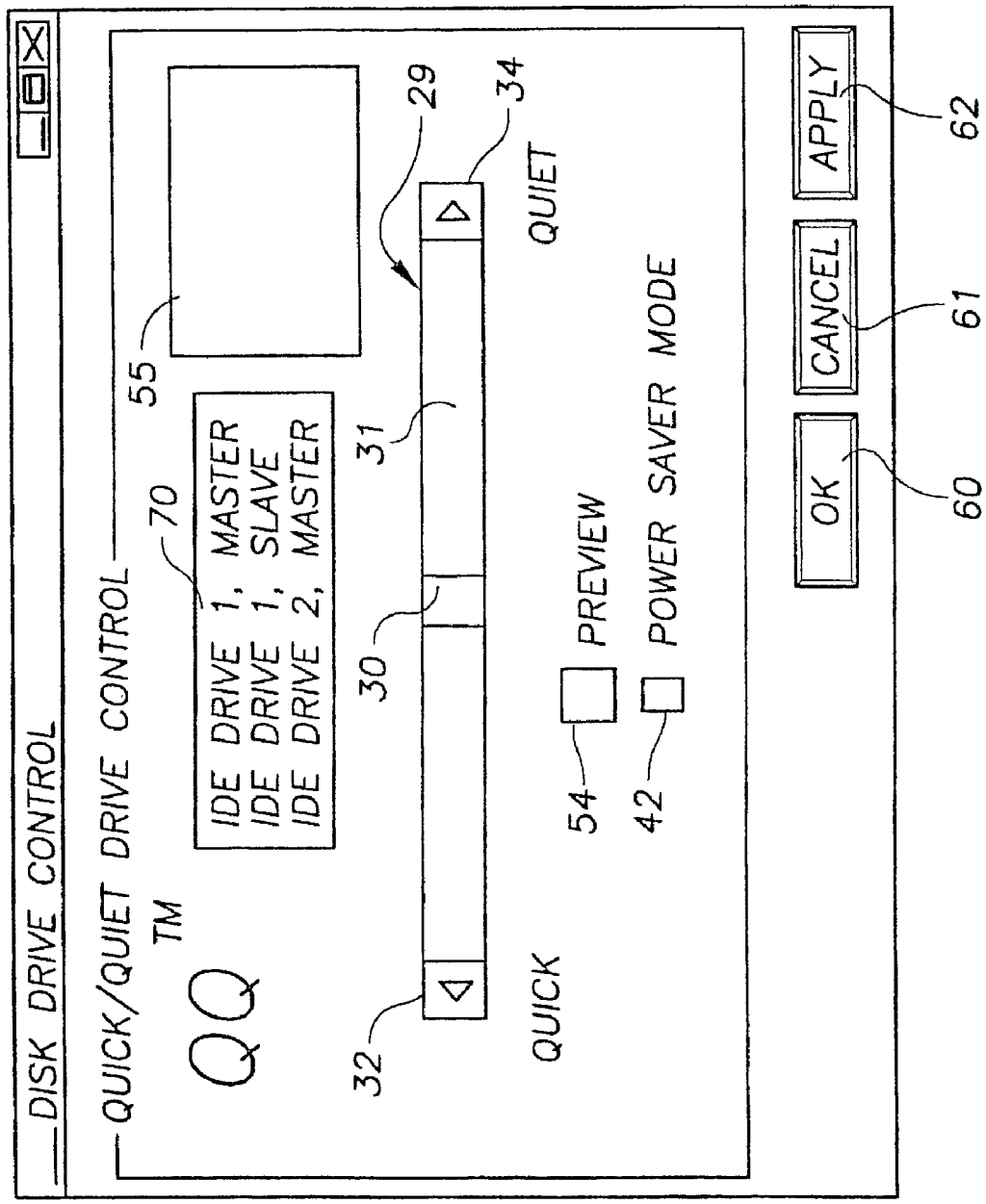
FIG. 4 to 9 show graphical user interfaces that can be generated by the invention.
Figure 9:
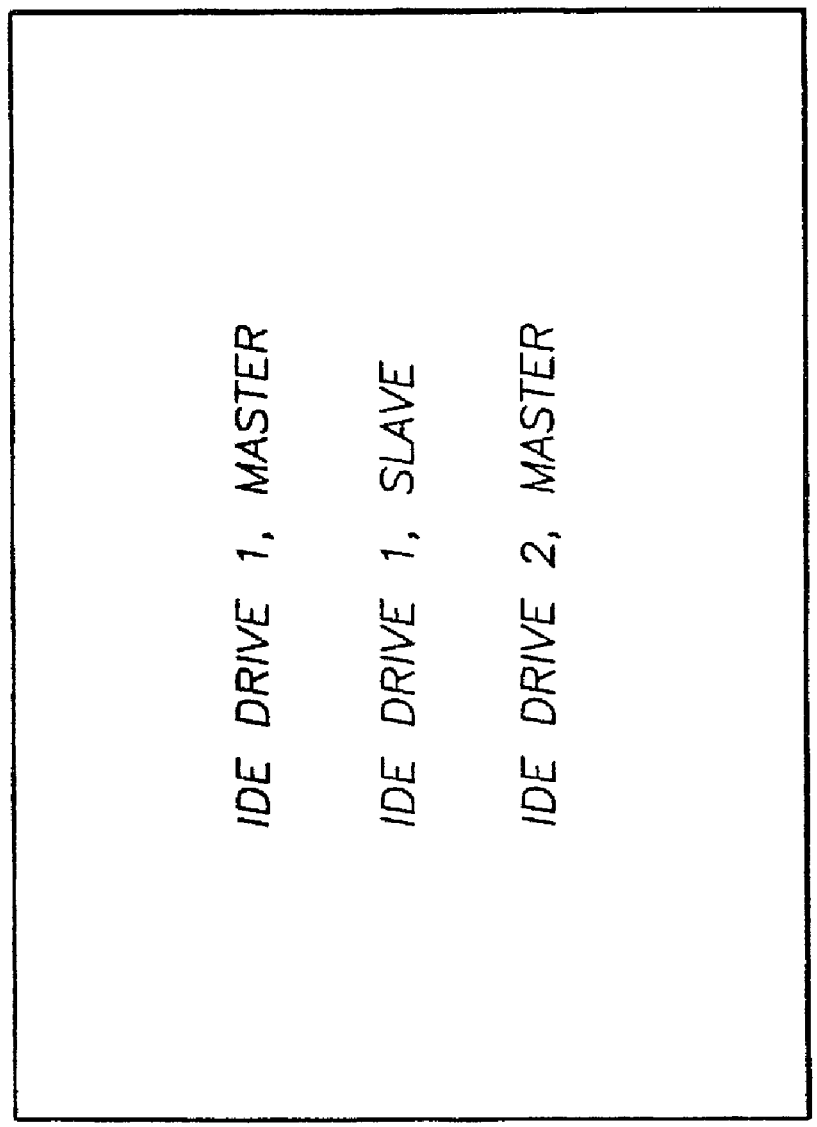

FIG. 3 is a flow chart for controlling operation of a disk drive using disk drive engine 16. To begin, step S301 generates a GUI and displays that GUI to the user via display 6. FIG. 4 shows such a GUI, labeled 27. GUI 27 includes a window 70 for selecting a disk drive to be controlled. That is, although the computer system shown in FIG. 1 includes only one disk drive, many systems include more than one disk drive. Window 70 provides a way for a user to select which disk drive to control. FIG. 9 is a close-up view of window 70. A disk drive can be selected simply by pointing and clicking on that drive in window 70. The selected drive is then highlighted, as shown.

As shown in FIG. 4, GUI 27 also includes controller 29. Controller 29 is used to alter a seek time and a noise level of disk drive 10. In this particular embodiment, controller 29 comprises a sliding bar 30 which moves along a continuum 31 between a relatively high noise level/low seek time ("Quick") end 32 and a relatively low noise level/high seek time ("Quiet") end 34. Disk drive noise level and seek time vary inversely along the continuum, meaning that, as the noise level of the disk drive progressively increases, the seek time of the disk drive progressively decreases. Likewise, as the noise level of the disk drive progressively decreases, the seek time of the disk drive progressively increases. By moving sliding bar 30, it is possible to vary both the seek time and noise level parameters simultaneously.

In the preferred embodiment of the invention, sliding bar 30 moves between discrete positions on continuum 31, meaning, e.g., between a first position corresponding to high noise level/low seek time ("Quick") end 32, a second position corresponding to a mid-point between the two ends on continuum 31, and a third position corresponding to low noise level/high seek time ("Quiet") end 34. Alternatively, there may be more than three discrete levels or noise and seek time may vary continuously between the two ends of continuum 31.

The level of noise in a disk drive is due to vibrations at particular frequencies, such as 6.6 KHz, 6.0 KHz, 5.0 KHz, 4.2 KHz, and 1.3 KHz. On the other hand, mechanical vibrations, which reduce seek time, result from vibrations at different frequencies, such as 3.3 KHz. By moving the sliding bar of controller 29 along the continuum, an end-user is effectively determining which of the above frequencies should be reduced and/or how much the reduction should be. For example, in a case that Input Shaping™ (described below) is used to reduce vibrations, by moving sliding bar 30, the user effectively selects one or more shaping functions for reducing vibrations at specific frequencies, and causes disk drive engine 16 to convolve those functions with the appropriate disk drive inputs in order to implement the desired vibration reduction.

Figure 5:
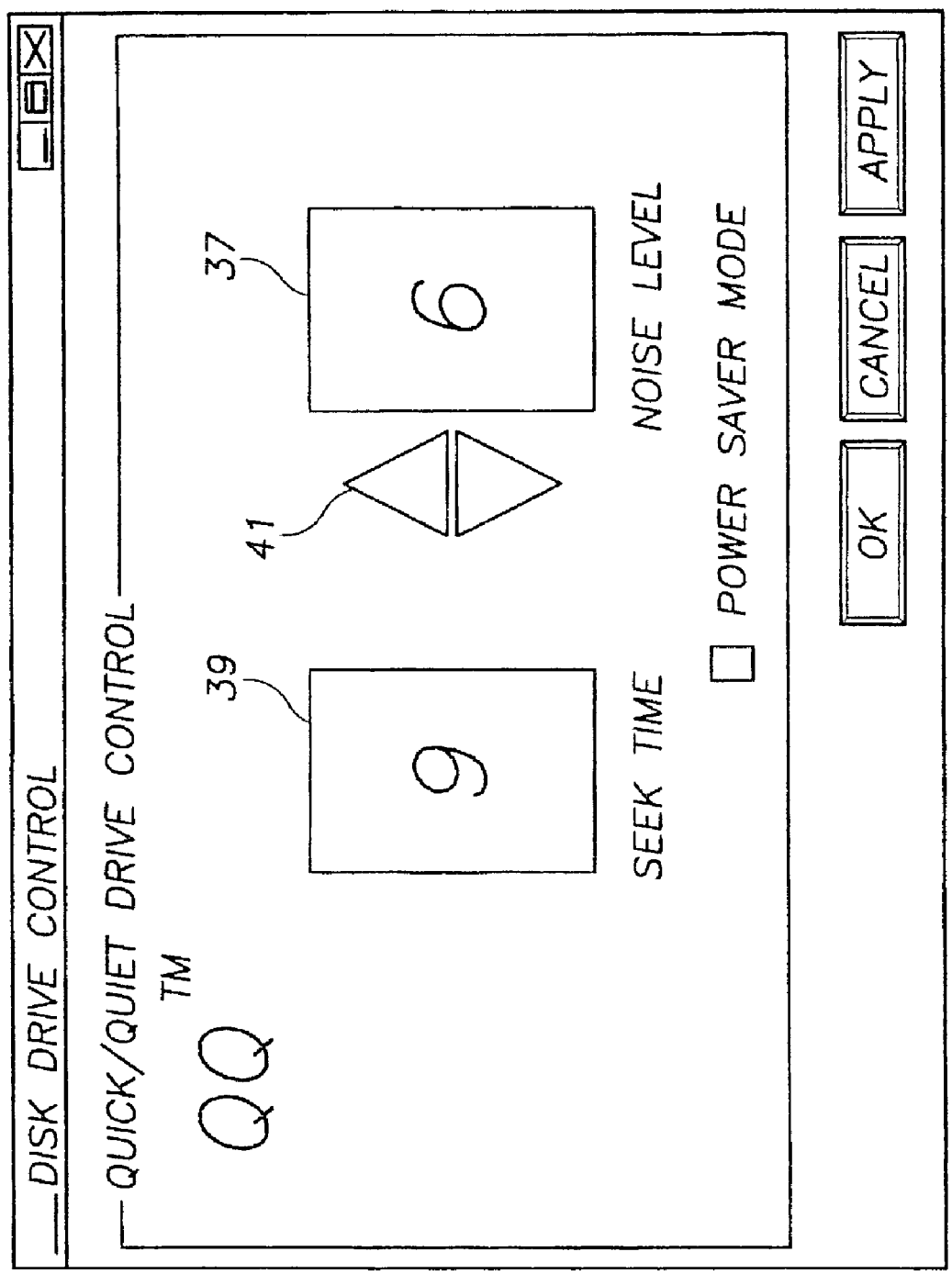

In GUI 27 the noise level and seek time vary inversely along continuum 31 such that there is an effective trade-off between seek time and noise level, meaning that as seek time increases, noise level decreases and vice versa. These variations are not necessarily linear; although they may be. As an alternative to sliding bar 30, the GUI may include boxes into which discrete noise levels and/or seek times are entered. For example, as shown in FIG. 5, the GUI may include entry box 37 into which a noise level value is entered and display box 39 which displays a corresponding numerical value of the seek time. In this case, the GUI preferably also includes up/down arrows 41 which are used for selecting the various noise level values. On the other hand, these values may be input directly via mouse 9 and keyboard 7. As another alternative, the seek time may be settable via entry box 37 and the corresponding noise level displayed via display box 39. In either case, the numerical value displayed in the display box is calculated by disk drive engine 16 based on the value set in the entry box.

Returning to FIG. 4, GUI 27 may also include a second controller, such as check box 42. This controller causes the disk drive to enter a power-saving mode. The power-saving mode comprises a state during which the disk drive reduces its power consumption by a predetermined amount. The power-saving mode may be set in conjunction with varying the seek time and the noise level. That is, in the power saving mode, the set seek time and noise level are achieved using less power than would otherwise be required. This is achieved, e.g., by convolving one or more predetermined functions with a command input to a voice coil motor in the disk drive.

Figure 6:
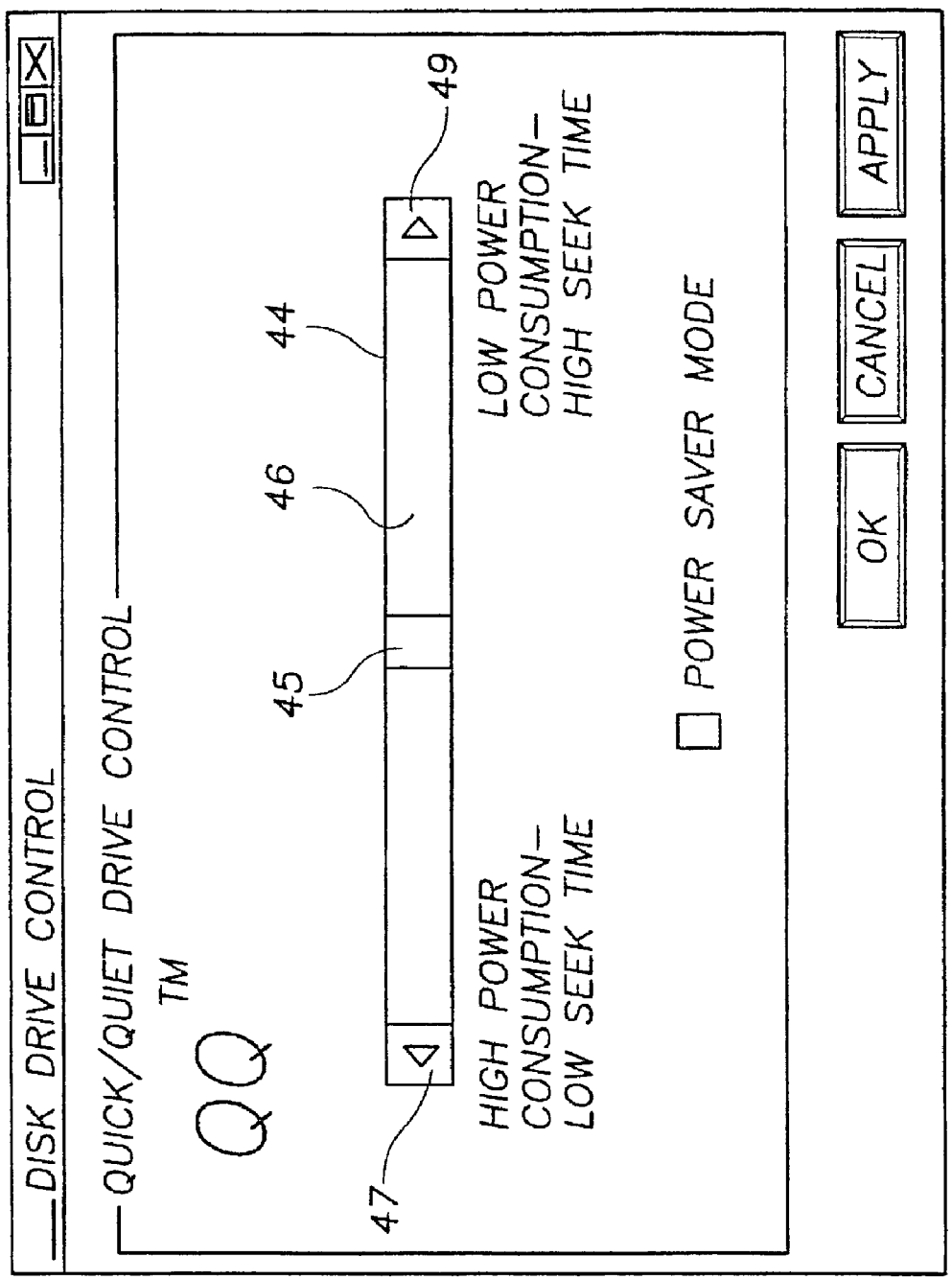

On the other hand, a reduction in power consumption may be achieved via a controller, such as controller 44 shown In FIG. 6. Controller 44 comprises a sliding bar 45 which moves along a continuum 46 between a relatively high power consumption/low seek time end 47 and a relatively low power consumption/high seek time end 49. As was the case above, sliding bar 45 may move between discrete values along the continuum. Thus, in this embodiment, disk drive power consumption and seek time vary inversely along the continuum, meaning that, as the power consumption of the disk drive progressively increases, the seek time of the disk drive progressively decreases. Likewise, as the power consumption of the disk drive progressively decreases, the seek time of the disk drive progressively increases.

By moving sliding bar 45 it is possible to vary both seek time and power consumption simultaneously. For example, varying power consumption may be achieved by convolving one or more predetermined functions with a command input to a voice coil motor in the disk drive. Selection of the predetermined functions is performed based on the settings of the sliding bar. Of course, the functions may be set in other ways as well (as is the case throughout this application). For example, the functions may be selected from predetermined trajectories in a position-velocity ("PV") table, as described herein below.

Figure 7:
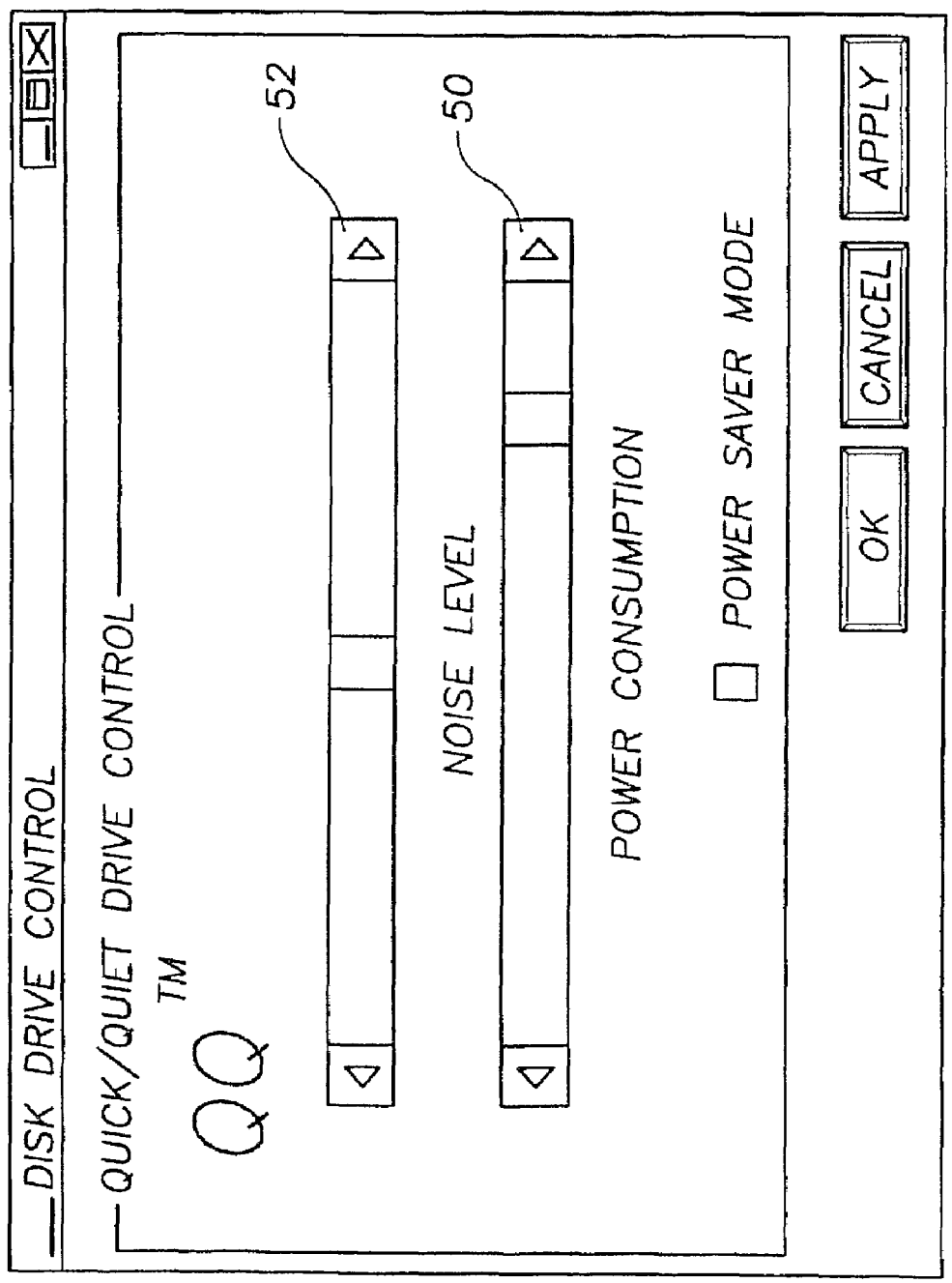
Figure 8:
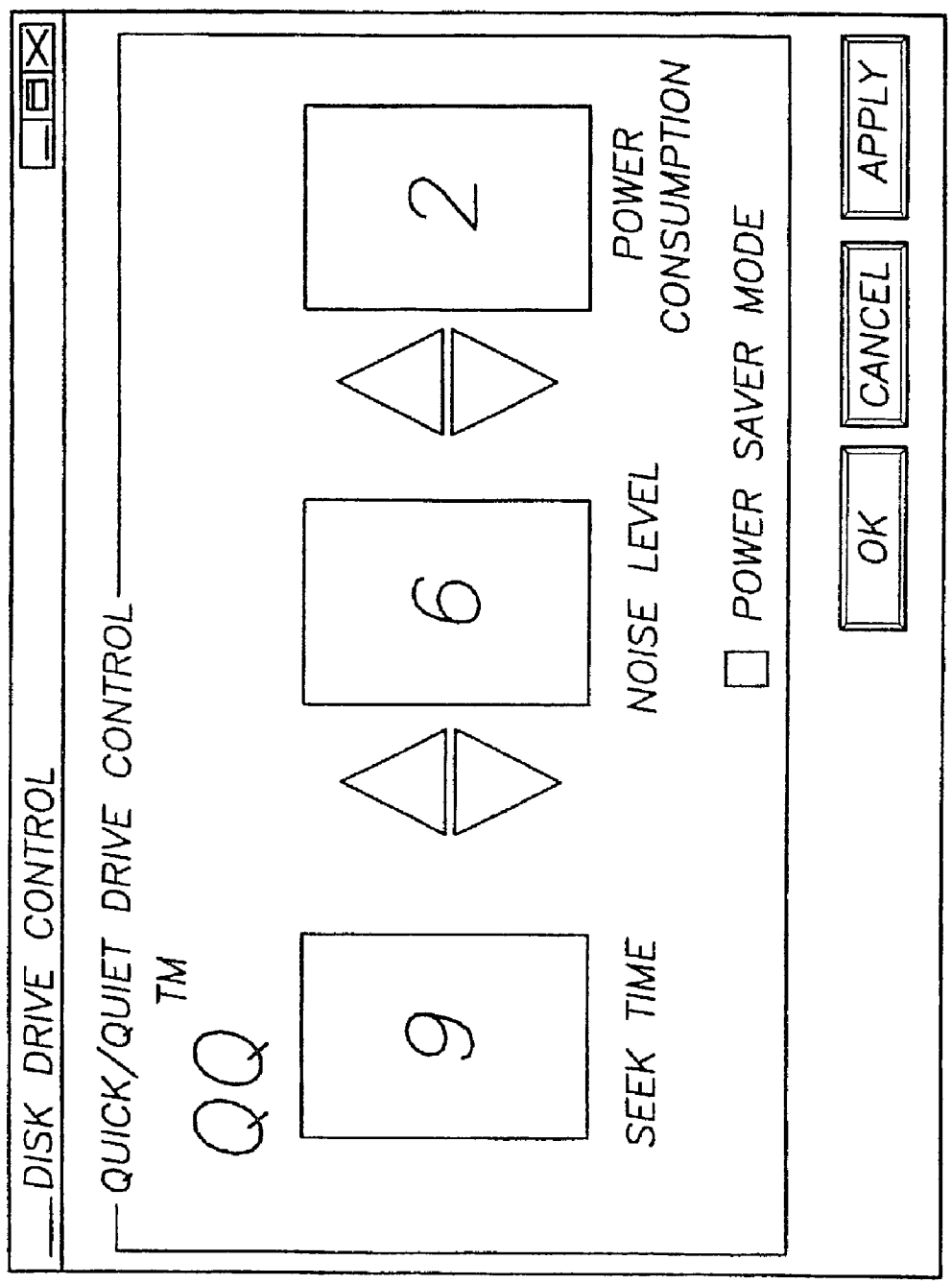

FIG. 7 shows yet another alternative configuration for the GUI. As shown in FIG. 7, the GUI could include separate controllers 50 and 52 for reducing both power consumption and noise level, respectively, as a function of seek time. Thus, (i) as noise level increases, seek time decreases, and vice versa, and (ii) as power consumption increases, seek time decreases, and vice versa. The sliding bars shown in FIG. 7 preferably have all the characteristics of that shown in FIG. 4. As shown in FIG. 8, numerical values for noise level and power consumption may be implemented, as in FIG. 5. Here, a numerical value is calculated for seek time as well based on the noise level and power consumption settings, and displayed in the GUI as shown.

Returning to FIG. 4, GUI 27 may also include a preview controller, shown at 54, to cause the disk drive to operate using parameters) set by controller 29. This preview controller may comprise a button or the like, which a user can click on, and which causes the disk drive to operate in a "preview" mode. The preview mode may cause the disk drive to seek between various tracks on a disk so that the user can experience the noise level and seek time settings in the GUI. If these levels are unacceptable, the user may then revise the GUI inputs, and preview the drive's operation based on such newly-set inputs. This process can be repeated as often as desired until the user achieves the desired settings. Preview mode may also be pre-set to execute automatically each time the GUI settings are altered.

GUI 27 may also include one or more display areas 55, as shown in FIG. 4. These display areas may provide a numerical indication of the noise level of the disk drive, its seek time, and/or its power consumption rate. Display areas such as these are generally most beneficial in cases where parameters are set using a sliding bar, as is the case, for example, in FIGS. 4, 6 and 7. Likewise, a display area may be provided which informs the user of the amount of hours that a computer (e.g., a laptop) can operate with an existing power supply. To determine this value, disk drive engine 16 monitors the computer's power supply directly, or estimates the amount of power left based on the total time the computer has been running with the present supply, as well as other relevant parameters.

Returning to FIG. 3, following step S301, in which a GUI is displayed, processing proceeds to step S302. In step S302, the user inputs desired settings into the GUI. These settings, of course, will depend upon the available options in the GUI, examples of which are described above. For instance, the user may input some combination of a new seek time, power consumption rate, noise level, etc. Step S302 may be performed locally or remotely via network interface 4. That is, the GUI may be displayed on a remote networked PC, and the settings therefor applied to the local PC. In any event, once the new parameter setting are input in step S302, they may be confirmed via "OK" button 60, canceled via "Cancel" button 61, or applied to the disk drive via "Apply" button 62. The difference between "OK" button 60 and "Apply" button 62 is that "OK" button 60 merely stores the new settings in memory (e.g., memory 11), whereas "Apply" button 62 applies the settings to the disk drive, overriding any previous hardware or software settings.

Next, in step S303, commands (e.g., electrical signals) are generated for controlling disk drive 10 in accordance with the settings set in the GUI. Exactly how these commands are generated may vary, depending upon the way in which the disk drive is controlled. Assuming, for illustration's sake, that the disk drive is being controlled via Input Shaping™, step S303 comprises convolving various inputs to the disk drive with predetermined functions which are selected based on settings in the GUI in order to produce disk drive inputs that achieve the results specified in the GUI. These functions may be stored, e.g., in memory 11 or in another memory on the system. Sections 2 to 11 below describe a variety of methods that may be used to control operation of the disk drive, any of which may be used in step S303 based on the GUI setting and other factors.

Once the necessary commands have been generated, processing proceeds to step S304, wherein these commands are provided to control operation of the disk drive. Thereafter, a user may again alter the drive's operation simply by calling up a GUI using, e.g., mouse 7, and entering desired operational parameters. Following step S304, processing ends.

At this point, it is noted that the GUT is not limited to the combinations of features shown in the figures. That is, a GUT may be generated in step S301 with includes any one or more of the foregoing features, subject to certain constraints inherent in the system. Likewise, additional features not described herein, but which are well known to those skilled in the art, may also be included in the GUT. As an alternative to the GUT, or to supplement the GUT, the disk drive may include one or more electromechanical manual switches for controlling all or part of the drive's operation in the manner set forth above. For the purposes of the present invention, a "jumper" is considered to be within the definition of electro-mechanical manual switch.

2.0 System Control

The following control methods are preferably implemented via computer-executable process steps in disk drive engine 16 so as to effect high-speed moves in a disk drive, such as drive 10. However, it is noted that these methods are not limited to use with disk drives. Rather, the methods described herein can be used to control any type of dynamic system which moves from one state to another state. In fact, any unwanted dynamic behavior that can be quantified in a mathematical expression can be reduced by the present invention. For example, using the present invention, a disk drive in a Redundant Array of Independent Drives ("RAID") can be commanded to move in less time than has heretofore been possible without substantially exciting neighboring drives and while simultaneously reducing acoustic vibrations that result in noise. The designer simply need select which vibrations or dynamic behavior is troublesome, identify constraints and, using the technology presented herein, choose from among several approaches for generating optimal or near optimal moves that reduce those vibrations or dynamic behavior. As used herein, the term "vibrations" can refer to mechanical and/or acoustic vibrations that cause noise.

Figure 10A:
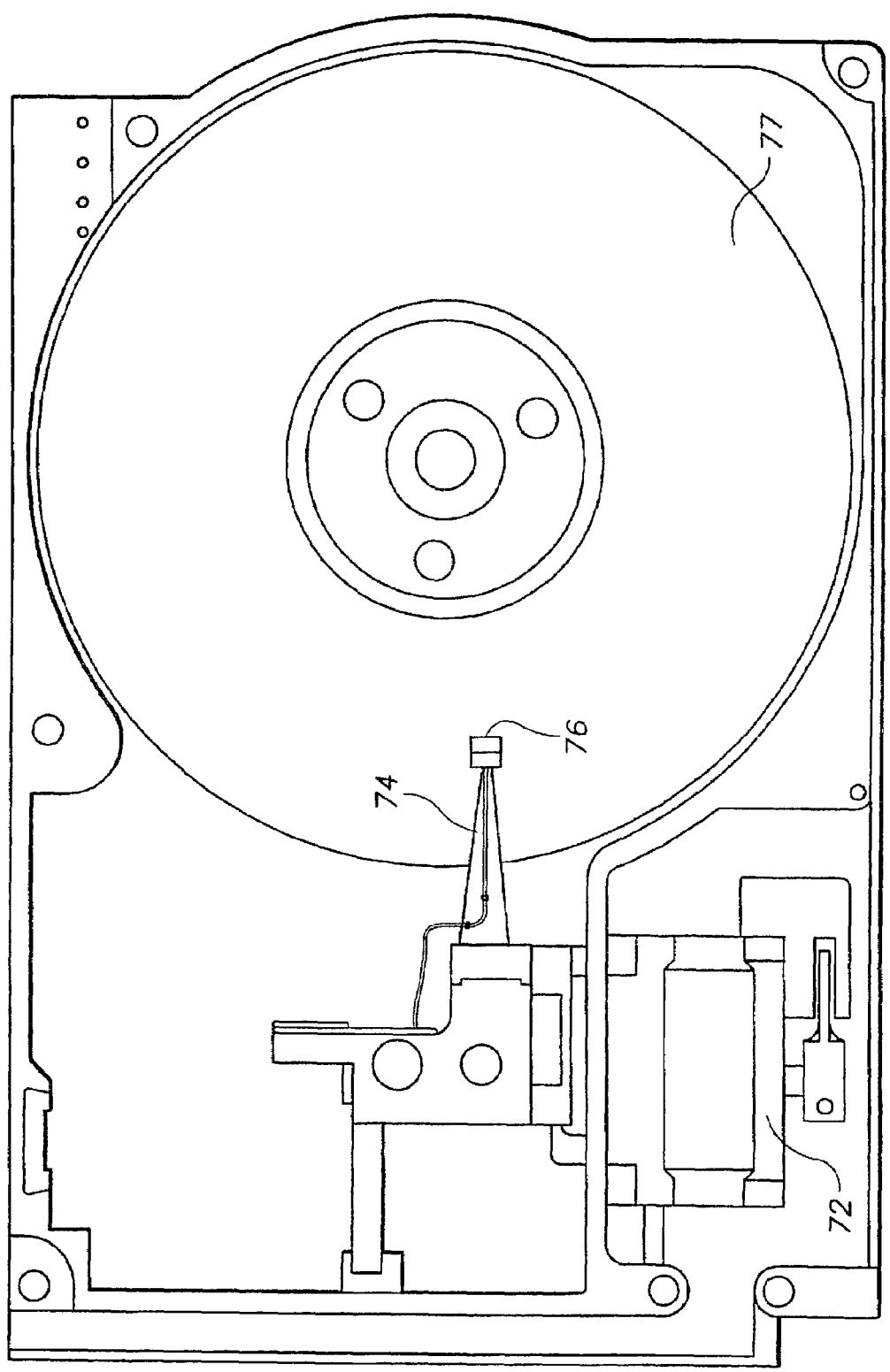
FIG. 10A is a cut-away view of a disk drive that is controlled by the present invention.
Figure 10B:
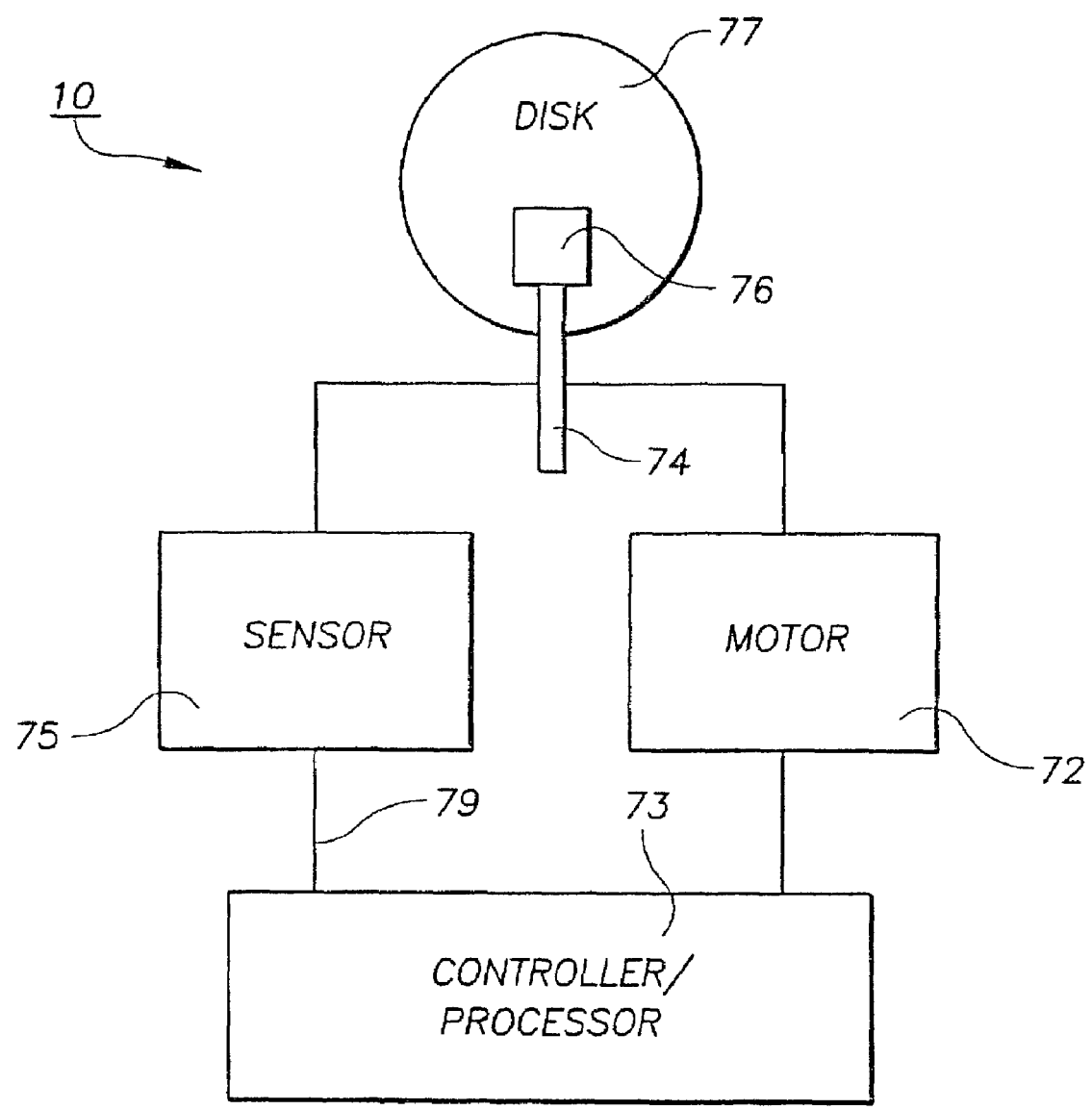
FIG. 10B is a block diagram of circuitry for controlling the disk drive in accordance with the invention.

FIGS. 10A and 10B show close-up views of disk drive 10. As shown, disk drive 10 includes voice coil motor 72 having a rotor (not shown), actuator arm 74, sensor 75, and head 76. These components are controlled via disk drive engine 16, or portions thereof, running on a controller/processor 73. This processor may comprise processor 25 set forth above or, alternatively, a separate controller dedicated to the disk drive which receives commands from processor 25. Head 76 reads to, and writes from, tracks (not shown) on magnetic disk 77 installed in drive 10. Actuator arm 74, on which head 76 is mounted, controls the motion of head 76 between the tracks on magnetic disk 77. Motor 72 drives actuator arm 74 in accordance with control signals received from processor 73. These control signals are generated based, at least in part, on a desired position of head 76 and an actual measured position of head 76 provided via signal 79. Movement of head 76 from an initial position to the desired position occurs within the device's seek time. The seek time for disk drive 10 comprises the time it takes for head 76 to move from an initial position to rest at a position where head 76 can perform a read/write operation on a particular track of magnetic disk 77.

The seek time for computer disk drive 10 can be reduced by commanding a component in disk drive 10, such as head 76, to move from one location to another while satisfying constraints on mechanical vibrations, acoustic vibrations, drive mounting vibrations, or any combination of constraints, physical limitations, and/or parameter variations. Several different methods for reducing such vibrations are described below in detail. One such technique involves altering system inputs that are specified as a function of time. Another technique involves generating a position-versus-velocity (hereinafter "PV" or "position-velocity") table using dynamic elements, e.g., constraints or the like, so as to produce PV table trajectories which result in reduced vibrations. In this regard, the terms "input" and "trajectory" may refer to either a reference command for a controller to follow or a feedforward signal within the controller. Still another technique involves modifying the current industry-standard PV table so that an improved PV table is constructed and used. Several methods for generating PV tables are also provided, together with ways to use an Input Shaper™ in combination with a PV table in order to reduce unwanted vibrations. Also presented are several modifications to the foregoing embodiments which have differing levels of optimality and ease of implementation.

Processor 73 determines which of these techniques to apply based on a variety of factors, such as user inputs to the GUI and the identity of the disk drive. For example, time can be traded off against amount of vibration reduction and robustness to parameter variation. In a given application, the amount of vibration reduction required to make end-of-move conditions acceptable can be a function of the movement distance or other parameter. When this is the case, it is advantageous to trade-off shaping time against shaper effectiveness (meaning amount of vibration reduction) such that (i) vibrations, both mechanical and acoustic, are reduced to an acceptable level (not excessively attenuated), and (ii) shaping time is less than it would be if the vibration were excessively attenuated. When more vibration reduction is required, a longer shaper can be used; when less vibration reduction is required a shorter shaper can be used; and when no vibration reduction is required, then no shaper (zero length) can be used. In this example, shaper selection was from among a discrete collection of shapers. It is also possible to use a single adjustable shaper, e.g. one in which the time interval between pulses is shortened; resulting in a desired shorter shaping time and reduced vibration reduction.

3.0 Fundamental Limiting Parameter

One of the techniques utilized by the present invention is a method for commanding systems that saturate in an optimal manner while still reducing unwanted dynamics. Since all systems saturate in some manner, a method for setting up a command profiling approach is presented herein which first determines a fundamental limiting parameter for the system, second applies either a command shaping or whole-trajectory-generating technique to that parameter, and third schedules the shaped command to be output to the system.

The fundamental limiting parameter of a system is the parameter that causes the system to saturate. In the case of a computer disk drive, current commands control the system. However, the fundamental limiting parameter is voltage, since voltage supplied by the drive's power supply limits the amount of current in the system. By identifying the fundamental limiting parameter of a system in this manner, and processing that parameter in accordance with the techniques provided herein, it is possible to provide for greater control over system movement than has heretofore been possible.

Figure 23A:
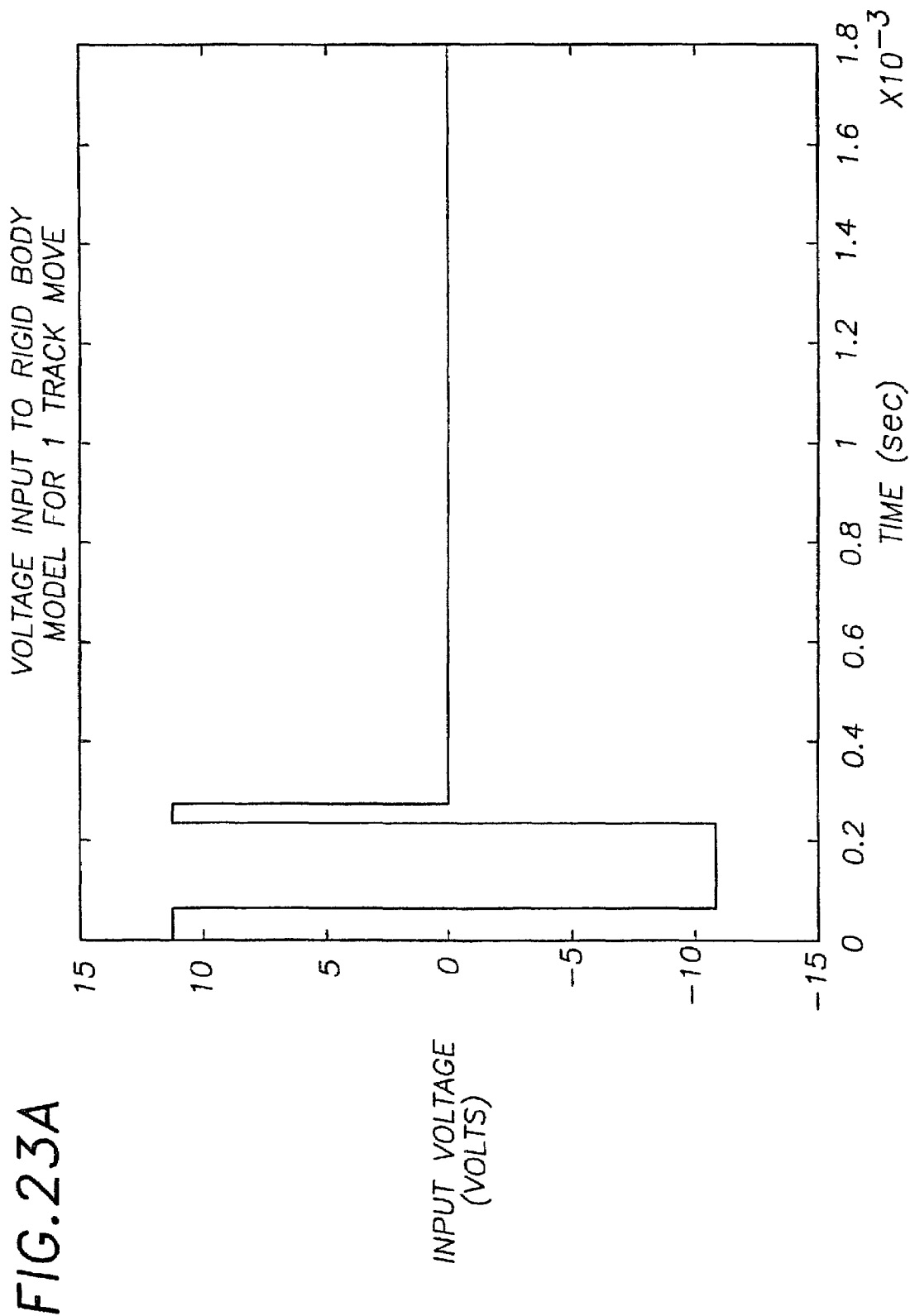
FIGS. 23A and 23B show optimal rigid body voltage commands for 1 and 3000 track moves, respectively, for a disk drive system.
Figure 23B:
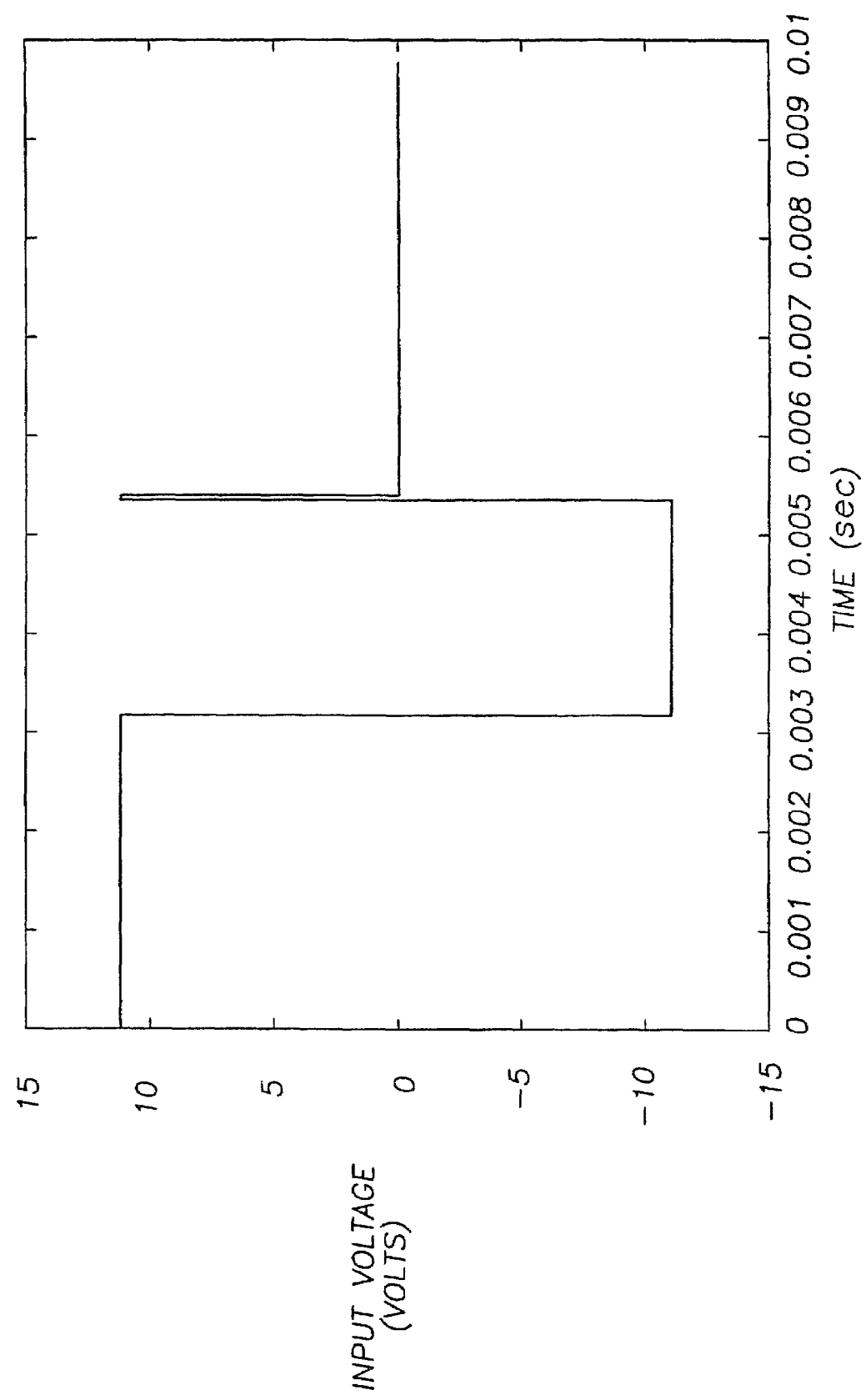

In this regard, there are several disadvantages to not using the fundamental limiting parameter for command profiling. First, there is no a priori way to generate a command signal that does not saturate the system. If the system is allowed to saturate a signal at any time after any command profiling technique is applied, the vibration (or unwanted dynamics) reduction benefit of command profiling will be degraded. The amount of degradation depends on how much the signal is saturated. Therefore, sub-optimal trajectories often result. As examples, optimal rigid body voltage commands for a disk drive system for 1 and 3000 track moves are shown in FIGS. 23A and 23B, respectively (see section 6.3 below for a discussion of rigid vs. flexible system modes). The optimal current command that corresponds to this voltage is highly complex because it depends on the state of the system (in this case, velocity, due to the back EMF of the drive's motor). Any simple current command would necessarily be sub-optimal if the designer is to guarantee that the system is not to saturate. Section 3.1 below describes how this is achieved.

For optimal moves, the system should be commanded with inputs that take the system to saturation limits without exceeding these limits. The second disadvantage of not choosing the fundamental limiting parameter is that these saturation limits cannot be determined without including the entire system dynamics. Therefore, the solution to the problem is significantly more complex. Additionally, once vibrational constraints are included in the problem, the solution increases yet again in complexity. Once the proper selection of a fundamental limiting parameter is made, an input that approaches saturation without unknowingly trying to exceed the limit can be generated.

Another approach to handling the presence of nonlinearities, such as saturation, along the feedforward path is to place a shaping module after the nonlinear element. For example, if a signal can saturate along the feedforward path, the signal should be saturated before the shaping operation. In the case of a digital-to-analog conversion ("DAC") saturation, the output of the feedforward calculations might need to be limited to plus or minus 16,000 counts. If a shaping technique is to maintain the vibration reducing benefits, the output should be limited to 16,000 counts and then shaped.

Still another approach to handling saturation of a parameter, while maintaining the vibration reduction benefits of the various techniques presented herein, is to pre-saturate a signal. One condition under which this would be necessary is if the saturating element is outside of the control of the designer (e.g., the saturation occurs in a hardware amplifier). In this case, it is impractical to perform shaping after saturation. Under this condition, the signal should be pre-saturated and then shaped. Pre-saturation involves determining a mathematical expression for the condition under which the system will saturate during a move, and saturating the signal before it is shaped.

This approach of placing the shaping operation after any nonlinear block is applicable to the technique of putting Input Shapers™ and Inverse Shapers™ in a loop, as presented in section 9 below. All of the same rules apply in that any saturation or nonlinear operation must occur outside the path between the Shaper™ and Inverse Shaper™. If the loop is cut open and all of the dynamic elements between the Shaper™ and Inverse Shaper™ are extracted, the dynamic elements must all be linear (or nearly linear); otherwise the effect of unwanted dynamic reduction is degraded. Additionally, the pre-saturation technique can be used in situations in which saturating elements must necessarily be between the Shaper™ and Inverse Shaper™.

3.1 Using the Fundamental Limiting Parameter while Generating Feedforward Signals in a Different Parameter In a disk drive, current is usually commanded to a transconductance amplifier. The fundamental limiting parameter for a disk drive is voltage. It is, however, possible to generate current commands that maintain a limit in voltage. This section explains how to generate such commands.

The first method for generating a current command that does not exceed the voltage limitations of the system is to solve a set of equations directly for the command input which in this case, is the feedforward signal to the transconductance amplifier. The following equation is used to generate an input that takes the system to zero final velocity:

$$\sum_{i=1}^{N} A_i = 0, \tag{1}$$

where the A's comprise the amplitudes of the current commands at time interval i, and N comprises the last time interval. The following equation determines the velocity, v, at each time interval i $$v_i = C_{vscale} \sum_{j=1}^{i-1} A_j, \tag{2}$$

where A comprises the current inputs and $C_{vscale}$ comprises a disk-drive-dependent constant. The final desired position/state of the system, $P_{final}$, is determined as follows $$P_{final} = \sum_{j=1}^{N} v_i. \tag{3}$$

The voltage limit constraint, $V_{lim}$, comprises the maximum voltage that is being commanded (usually the drive supply voltage). For a disk drive, this is usually on the order of 12V. $V_{lim}$ limits the A value by the following equation:

$$-V_{lim} < \sum_{i=1}^{J} A_{j-i+1} R_i < V_{lim}, \ j = 1 \rightarrow N, \tag{4}$$

where $R_i$ is the pulse response of the amplifier and drive system to the voltage command. The voltage pulse response may be determined by outputting a unit pulse to the amplifier connected to the disk drive and measuring the voltage response of the amplifier. The values of $R_i$ are chosen by means of a multiple step process outlined below.

Figure 35:
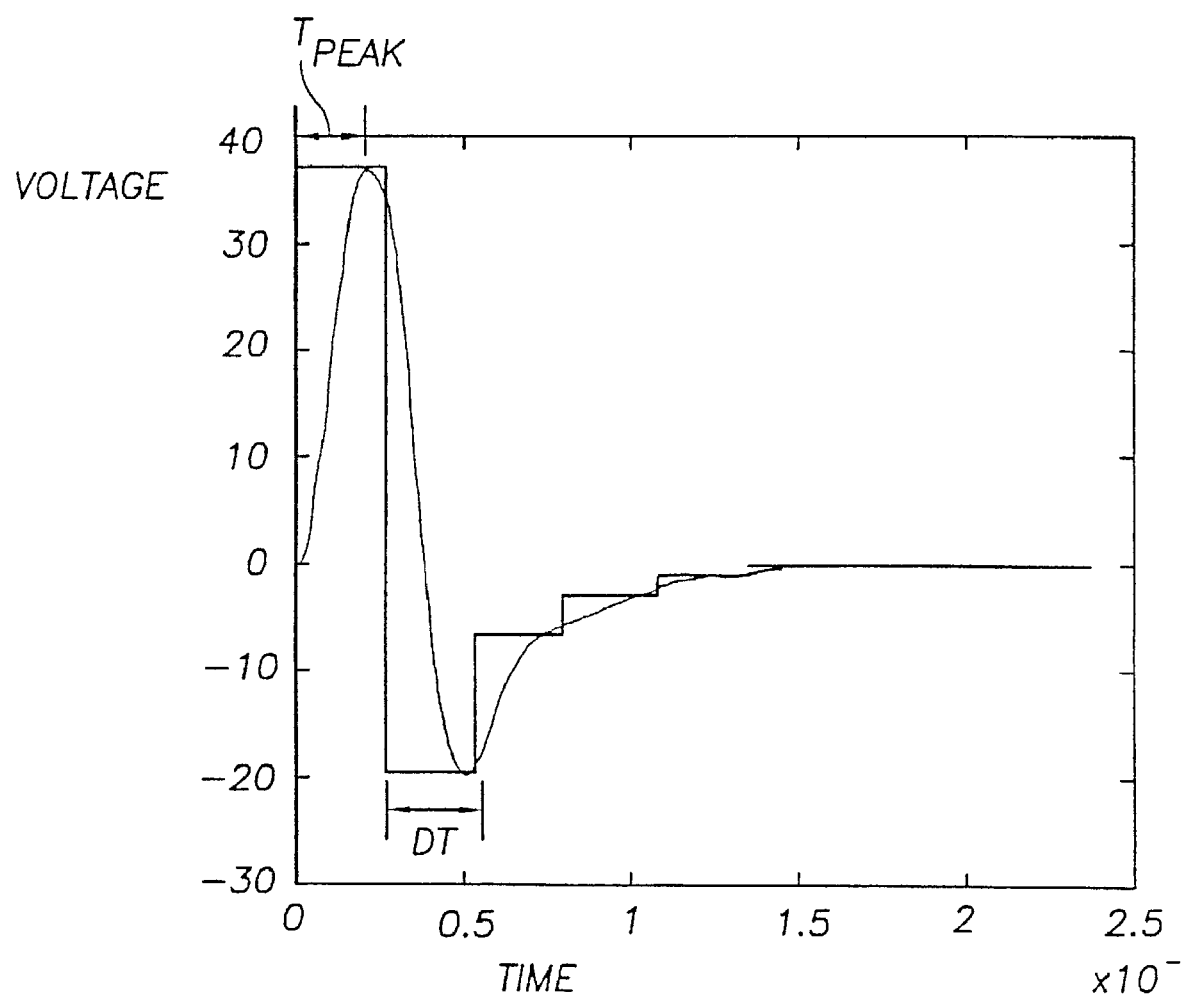
FIG. 35 shows a voltage pulse response of a dynamic system.

In this regard, FIG. 35 shows a voltage pulse response from a computer simulation. The smooth curve is the continuous voltage response. The "square step" curve represent the system's digital sampling rate (or output rate, see section 7.1 below), DT. The first peak occurs $T_{peak}$ after the initial pulse is issued to the system. The first value of R is determined by measuring this peak value and setting the first R equal to this peak value. All subsequent values of R are determined by sampling in DT intervals after this initial peak. The step curve in the figure shows the actual values for this particular example. In this case, a complex voltage curve is reduced to a relatively small number of sample points to be used in one of the several solution techniques described herein.

Alternatively, the pulse response R can be computed as a calibration step in the disk drive or generated at design time. All of the required information for generating an optimal current command is included in this pulse response (except for slew rate limits discussed below). The amplifier is reasonably linear, therefore, saturation of the amplifier is easily predicted from the pulse response. Also, the pulse response may be altered as a function of a measured or estimated parameter change.

The effect of the back EMF of the drive's voice coil motor on the above calculation may be notable. If the voltage pulse response R is calculated analytically (or from a model), the voltage is constant and non-zero at steady state because the system reaches a finite velocity from a pulse in acceleration. In FIG. 35, the pulse response achieves a small positive value (which cannot be seen on the plotted resolution). Experimentally, friction and flex circuit spring effects eliminate this constant velocity and cause the drive's head to stop moving. In this case, a constant term in consistent units equal to $K_{BEMF}C_{VSCALE}$ should be added to the voltage pulse response R so that it includes the effect of back EMF and allows for a more aggressive command.

An example computer code written in GAMS that may be used to solve equations 1 to 4 above for values of A is provided below in Appendix B. By solving the set of equations in Appendix B, a time optimal, unshaped current command can be generated. This set of equations can be solved in many different ways. For example, the entire set can be solved as a constrained optimization in which the goal is to generate the minimum time solution. This may also be performed without optimization by solving for a feasible solution (the first step of a Simplex solution, for example) and then reducing the length, N, of the solution vector until no answer can be found (a binary search may be used here). Another method is to determine a function that predicts the length of the solution and then, without any iteration, find a feasible solution. One such prediction function comprises the switch time equations set forth in Appendix A, described below. Another approach is to fit a curves to such a solution. In this case, an exact answer is not needed so long as the curve prediction functions overestimate the solution lengths and never underestimate the solution lengths.

It is also possible to solve for an optimal, unshaped command in real-time which is not in the system's fundamental limiting parameter. For example, we can solve for current (A) by setting a final value of the fundamental limiting parameter, here voltage (V), as follows (of course, the invention is not limited to use with current and voltage, any parameters can be used). This approach is based on the fact that the maximum current command output value is related to previous output values by the following relationship:

$$A(i) = \frac{V_{max} - \sum_{j=2}^{i} A(i+1-j)R(j)}{R(1)}, \quad (5)$$

where R is the voltage pulse response and $V_{max}$ is the maximum voltage $V_{lim}$ on acceleration (or any condition under which $A_{i+1} > A_i$) and $-V_{lim}$ on deceleration (or any condition under which $A_{i+1} < A_i$). Equation 5 assumes that the back EMF of the drive's voice coil motor is already included in R(j). The back EMF term may be added to R(j) as set forth above, if needed. Equation 5 can be further simplified since the R(j) values become insignificant after only a few samples. Consequently, an efficient approximation would only use a few samples of the R(j) series. If samples are dropped for an efficient approximation, the back EMF of the drive's voice coil motor times the number of dropped samples may be added to equation 5 to achieve an even more accurate result if that value is deemed significant.

A rigid body current command can be generated from equation 5 in a step-by-step fashion, where each response depends only on previous values. First the system is accelerated. Each current step is computed from equation 5. Next, the system is decelerated. This deceleration may be to zero for a constant velocity coast in the middle of the move or it may be a transition to negative deceleration and then to a stop. Deceleration is computed from equation 5 by reversing the sign of $V_{max}$. Under coast conditions, a second deceleration phase will be started (again using equation 5 with a negative value for $V_{max}$). Lastly, when deceleration is complete, the transition back to zero current is governed by equation 5 with a positive value, once again, for $V_{max}$.

The only unknowns in the previous equations are the times at which to transition between regions. There are several ways to solve these problems. Shaped™ switch times derived in section 6.9 below may be used as reasonable estimates for the transition times; although any curve fit or lookup table would also suffice. This lookup is especially useful given that on many disk drives, one current profile is often currently used and scaled for a range of seek distances. Additionally, using this approach the final position will not be exact and a zero velocity must be guaranteed. The problem of zero velocity means that an additional constraint must be used in computing the final values. Equation 5 defines the limit on the current value; therefore, in deceleration, for example, any value more negative than that value may be used without exceeding the limit. As a result, the final values can be chosen so that the sum of the current values equals zero (no residual velocity). The distance traveled will be incorrect (but very close). The last step is to scale the waveform linearly by the percentage error so that the final value is correct. This operation can even be performed as part of the next step, which is the shaping operation. The shaper can be scaled and then convolved with the rigid body current command. Another option is to increase the value of N, thus adding extra points, and directly solving for the extra A(i) values such that velocity equals zero and position equals "final position".

There are many variations to the above approach which may yield fewer computations. Also any vibration suppression technology can be subsequently applied to the rigid body current command. Furthermore, $V_{max}$ may be changed as the calculation progresses to optimize scaling. For example, with the knowledge that the current command is to be shaped (and thereby reduced in magnitude) a more aggressive value (higher $V_{max}$) can be computed.

Physical amplifiers have finite limits on the rate at which the voltage can change. The pulse response calculated above does not include such limits. It should be noted that a constraint on the rate of change of voltage in the current amplifier can be added to the equation set during numerical solution in the same manner as all of the other constraints. The slew rate becomes important when rapid transients of the input are allowed. The slew rate equation is simple. For example, an amplifier chip may limit at 1.25 volts per msec. The voltage constraint used in calculating the input is the minimum of either the voltage generated from the Voltage Limit Constraint above or (old_voltage+(A(I)–A(I–1))*Volt_Rate_Limit) with the correct unit conversions.

3.2 Rescaling of Current Inputs

The current commands generated in the previous section are completely scaleable. If for example, a 5 track seek has been created by generating an optimal current command and subsequently shaping it, a 4 track, shaped move can be made by simply rescaling the input by ⅘. The move time will be the same as that of a 4 track seek, however, the computation is simple. The point is that shaped moves can be scaled in amplitude and they will continue to reduce vibrations and acoustic noise.

4.0 Partial Fraction Expansion Equation System Model

Once a parameter in the system, such as the fundamental limiting parameter, has been identified, an input to the system in terms of that parameter can be generated. In order to generate an input which results in reduced system vibrations, it is first necessary to generate a set of simple equations that define the system. The first step in generating such system equations is to write the transfer function for a simple model of the system.

Figure 11:
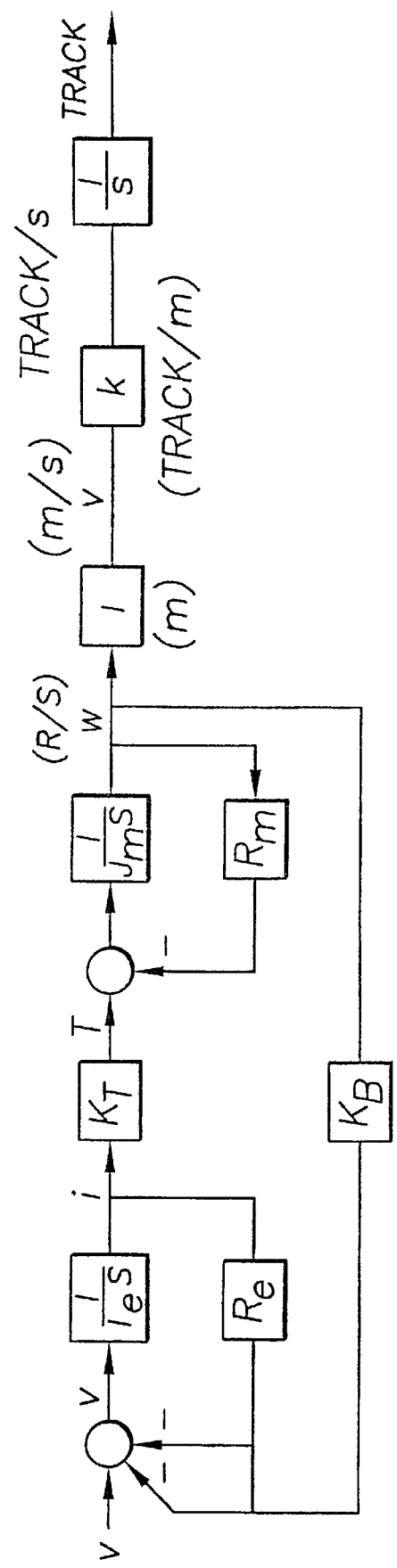
FIG. 11 is a feedback diagram of a computer disk drive.

FIG. 11 shows a third order model for a disk drive system such as that shown in FIGS. 10A and 10B. For system 80 shown in FIG. 11, a voltage V is input so as to control movement of head 9 to a particular track on a recording medium. To this end, blocks in system 80 convert voltage V into a current i, convert current i into torque τ, convert torque τ into frequency ω, convert frequency ω into velocity v, convert velocity v from meters-per-second into tracks-per-second, and convert tracks-per-second into a location of a particular track on a recording medium such as a magnetic disk.

To generate a set of equations for system 80, the transfer function H(s) therefor must first be determined. The transfer function H(s) for system 80 is as follows:

$$H(s) = \frac{K_t l k}{(I_e s^2 J_m + (I_e R_m + R_e J_m)s + R_e R_m + K_t K_b)s}, \quad (6)$$

where $K_t$ is the motor torque constant, $K_b$ is the back EMF constant, l is the actuator arm radius, k corresponds to track density on a recording medium, $I_e$ is the inductance of a voice coil in the motor, $J_m$ relates to inertia of the motor's rotor, $R_m$ corresponds to an amount of viscous friction in the motor, and $R_e$ corresponds to an amount of electrical resistance in the system.

Next, H(s) is written as an equivalent transfer function in terms of three parameters, namely A, a and b, as follows:

$$H_{eq}(s) = \frac{Aab}{s(s+a)(s+b)}, \quad (7)$$

where A corresponds to a scale factor and a and b correspond to inverse time constants. Specifically, in terms of the parameters in equation 6, A is defined as follows:

$$A = \frac{K_t l k}{R_e R_m + K_t K_b}. \quad (8)$$

Variables a and b correspond to two solutions in s, namely $s_1$ and $s_2$, to the following quadratic characteristic equation from equation 6:

$$I_e J_m s^2 + (I_e R_m + R_e J_m)s + R_e R_m + K_t K_b = 0. \quad (9)$$

After writing H(s) in terms of the equivalent transfer function $H_{eq}(s)$, a modal analysis or a partial fraction expansion is then performed on $H_{eq}(s)$ so that each pole of the system is in a separate tern. A partial fraction expansion for $H_{eq}(s)$ is follows:

$$H_{eq}(s) = \frac{A}{s} + \frac{Ab}{(-b+a)(s+a)} + \frac{Aa}{(-a+b)(s+b)}. \quad (10)$$

Each term of the expression for $H_{eq}(s)$ in equation 10 can then be written as follows:

$$F_1(s) = \frac{A}{s} \quad (11)$$

$$F_2(s) = \frac{Ab}{(-b+a)(s+a)}$$

$$F_3(s) = \frac{Aa}{(-a+b)(s+b)}.$$

From equations 11, a time domain response of each term to a unit step (e.g., to a unit voltage) input can be determined. This time domain response is as follows:

$$F_1(t) = At \quad (12)$$

$$F_2(t) = \frac{Ab}{a(-b+a)} - \frac{Ab}{e^{at}a(-b+a)}$$

$$= \frac{Ab}{a(-b+a)} *(1-e^{-at})$$

$$F_3(t) = -\frac{Aa}{b(-b+a)} + \frac{Aa}{e^{bt}b(-b+a)}$$

$$= \frac{Aa}{b(-a+b)} *(1-e^{-bt}).$$

System response to a unit impulse can also be obtained by differentiating the above "step response" equations with respect to time.

To solve equations 12 for a system input, values must be determined for $F_1(t)$, $F_2(t)$ and $F_3(t)$. Examination of the expressions for $F_1(t)$, $F_2(t)$ and $F_3(t)$ reveals that the expressions for $F_2(t)$ and $F_3(t)$ vanish as "t" approaches infinity in a case that the input to the system is zero, which is the case at the end time of a move (hereinafter referred to as time "$t_{end}$"). Since the input is zero at time $t_{end}$, responses of $F_2(t)$ and $F_3(t)$ decay after time $t_{end}$. Accordingly, in order to solve for a system input that will move the system to the correct location in a rest state, $F_2(t)$ and $F_3(t)$ should be set to zero at time $t_{end}$. Furthermore, since the input is zero after time $t_{end}$, the value of $F_1(t)$ stops changing at time $t_{end}$. The above two conditions are equivalent to zero velocity and zero acceleration (or current) at the end of the move.

Thus, in the equations for $F_1(t)$, $F_2(t)$ and $F_3(t)$, in a case of zero velocity and acceleration at the end of a move, only the term involving $F_1(t)$ contributes to the final position. An expression can then be written including the response of each mode, namely $F_1(t)$, $F_2(t)$ and $F_3(t)$, at a time corresponding to an end of the move, namely $t_{end}$, for a voltage $V_0$ input at $t_0$ and having transitions at $t_1$ and $t_2$. To this end, $XF_1(t_{end})$ set forth below defines the contribution of $F_1(t)$ to the position at time $t_{end}$, $XF_2(t_{end})$ set forth below defines the contribution of $F_2(t)$ to the position at time $t_{end}$, and $XF_3(t_{end})$ set forth below defines the contribution of $F_3(t)$ to the position at time $t_{end}$ $$XF_1(t_{end}) = V_0 F_1(t_{end} - t_0) - 2V_0 F_1(t_{end} - t_1) + 2V_0 F_1(t_{end} - t_2)$$

$$XF_2(t_{end}) = V_0 F_2(t_{end} - t_0) - 2V_0 F_2(t_{end} - t_1) + 2V_0 F_1(t_{end} - t_2)$$

$$XF_3(t_{end}) = V_0 F_3(t_{end} - t_0) - 2V_0 F_2(t_{end} - t_1) + 2V_0 F_1(t_{end} - t_2). \quad (13)$$

Thus, the total movement distance at time $t_{end}$ is expressed as $$XF_1(t_{end}) + XF_2(t_{end}) + XF_3(t_{end}). \quad (14)$$

As noted above, the expressions for $F_2(t)$ and $F_3(t)$ vanish as "t" approaches infinity in a case that the input is zero, i.e., at the end of a move. Thus, in equations 13, only the term involving $F_1(t)$ contributes to the final position as time approaches infinity. This results in the following three constraint equations that must be satisfied in order for a third order system to reach its desired final position in substantially minimal time, with substantially zero velocity and acceleration $$XF_1(t_{end}) = \text{Finalpos}$$

$$XF_2(t_{end}) = 0$$

$$XF_3(t_{end}) = 0, \quad (15)$$

where Finalpos denotes the end (or "final") position of the system. These equations correspond to rigid mode motion constraints since they achieve a final to position in the third order model with substantially zero velocity and acceleration.

Figure 24:
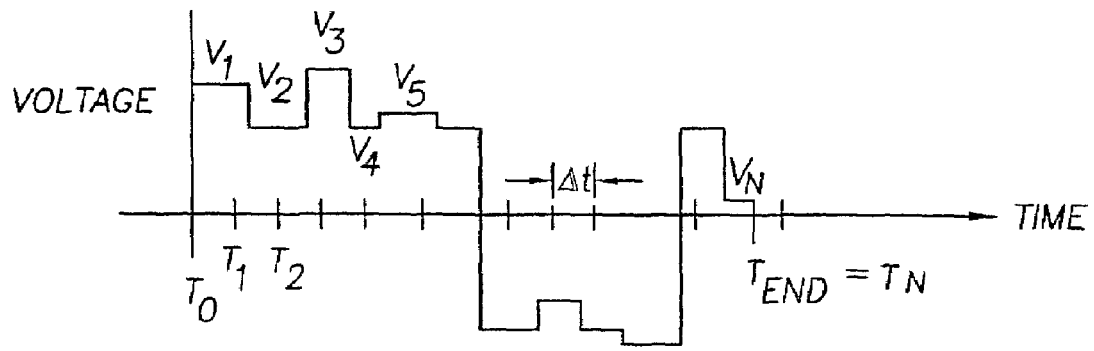
FIG. 24 shows a digitized input voltage waveform.
Figure 25:
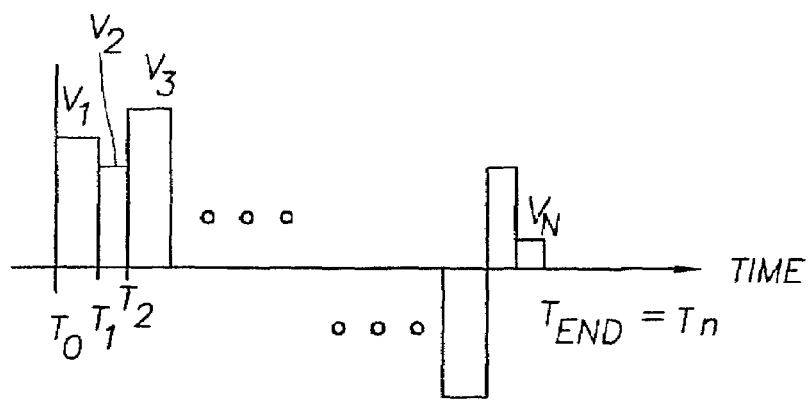
FIG. 25 shows the waveform of FIG. 24 conceptualized as a series of pulses.
Figure 26:
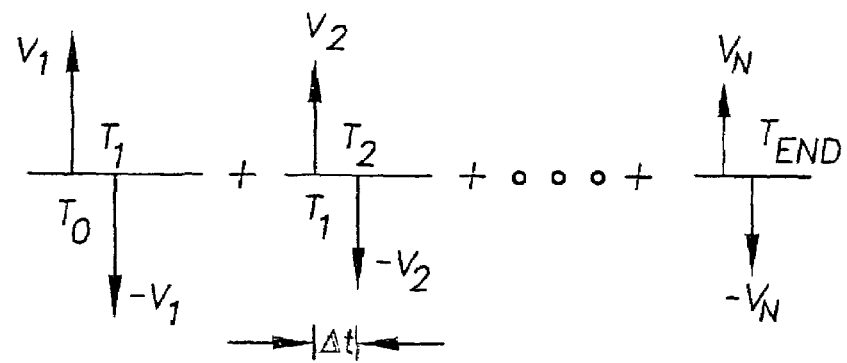
FIG. 26 shows each of the pulses of FIG. 25 represented as a pair of impulses.

A digital model of the response of a disk drive system to a unit impulse may be derived based on the foregoing FIG. 24 shows a digital voltage input waveform. The waveform of FIG. 24 can be conceptualized as a series of pulses as shown in FIG. 25. Each of these pulses can be represented as a pair of impulses, as shown in FIG. 26. A first digital constraint is formed by realizing that the system's final position, Finalpos, is proportional to the area enclosed by the voltage waveform, i.e., the integral of the voltage waveform. The area of the voltage waveform can be determined by inspection of the waveform shown in FIG. 24. Specifically, the area is determined as follows $$\text{Finalpos} = \sum_{i=1}^{N} V_i A \Delta t, \quad (16)$$

where "$V_i \Delta t$" corresponds to an area of a pulse "i". Negative values of $V_i$ subtract from the overall sum.

The remaining two digital constraints can be formed using the impulse summation form of the voltage waveform shown in FIG. 26. Specifically, as noted above, the impulse response of the system can be determined by taking the derivatives of step response equations. For $F_2(t)$ and $F_3(t)$ above, the impulse response equations are as follows:

$$\frac{d}{dt}(F_2(t)) = \frac{Ab}{b-a} e^{-at} \quad (17)$$
$$= F_2'$$

$$\frac{d}{dt}(F_3(t)) = \frac{Aa}{a-b} e^{-bt}$$
$$= F_3'.$$

In accordance with constraint equations 12, the response of the series of impulses of the voltage summation form of the voltage waveform, evaluated at time $t_{end}$, is set to zero in order to form the second and third digital constraints, as follows:

$$0 = \sum_{i=1}^{N} V_i(F_2'(T_{end} - T_i + \Delta t) - F_2'(T_{end} - T_i)) \quad (18)$$

$$= \sum_{i=1}^{N} V_i \frac{Ab}{b-a}(e^{-a(T_{end}-T_i+\Delta t)} - e^{-a(T_{end}-T_i)})$$

$$0 = \sum_{i=1}^{N} V_i(F_3'(T_{end} - T_i + \Delta t) - F_3'(T_{end} - T_i))$$

$$= \sum_{i=1}^{N} V_i \frac{Aa}{a-b}(e^{-b(T_{end}-T_i+\Delta t)} - e^{-b(T_{end}-T_i)}).$$

Thus, partial fraction expansion equations corresponding to a digital model of the response of a disk drive system to a unit impulse comprise:

$$\text{Finalpos} = \sum_{i=1}^{N} V_i A \Delta t \quad (19)$$

$$0 = \sum_{i=1}^{N} V_i \frac{Ab}{b-a}(e^{-a(T_{end}-T_i+\Delta t)} - e^{-a(T_{end}-T_i)})$$

$$0 = \sum_{i=1}^{N} V_i \frac{Aa}{a-b}(e^{-b(T_{end}-T_i+\Delta t)} - e^{-b(T_{end}-T_i)}),$$

where Finalpos, A, a, b and $t_{end}$ are as previously defined, $V_i$ are voltage inputs to the system, $T_i$ are the times at which $V_i$ are input, and $\Delta t$ is a time interval at which $V_i$ are input.

Equations 19 can be used to solve for system inputs $V_i$ which result in substantially zero velocity and acceleration at the end of a move. These equations can be solved in a number of ways. For example, the equations can be solved using a linear programming method, either on their own or in conjunction with a variety of other constraints. Examples of such constraints include vibration constraints and physical constraints such as power consumption or heat buildup, etc. Also, the continuous form of the equations can be solved for voltage switch times, as described in more detail below.

5.0 Generating "Good Moves"

The techniques set forth in sections 3 and 4 above determine inputs to a system that utilize substantially the full capabilities of the system actuators and that reduce system vibrations (both mechanical and acoustic). Several techniques can be used, either alone or in conjunction with the techniques presented above, to generate (or enhance) system inputs to reduce system vibrations even further.

For the purposes of the subject application, a "good move" is defined as a movement of a system component along a trajectory from an initial position to a nominal final position, such that, at the time the component reaches its nominal final position, the component is vibrating at or below an acceptable level, possibly subject to one or more predetermined constraints. In the context of computer disk drives, this means that, as soon as the drive's head reaches its nominal final position, the head is ready to perform a read/write operation to a recording medium. A good move is also one in which acoustic noise excited by the move is at or below an acceptable threshold. In contrast, a "bad move" is, for example, a move in which the component is vibrating at an unacceptable level when the component reaches its nominal final position. In the context of computer disk drives, this means that at the time the drive's head reaches its nominal final position, the head is vibrating at a level which is too high to perform a read/write operation accurately. A bad move is also one in which the acoustic noise excited by the move is above an acceptable threshold.

A powerful result of the approach outlined herein is that a rigid body command may be calculated by one of a number of techniques including equations 19 or the current mode technique of section 3.1. Next, other dynamics, such as flexible modes, acoustic modes or other dynamic effects can be subsequently corrected by the various methods set forth below. For disk drives, the process comprises, e.g., determining, over a population of drives and for each move length (or range of move lengths), which frequencies can be heard and which effect settling time. Then, moves may be generated that limit the amplitude of those frequencies or some subset thereof. Frequencies that only appear in a subset of the drives may also be included or turned-on selectively. The effects of the selected frequencies can be reduced by applying any of the techniques set forth below.

5.1 Vibration Limiting and Sensitivity Constraints

This technique for generating a good move incorporates physical constraints into a system model. One such model comprises partial fraction expansion equations 19 derived above. To generate a good move in accordance with this technique, the first step is to choose one or more physical constraints. Examples of physical constraints include constraints that limit vibration (both mechanical and acoustic) and constraints for insensitivity to parameter variations.

Constraints for insensitivity to parameter variations can be added to the system equations in several ways. For example, derivatives of the partial fraction expansion equations can be taken with respect to a particular parameter and then added to the constraint equations. This technique is set forth in detail in U.S. Pat. No. 5,638,267, issued to Singhose et al. on Jun. 10, 1997, the contents of which are hereby incorporated by reference into the subject application as if set forth herein in full, and in U.S. Pat. No. 4,916,635, issued to Singer et al. on Apr. 10, 1990, the contents of which are also hereby incorporated by reference into the subject application as if set forth herein in full. Additionally, a sampling technique can be used to set a series of constraints for different values of a given parameter so as to limit the solution for a variation in that parameter. For example, using this technique, 10% insensitivity at 1000 Hz can be achieved by setting constraints at 900 Hz, 920 Hz, etc. up to at least 1100 Hz. One variation of this technique is set forth in U.S. Pat. No. 5,638,267.

In accordance with the invention, constraints can be chosen so as to reduce system vibrations by substantially 100% or to limit reduction in system vibrations to a percentage which is less than 100%, say, between 50% to 70%. Which constraints are used to reduce system vibrations by such amounts can be determined experimentally or by running a computer simulation for the system. Choosing constraints that reduce system vibrations by less than 100% (e.g., a range of 50% to 70%) is particularly useful in cases where excessive vibrations do not occur in the system and in cases where large reductions in vibrations, including noise-inducing vibrations, are not required. In these cases, since the constraints are more relaxed, the resulting system input is shorter in duration. As a result, the system moves faster than it would otherwise. In general, there is a trade-off between move time and the use of stringent constraints. That is, while the use of more stringent constraints may further reduce vibrations, move time is slowed as a result of their use.

Vibration constraint equations may also need to be scaled in order to achieve desired vibration reductions. Specifically, in terms of the foregoing model of a disk drive system, equations for vibration amplitude are relative. This is because the rigid mode equations do not take into account flexible body equations (described below in section 6.3). If a full set of equations (i.e., both rigid and flexible body equations) were derived for the system, and then a partial fraction expansion applied thereto, the coefficients of the vibrational terms would scale to the problem. However, since the equations were derived separately and later combined using the techniques described herein, the relative scaling is not known for the equations given above, and the problem must be scaled manually. In the case of zero vibrations, no scaling is necessary. For any other case, one of several scaling methods may be used. For example, an arbitrary gain may be selected and a resulting sequence applied to the system. The resulting vibrations can then be measured and the vibration constraint equations multiplied by a ratio of a predicted vibrational level divided by an actual measured vibrational level.

By way of example, consider the fourth order transfer function shown below in equation 20. The transfer function corresponds to the position response of a simple mass-spring-mass system to a force input.

$$H(s) = \frac{C}{s^2} * \frac{\omega^2}{s^2 + 2z\omega s + \omega^2} \tag{20}$$

The first term of the transfer function, namely $$\frac{C}{s^2}, \tag{21}$$

corresponds to the rigid body motion, while the second term, namely $$\frac{\omega^2}{s^2 + 2z\omega s + \omega^2}, \tag{22}$$

corresponds to a vibratory mode with undamped natural frequency "$\omega$" and damping ratio "$z$". When transfer function 20 is expanded in a partial fraction form, the following three terms result:

$$H(s) = \frac{-2zC}{\omega s} + \frac{C}{s^2} + \frac{C(-\omega + 4z^2\omega + 2zs)}{\omega(s^2 + 2z\omega s + \omega^2)}. \quad (23)$$

The third term from equation 23, namely, $$\frac{C(-\omega + 4z^2\omega + 2zs)}{\omega(s^2 + 2z\omega s + \omega^2)}, \quad (24)$$

corresponds to the transfer function of the vibratory mode, and should be compared to the second order vibratory term included in the original transfer function. Using inverse Laplace transformation, the time domain impulse response of the vibratory mode is determined as $$\frac{-Ce^{-z\omega t}\sinh\left(\omega\sqrt{-1+z^2}\, t\right)}{\omega\sqrt{-1+z^2}} +$$

$$\frac{2Cz^2 e^{-z\omega t}\sinh\left(\omega\sqrt{-1+z^2}\, t\right)}{\omega\sqrt{-1+z^2}} + \quad (25)$$

$$\frac{2Cz e^{-z\omega t}\cosh\left(\omega\sqrt{-1+z^2}\, t\right)}{\omega}.$$

Using suitable trigonometric identities, the time domain response of the vibratory mode in equations 25 can be simplified as follows:

$$\frac{-Ce^{-z\omega t}\sin(\omega_d t)}{\omega_d} + \frac{2Cz^2 e^{-z\omega t}\sin(\omega_d t)}{\omega_d} + \frac{2Cz e^{-z\omega t}\cos(\omega_d t)}{\omega}, \quad (26)$$

or, after collecting terms, to:

$$Ce^{-z\omega t} * \left[\frac{(2z^2 - 1)\sin\omega_d t}{\omega_d} + \frac{2z\cos\omega_d t}{\omega}\right], \quad (27)$$

where "$\omega_d$" is the damped natural frequency $$\omega_d = \omega\sqrt{1-z^2}. \quad (28)$$

The impulse response expression derived above can be used directly to form a quantified constraint equation; i.e. the magnitude of the constraint equation can be set to be less than or equal to an actual vibration level in position.

It should be noted that the general form of equation 27 is a phase shifted sine wave of frequency $\omega_d$. The sine wave is further subject to a decaying exponential envelope with time constant $$\frac{1}{z\omega}. \quad (29)$$

Equation 27 can be rewritten again, including the phase shift $\phi$ and scale factor $C_1$, as follows:

$$C_1 e^{-z\omega t}\sin(\omega_d t + \phi). \quad (30)$$

This form of equation 27 should be compared with the expression for the impulse response of an isolated second order system (as defined by the second term of the original transfer function H(s)

$$\left.\frac{\omega^2}{s^2 + 2z\omega s + \omega^2}\right) \quad (31)$$

shown below:

$$\frac{\omega}{\omega_d} * e^{-z\omega t}\sin(\omega_d t + \phi). \quad (32)$$

Since we are only concerned with the magnitude of the residual vibration, phase shift $\phi$ is of no importance, and the expression for the isolated second order system can be used in the formulation of quantified constraints if the scale factor $\omega/\omega_d$ is replaced by $C_1$. Parameters $C_1$, $z\omega$ and $\omega_d$ can be determined experimentally by (i) subjecting the actual system to an impulse input, and from experimental data, (ii) estimating the period of vibration and computing $\omega_d$ as follows $$\omega_d = \frac{2\pi}{\tau}, \quad (33)$$

where $\tau$ is the period, (iii) estimating the decay envelope to determine $z\omega$, and (iv) estimating actual amplitude to determine $C_1$.

After constraints have been chosen based on the foregoing criteria, a trajectory is digitized and is then solved for each trajectory command value in time subject to the chosen constraints. Digitization of the trajectory results in simpler, and often linear, equations that can be solved readily for the complete system trajectory. The invention, however, is not limited to solving the system equations in this manner. That is, any known technique for solving the system equations can be employed in the context of the present invention. The digitization rate used is a factor that contributes to the successful implementation of the invention. This issue is discussed in section 7.1 below.

5.2 Input Shaping™

This technique for generating good moves uses Input ShapingT™ and its substantial equivalents. One example of Input Shaping™ comprises convolving a function with a system input in order to reduce unwanted system vibrations. Examples of system inputs include current and voltage. Specific Input Shaping™ methods are set forth in detail in U.S. Pat. Nos. 5,638,267 and 4,916,635, which were incorporated by reference above.

In accordance with this technique, an input to a system, such as a voltage command or a velocity, is shaped in order to produce a desired output. For example, the input may be Input Shaped™ by convolving the input with an impulse sequence which reduces unwanted vibrations in the system, including its flexible modes Alternatively, the input may be shaped using any one or more of the filtering techniques presented herein, or using any other known command profiling techniques.

5.3 Filtering

In addition to Input Shaping™, as noted above, any type of conventional shaping method can be used to generate an input that results in a good move. For example, it is also possible to generate a good move by filtering a trajectory with infinite impulse response ("IIR") or finite impulse response ("FIR") filters, including filters where there are zeros near poles of the system, such as those described below.

5.4 Least Squares Solution to Frequency Sampling

A conventional least squares approach can also be used to generate an input that results in a good move for a computer disk drive system. An example of such an approach is provided in U.S. Pat. No. 5,638,267. This approach may also be used to limit high mode excitations.

5.5 Selective Shaping™

Input Shaping™, filtering, and the like can increase seek time in some cases. However, the length of an Input Shaper™ is directly related to the period of the vibration being reduced. At low frequencies, i.e., long periods, the increase in seek time caused by an Input Shaper™ can be a substantial percentage of the total seek time. This is of particular significance in relation to computer disk drives. That is, in computer disk drives, relatively low frequency vibrations can occur due to compliance of the drive's mounting in its enclosure. For example, a 200 Hz mounting resonance will have a period of 5 ms. In this case, a three-pulse Input Shaper™ will also have a period of 5 ms. Thus, if the computer disk drive has an average seek time of 10 ms, the drive's average seek time will increase by 50% if the Input Shaper™ is applied to all moves.

In view of the foregoing, it is advantageous to apply Input Shaping™ selectively. This is possible because not all moves result in unwanted vibrations. That is, some moves are inherently good, meaning that they produce relatively few vibrations, and some moves are inherently bad, meaning that they produce excessive vibrations. By evaluating constraint equations for a given move, whether that candidate move is good or bad can be predicted in advance. That is, a move can be evaluated to determine whether the move excites greater than a predetermined level of vibrations in the system. Input Shaping™ can then only be applied to moves that excite greater than the predetermined level of vibrations. Thus, only those moves exciting greater than the predetermined level of vibrations, e.g., the bottom 30% of the moves, need be Shaped™.

By virtue of the foregoing, the present invention provides the advantages flowing from using Input Shaping™ with less of an increase in seek time than would otherwise be achievable. Moreover, in accordance with the invention, a level of Input Shaping™, or the numbers and types of constraints, may be altered depending upon how good or how bad a move is, i.e., depending upon the level of vibrations that the move excites. For example, if a move only requires minimal Input Shaping™, lengths of impulse sequences used to Input Shape™ the move may be reduced.

Figure 12:
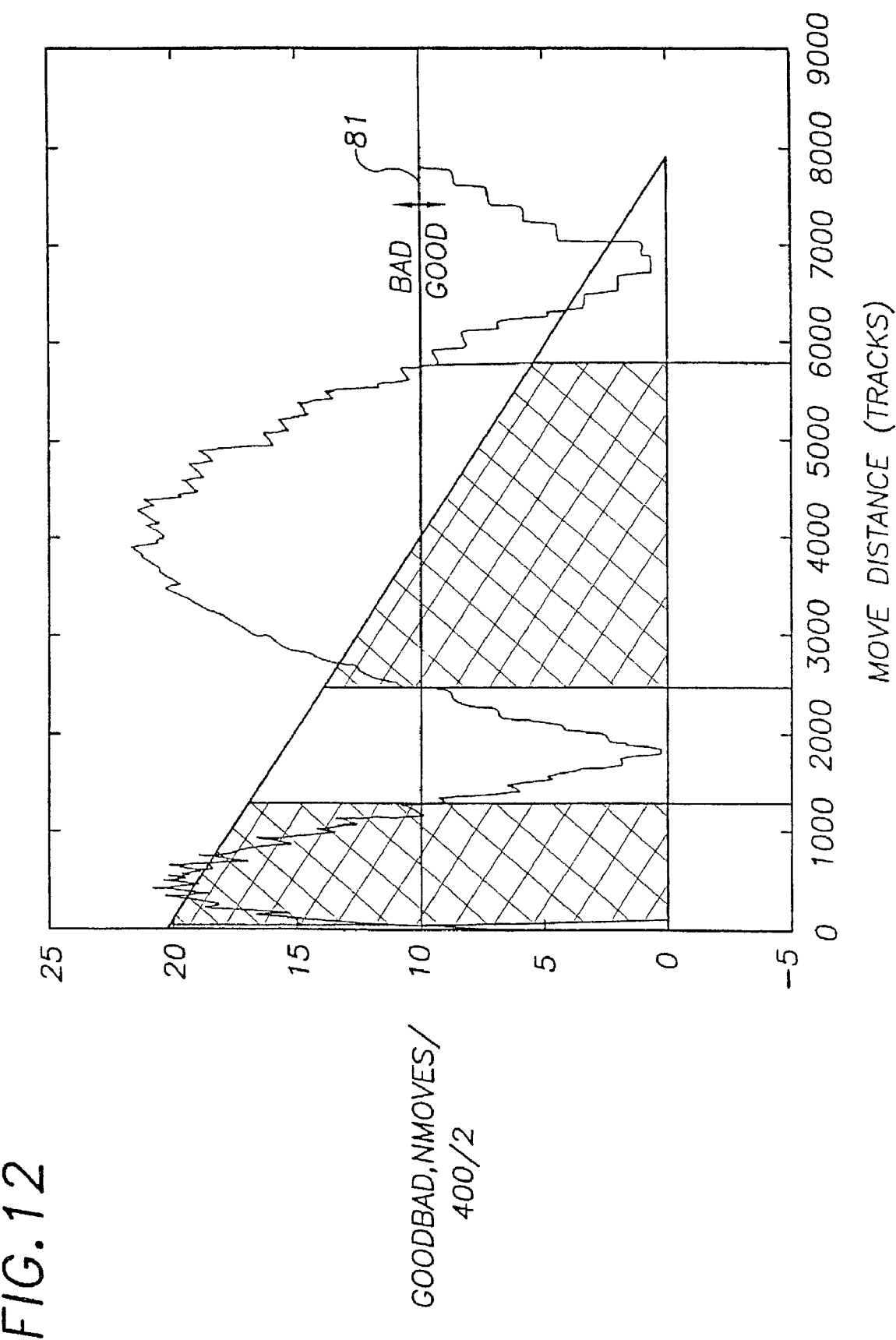
FIG. 12 shows a plot of "good" moves versus "bad" moves for different movements made by a computer disk drive.

In the context of computer disk drives, for a given frequency of interest, a measure of the goodness of a move can be evaluated by examining a superposition of components of an input at the frequency of interest. An example of such a superposition is shown in the graph of FIG. 12, in which the frequency of interest is 200 Hz, and in which a good move/ bad move threshold is labeled 81. By examining threshold 81, it is evident that movement distances within a range around 1800 tracks and 7000 tracks are inherently good moves. On the other hand, movement distances requiring vibration reduction are identified in FIG. 12 by cross-hatching. For these movement distances, the amount of vibration reduction required is determined by taking a ratio of a move's goodness level to the good/bad threshold. The magnitude of the Input Shaper™ required for each movement distance is determined based on this ratio.

Specifically, the magnitude of an Input Shaper™ response can be equated to a desired reduction in vibrations ("mag") to derive an expression for a modified Input Shaper™. The expression for the period, τ, of a modified two-pulse Shaper™ is as follows $$\tau = \frac{\arccos(2mag^2 - 1)}{2\pi f}. \tag{34}$$

It is noted that the above expression is closed form and, therefore, is suitable for on-line, real-time implementation. For unity magnitude Shapers™ (mag=1) in which no vibration reduction occurs the foregoing expression yields $$\tau = 0, \tag{35}$$

and the two pulses are co-incident at time t=0. For zero magnitude Shapers™ (mag=0) in which 100% vibration reduction occurs, the foregoing expression yields $$\tau = \frac{1}{2f}, \tag{36}$$

or ½ period. At intermediate values of mag, the expression yields intermediate values of the Shaper™ period τ. For example, when mag=0.5, $$\tau = \frac{1}{3f}. \tag{37}$$

At this point, it is noted that although two and three impulse Input Shapers™ are described above, the invention can use Input Shapers™ having more than three impulses as well as to shapers designed using other techniques. It is also noted that although the invention has been described with respect to Input Shaping™, any shaping technique may be used. For example, moves that are considered bad moves could be selectively shaped using an FIR filter, an IIR filter, any shaper, or even just extended in some arbitrary way to achieve the goals of the present invention. In addition, constraints, such as vibration limiting constraints or the like, may be selectively added to the system equations based on whether a move has been identified as good or bad, and the resulting set of equations can be solved for a complete move trajectory. The moves also may be solved off-line and tabulated to achieve the same benefit.

5.6 Voltage Control by Forcing Switch Times

Disk drives operate in a current command mode, meaning that their operation is controlled by current commands. Since saturation is in voltage, conventionally there is no way to determine if a particular current command will saturate the system (notwithstanding section 3.1 above). Accordingly, commanding the system in current can fail to produce a desired movement. The invention addresses this problem by commanding a current that is guaranteed to saturate a voltage input to the system. In this way, the invention is able to command voltage in either direction. That is, it is possible to provide current commands to the system, but actually to be commanding voltages switches.

In more detail, many disk drive systems utilize a closed-loop current control system to control current through a voice coil motor. A closed-loop controller in such a system makes it possible to specify a current command that, when applied to the motor, results in a constant torque. Specifically, the closed-loop controller adjusts the voltage through the motor to maintain a desired current level. However, there are limitations to such a controller. Specifically, the maximum voltage available to the controller is limited by the power supply used in the disk drive. Thus, if the voltage required to achieve a particular current is above the power supply's maximum voltage, the controller will saturate at the maximum voltage and the desired current will not be achieved.

While the foregoing may be perceived as a drawback, it can actually be an advantage, since the saturation can be used to operate the current controller in an alternative mode in which power supply voltage is simply applied to the motor's terminals. That is, the controller is operated as an open-loop voltage switching system, instead of as a closed-loop current control system. As a result, it is possible to create an alternative formulation for control strategies and motion profiles. This technique of using current control to command voltage has the additional benefit that voltage commands can be used during disk drive seek; however, a normal current command mode is still available for tracking without changing any system hardware.

Use of the open-loop voltage control technique described above may require a series of precisely-timed commands to achieve vibration suppression effects. Section 7.1 below presents a variety of techniques for implementing such precisely-timed commands. If the commands are not in the fundamental limiting parameter of the system, then section 3.1 may also be used to generate such commands. If the commands are in the fundamental limiting parameter, then the techniques of sections 4 and 5 can be used.

In this regard, the fundamental limiting parameter is often not used to command the system due to hardware constraints (e.g., the tracking controller in a disk drive system is designed for current, not voltage, commands). In the case of a disk drive, by modifying the drive's amplifier, it is possible to use voltage commands during one mode of operation, e.g., drive seek operations, and to switch to current commands during another mode of operation, e.g., drive tracking operations. Thus, for example, the techniques of section 3.1 can be used during a tracking operation and the techniques of sections 4 and 5 can be used during a seek operation.

5.7 Other Techniques

In addition to the foregoing techniques, other techniques may also be used to generate (or enhance) an input to produce a good move. For example, it is possible to adjust any of the above techniques using real-time identification of any system parameters. Specifically, a system parameter, such as temperature or resistance, may be identified, and that parameter addressed when generating a good move. Additionally, symmetric and multi-step (i.e., Posicast) inputs can be used to generate a good move. As set forth in section 11 below, transient portions of the input or feedforward signal at the beginning, middle and/or end of a move may also be varied in order to reduce vibrations resulting from the move. Additional constraints may also be added to the system in order to control vibrations. For example, these constraints can be symmetric and can be a function of time or position and/or can relate to thermal limits, current limits, duty cycle, and/or disk drive ZV constraints. Moreover, it is noted that since each transition of an input corresponds to a complete move in and of itself, any of the above techniques for generating a good move set forth above can be performed in real-time, and the Shaping™ and filtering methods described above can be performed only on the rapid transient portions of the move. See section 11 below.

The Shapers™ and filters described above are preferably stored in a memory as computer-executable process steps, and executed by a processor in the system. However, the invention can also be implemented in a fuzzy logic controller by embedding either an Input Shaper™ or direct solutions to systems of constraint equations in a fuzzy logic block. Similarly, the invention can be implemented in a neural network controller that can be constructed by imbedding either an Input Shaper™ or direct solutions to systems of constraint equations into a neural network. Both the fuzzy controller and the neural network PV controller can be designed to handle non-linear system parameter variations which enter into equations for a system.

6.0 Controlling Trajectory as a Function of Time

This aspect of the invention is directed to a control technique for reducing unwanted vibrations in a dynamic system by controlling a trajectory which is specified as a function of time. More specifically, in this aspect of the invention, an input that corresponds to a good move is used as feedforward trajectory for the system. Any of the above techniques for generating inputs corresponding to a good move may be used to modify inputs in the following control system. However, for the sake of brevity, only Input Shaping™ will be described in detail. Moreover, although the invention can be used to control any dynamic system, a description will be provided only for a computer disk drive system, again for the sake of brevity.

6.1 Optimization

One approach to generating an input that will result in a fast response in a computer disk drive is to perform an optimization using partial fraction expansion equations 19. To perform the optimization, these equations are augmented by including a set of constraints to address vibrations in various modes of the system. In addition, constraints may be added for vibrations in modes that are near a predicted vibrational mode and for real world conditions, such as voltage limits. A digital formulation of the problem can then be modeled so as to make all of the constraints linear, thereby simplifying their solution. The digitization rate may be selected using the techniques presented in section 7.1.

The invention is not limited to methods for performing optimization described herein. Rather, any optimization technique may be used. For example, other methods for implementing optimization which can be used in conjunction with the present invention include off-line computation and use of efficient linear solving codes on the disk drive controller. It is also possible to generate a series of solutions off-line and to fit curves to the solutions. Appendix C shows a set of linear equations written in GAMS that can be solved for ZVD constraints on a problem in which voltage is the commanded input.

6.2 A Related Approach

The partial fraction expansion model of a disk drive system shown above can also be used in conjunction with Input Shaping™ in order to generate system inputs. For example, in an article entitled "Fast Servo Bang-Bang Seek Control" by Hai T. Ho, ©1997, IEEE, the contents of which are hereby incorporated by reference into the subject application, it was demonstrated that near the end of a move, the instantaneous state of a system can be measured. Inputs to the system can then be calculated so as to bring the system to its final location with limited vibrations. The flaw in this technique, as presented in the article, is that exact solutions to the disk drive system equations could not be obtained because a second order system model was assumed. Since a disk drive system is more accurately modeled as a third order system, this technique could result in inputs which did not sufficiently limit vibrations or which resulted in the system reaching a nominal final position without coming to rest. By use of the partial fraction expansion model presented in section 4, a more precise solution to the system equations can be obtained, thereby resulting in relatively fewer vibrations when the system reaches its final location. Moreover, insensitivity constraints can be added to the foregoing equations by a variety of techniques, e.g., by sampling (as discussed in section 6.7), by taking derivatives (as discussed in U.S. Pat. No. 4,916,635), or any other approach, thereby leading to robust solutions of the equations and still fewer resulting vibrations.

6.3 Rigid and Flexible Mode Problem

Another approach which uses Input Shaping™ in conjunction with the partial fraction expansion model of section 4 is to separate the problem into a rigid mode problem and a flexible mode problem. Examination of modal terms associated with a disk drive reveals terms similar to a third order system, e.g., $F_1(t)$, $F_2(t)$ and $F_3(t)$ from equations 12, plus additional terms associated with oscillating or vibrational modes, e.g., $F_4(t)$, $F_5(t)$, etc. (not shown). The present invention separates these terms into two sets. The first set, which defines the rigid mode of the system, includes the third order system modal terms, i.e., $F_1(t)$, $F_2(t)$ and $F_3(t)$. The second set, which defines the flexible modes of the system, includes the other modal terms, i.e., $F_4(t)$, $F_5(t)$, etc. The partial fraction expansion equations in section 4 can be solved for inputs which drive the system so as to satisfy rigid body motion constraints $F_1(t)$, $F_2(t)$ and $F_3(t)$ and thereby achieve a final position with substantially zero velocity and acceleration. However, vibrations resulting from the other modes, namely $F_4(t)$, $F_5(t)$, etc., can still be problematic.

More specifically, the partial fraction expansion equations cannot be solved for an input which reduces vibrations in the flexible modes without adding additional constraints for each additional mode. However, adding additional constraints increases the complexity of obtaining the solution. Additionally, if curve fit or empirical solutions are to be obtained, the solution is increasingly more complicated for each additional constraint that is imposed. Therefore, in order to reduce vibrations in the flexible modes without substantially increasing the complexity of obtaining a solution, the present invention first solves the rigid mode equations in order to determine system inputs. Next, the determined system inputs are shaped using an Input Shaper™ designed for the flexible modes of the system. For example, the Input Shaper™ may be designed based on frequency and damping ratios of $F_4(t)$, etc. above.

The partitioning of $F_1(t)$, $F_2(t)$ and $F_3(t)$ into the rigid mode and $F_4(t)$, $F_5(t)$, etc. into the flexible mode is merely an example of one way to partition the system's modeled modes. The invention is not limited to such definitions. In fact, the partitioning of modes can vary depending upon the system under consideration as well as various other factors. For example, it is possible to derive a second order system input based on a system model that includes only $F_1(t)$ and $F_2(t)$ in the rigid mode and that includes $F_3(t)$, $F_4(t)$, etc. in the modes that are addressed using Input Shaping™. Such a formulation would be of particular advantage in the case where $F_3(t)$ corresponds to a system's electrical time constant, since Input Shaping™ could be used to correct variations in the system's electrical time constant.

6.4 Center of Mass

In the rigid mode of a system, problems may arise because various components of the system are moving relative to one another. For example, in the case of a computer disk drive, vibrations may be induced in the system because the motor's rotor is moving out of phase with an endpoint, such as the read/write head. This will cause problems during feedback if a rigid body model is assumed. That is, if the endpoint alone is used as feedback, the deflection that is observed will be fed back and cause corrections that are not required and thus may be detrimental to system performance. To reduce such errors, the present invention estimates the center of mass of the system and uses the estimated center of mass, rather than an endpoint, as the system's feedback. One way to estimate the center of mass of the system is to calculate a state estimator using modern control techniques. A wide range of correction factors, such as a quasi-static correction factor similar to that described below, can be applied to improve the estimate of the center of mass coordinate.

The center of mass coordinate estimated above will not reflect the vibrations of the rotor nor those of the endpoint. Consequently, the rigid body behavior of the system can be decoupled from most all vibrations (including acoustics) in order to allow for more accurate feedback control than has heretofore been possible.

6.5 Quasi-Static Correction

On the other hand, if endpoint feedback, rather than center-of-mass feedback, is used in the system, vibration-reducing inputs to the system, such as those generated in accordance with the techniques set forth herein, can cause unusual side effects. That is, the component at the endpoint (e.g., the head in the case of a disk drive) does not vibrate. Rather, the component deflects during the move. The deflection is in one direction during acceleration phases and in another direction during deceleration phases. The feedback signal to the controller is measured based on this deflection. As a result, if the system controller uses this feedback signal to compare to a trajectory, the controller will detect an error even if none exists. To correct this problem, a quasi-static correction factor may be added to, or subtracted from, the feedback signal depending on the amplitude and the direction of acceleration.

6.6 Closed-loop Control

By adopting a control strategy in which a trajectory is specified as a function of time, a closed-loop system formulation can be made. As shown, for example, in FIG. 11, feedback loops may be closed around any combination of system states. In the case of a disk drive, these states include voltage, current, acceleration, velocity, and position. An input which corresponds to a good move can then be generated based on the closed-loop formulation. This "good" input, which, in the case of a computer disk drive, may be a voltage input, is used to generate feedforward signals to some or all of the closed-loops.

Feedforward trajectories for each of the parameters to be used as a feedforward term are derived from a trajectory selected as a "good" move. The technique for generating feedforward trajectories may be based on either a simple simulation of the system or the partial fraction expansion model set forth in section 4. When generating a good input, it may be desirable to compute a move assuming that less voltage (or whatever physical variable is limited by reality) is available. This increases the chances that the system will stay on a trajectory corresponding to the good move. Another approach to generating a good input is to assume full voltage (or whatever physical variable is limited by reality) and to assume safe values for the physical system parameters used in the model. In this case, full voltage would only be used if the parameters were the worst case possible. At all other nominal cases, a lower voltage would be used.

In the closed-loop control model, the feedforward terms for each loop could be replaced by only one feedforward (or input) to the outer loop, where this one feedforward term is computed as a combination of each of the other feedforward terms. Also, feedforward inputs for the system could be scaled differently for each system parameter. For example, different gains could be used for each of velocity, position, acceleration, current, and voltage feedforward terms. The selection of gains adds zeros to each feedforward term. Since Input Shaping™ is a method of placing zeros in certain locations using a constraint based technique, it is understood that the gains selected for the feedforward terms can be chosen to add zeros which serve to augment Input Shaping™. This technique would lower the requirements on any Input Shaper™ used, or enable fewer constraints to be used in the derivation of complete trajectories.

Figure 27:
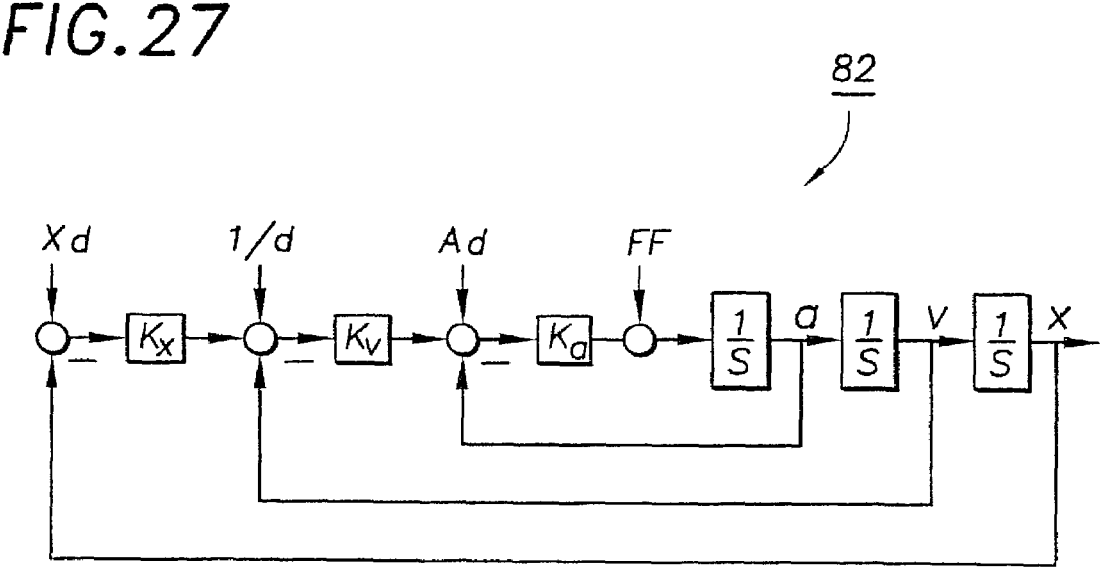
FIG. 27 shows a block diagram of a feedback system.

Shown in FIG. 27 is a block diagram of a simple system, namely system 82, that will be used to demonstrate how a collection of feedforward signals can be used to effect zeros in a transfer function. In system 82, the variable to be controlled is the output position x, there is a feedforward input FF, and there are three command inputs, namely position input $x_d$, velocity input $v_d$, and acceleration input $a_d$. There is also full state feedback of position x, velocity v, and acceleration a. In the ideal case, the feedforward input FF will cause the system to follow a desired trajectory (x, v, a) through state space. If the actual trajectory does not match the desired trajectory, then error terms $(x_d-x)$, $(v_d-v)$ and $(a_d-a)$ will be multiplied by gains $K_a$, $K_v$ and $K_a$ to generate corrective inputs. If the inputs $v_d$, $a_d$ and FF are all set to zero, the system will still "track" the remaining command input $x_d$, but likely with larger position error.

The command inputs, $x_d$, $v_d$ and $a_d$, and the feedforward input FF are produced by another process and are simply inputs to the system. However, the command inputs $x_d$, $v_d$ and $a_d$ are mathematically related as derivatives. Their relationship is indicated in the block diagram shown in FIG. 28 by applying the Laplace differentiation operator "s" repeatedly to the $x_d$ input signal. It is well known that it is physically impossible to implement the zero corresponding to the "s" operator without a corresponding pole. Since the input signals $v_d$ and $a_d$ are actually derivatives, the use of the "s" notation in FIG. 28 is a notational convenience facilitating intuition, not a means of implementation.

Figure 28:
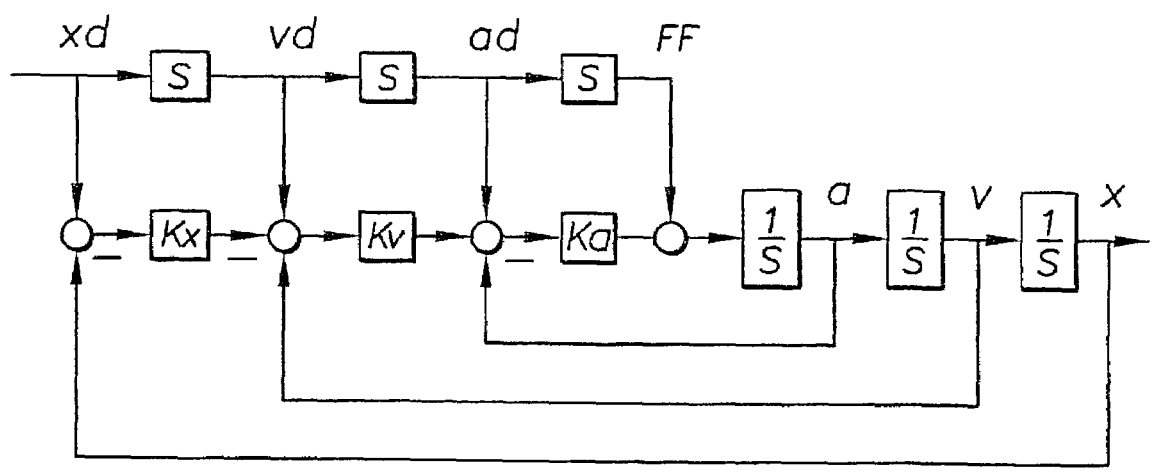
FIG. 28 shows application of a Laplace differentiation operator to inputs to the system shown in FIG. 27.
Figure 29:
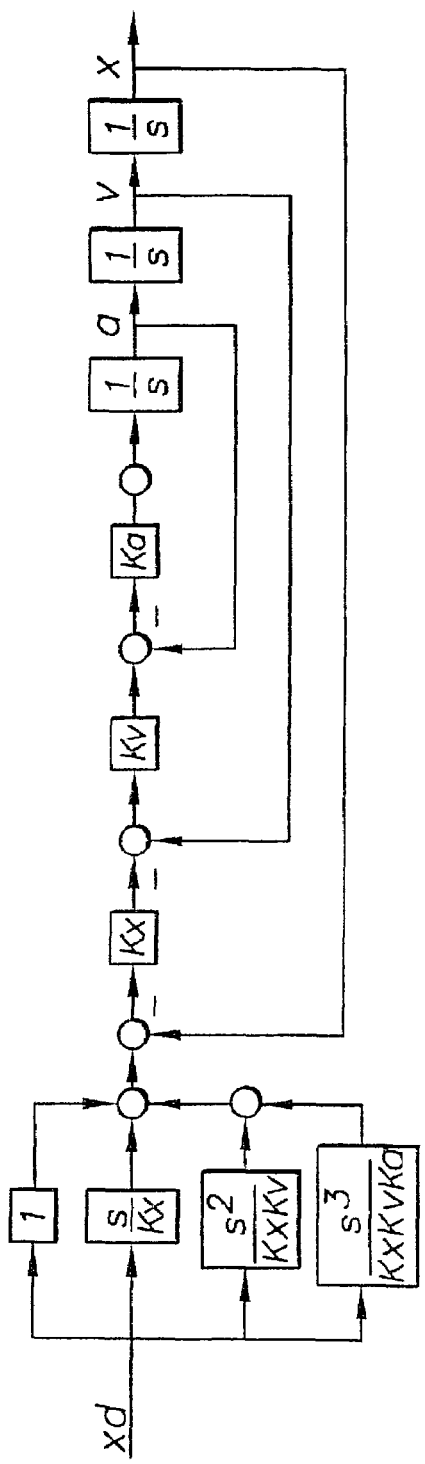
FIG. 29 shows scaled versions of the inputs of FIG. 28.
Figure 30:
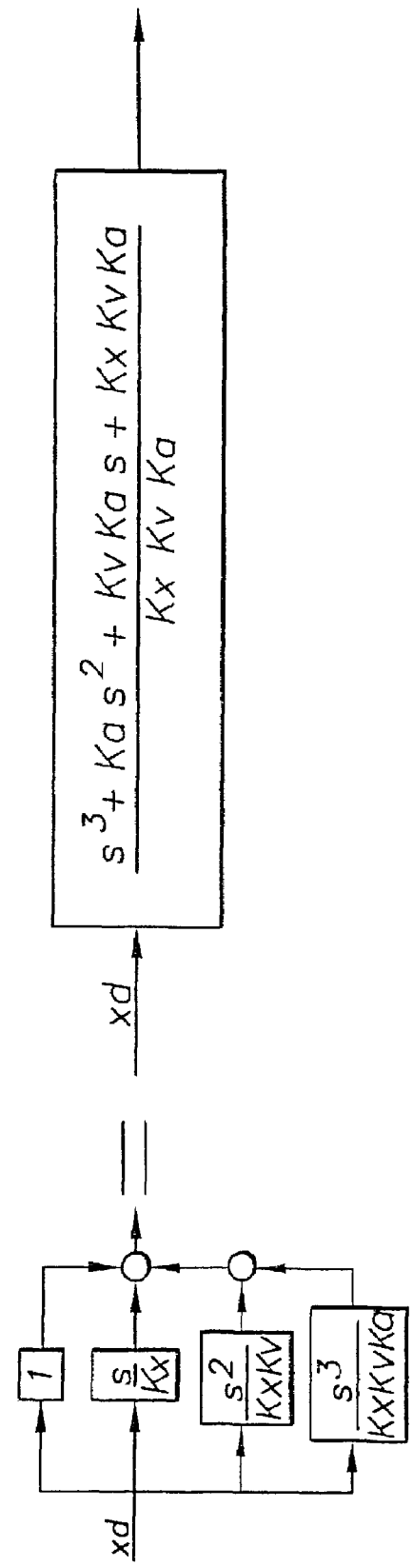
FIG. 30 shows a reduction, using block diagram algebra, of the inputs shown in FIG. 29.
Figure 31:
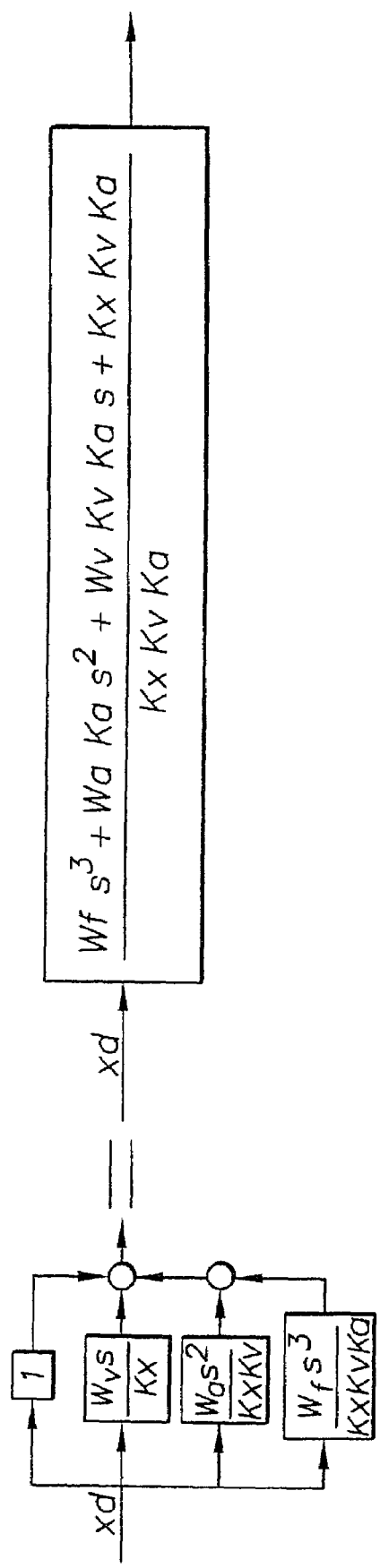
FIG. 31 shows a reduction of the inputs shown in FIG. 30.

By applying block diagram algebra to the block diagram shown in FIG. 28, scaled versions of all the inputs ($x_d$, $v_d$, $a_d$ and FF) can be shown to enter the closed-loop system at a single point, as shown in FIG. 29. The combination of the three parallel inputs (to the nominal closed-loop system) shown in FIG. 29 can be reduced further using block diagram algebra as shown in FIG. 30. The numerator of the block shown in FIG. 30 is a third order zero. For this system, the zeros associated with the combination of feedforward terms exactly match (and cancel) the poles of the nominal closed-loop system. Thus these zeros serve to cancel the dynamics of the modeled system. The location of the zeros can be adjusted by including weighting factors $W_v$, $W_a$ and $W_f$ on each of the terms $v_d$, $a_d$ and FF, respectively. Following through with the analogous block diagram reduction yields the result shown in FIG. 31.

By allowing additional freedom in the placement of the zeros (by adjusting weights $W_v$, $W_a$ and $W_f$), the zeros can be placed to effect a first order cancellation of the (un-modeled, but measured) poles of the system, e.g. poles associated with vibration or other unwanted dynamic response. Since FIR input shapers can be viewed as "all zero" filters, the zeros associated with the weighted feedforward input can be used to replace or augment the action of the zeros of the FIR input shaper. Thus, since some zeros are supplied by the weighted feedforward input, a lesser number of zeros must be supplied by the shaper, and consequently, the shaper period becomes shorter. The overall time advantage lies in the fact that the zeros associated with the weighted feedforward are implemented without a time cost (i.e., without a penalty).

6.7 Additional Constraints

It is also possible to add constraints to the partial fraction expansion equations of section 4 in order to provide for relatively rapid movements of the rigid mode portion of the system. For example, it is possible to add constraints relating to insensitivity to variations in system parameters To do this, one or more constraint equations in the continuous form of equations 19 may be differentiated with respect to the system parameter and the resultant set to zero. This ensures that the solutions to the equations are insensitive to variations in that parameter. A similar result can be obtained by solving the equations to which insensitivity is required multiple times with different values for the system parameter. For example, the second of the above partial fraction expansion equations 19 can be repeatedly solved with different torque constant values in order to assure that the solution thereto works well for a range of torque constant values. Such an equation must be given some degree of freedom by not requiring that the solution be exactly zero for all values of torque constant.

6.8 Switch Times

As noted above, the continuous form of the partial fraction expansion equations can also be solved for voltage switch times which reduce vibrations in the system. A voltage switch time corresponds to a transition time between full positive and full negative voltage inputs to the system. In solving for these switch times, if no other constraints are included, the system can be modeled using the three partial fraction expansion equations 19 shown above in section 4. Using the continuous version of these equations, it is possible to solve for three transition times, namely $t_1$, $t_2$ and $t_{end}$, as set forth below.

Equations 19 are nonlinear in their continuous form. However, they can be manipulated to make them easily solvable in a controller with limited computational power. Since the first equation is linear, the first equation can be substituted into the other equations, yielding two equations with two unknowns. The solution can then be obtained by performing a simple fixed-point iteration. Only a few iterations are needed to obtain a solution to machine precision. Additionally, the starting guess for the iteration can be obtained from a simple curve fit, thus further increasing the speed of the calculation process. It is also possible to generate solutions to these equations by defining switch times as a function of movement distance and then fitting the data with an empirical formula to achieve a solution that is sufficient for use in a digital controller.

To this end, an additional step that is performed in order to use the continuous switch time solution in a digital controller is to round-off the switch times to a nearest digital time spacing. However, because significant errors can be generated by rounding-off the switch times, another approach is often used. The switch times are rounded upward and the voltage levels in each region are adjusted to achieve a solution to the same equations. Alternatively, voltage levels in only a portion of the solution are adjusted in order to achieve the same result. For example, only a few digital outputs are adjusted to correct for the round-off.

The pseudo-code shown in Appendix A illustrates (i) the calculation of continuous switch times, (ii) a method of rounding, the continuous switch times to discrete time intervals, and (iii) recalculation of the voltage levels to satisfy the original constraint equations including discrete switch times. In the first section of the pseudo-code, the physical system parameters ($V_{max}$, $K_t$, $K_b$, l, k, $R_e$, $R_m$, and $J_m$) are used to compute transfer function parameters (A, a, b). While in theory this step is not required (a formulation in the original system physical parameters could be used), the resulting equations are much more compact and more suitable for real-time implementation.

In the formulation shown in Appendix A, the accommodation of digital switch times requires that the entire voltage level of each of the three steps be modified in order to satisfy the constraint equations. Modification of the entire step resulted because of the specific formulation in terms of three steps in voltage. If the problem is reformulated, e.g. in discrete impulse response form corresponding to partial fraction expansion equations 19 (repeated below as 38 for convenience), other, more flexible modifications of the voltage wave form are possible.

$$Finalpos = \sum_{i=1}^{N} V_i A \Delta t \qquad (38)$$

$$0 = \sum_{i=1}^{N} V_i \frac{Ab}{b-a}(e^{-a(T_{end}-T_i+\Delta t)} - e^{-a(T_{end}-T_i)})$$

$$0 = \sum_{i=1}^{N} V_i \frac{Aa}{a-b}(e^{-b(T_{end}-T_i+\Delta t)} - e^{-b(T_{end}-T_i)})$$

The pseudo-code shown in Appendix A can be used to compute the digital switch times (rounded from continuous), and the impulse response form of the constraint equations used only for the final adjustment of voltage levels. A voltage variable for the reformulated voltage adjustment problem can be formed by selecting an individual $V_i$, or alternatively selecting a dependent set of $V_i$ (e.g. $V_1=V_2=V_3=V_{first}$). The three constraint equations form a linear set of three equations in the three variables and can be solved using any method suitable for linear equations. If more than three variables are chosen, then the solution will not be uniquely determined and opportunity exists for additional criteria to be used to select from among the possible solutions.

6.9 Shaped™ Switching

According to the well-known bang-bang principle, time-optimal system commands for a voltage-limited system like a computer disk drive comprise a series of full-positive and full-negative voltage commands. In such a case, the voltage levels are known, but their optimal switch times are not. Because optimal switch times for the system are unknown, it is likely that unwanted vibrations will be excited when the voltages commands are input to the system. Several techniques for reducing unwanted system vibrations can then be performed. For example, it is possible to determine a switching sequence analytically subject to various constraints, such as vibration constraints, insensitivity constraints, or any number of unwanted dynamic or physical system constraints. Additional techniques that can be used include determining switch times using any technique described herein and adjusting the switch times in real-time to take system movements into consideration.

Another effective technique for commanding a disk drive to move is to combine the benefits of a bang-bang time-optimal command with the benefits of Input Shaping™. To this end, switch times for an input to a rigid system are determined analytically, and then an Input Shaper™ is applied to the input in order to shape it so that unwanted vibrations resulting therefrom are substantially suppressed. This technique has at least two advantages. First, it is relatively easy to implement from a computational point of view because the problem is separated into two problems, namely generating a good input for a simple system and separately generating a good Shaper™ to handle flexible, and possibly some rigid, modes. Second, solutions obtained by separately Shaping™ the input are more insensitive to system parameter variations.

Shaping of the input may be performed in a manner described above using, e.g., an Input Shaper™, a filter, etc. Accordingly, a detailed description of shaping the input is omitted here for the sake of brevity. With regard to generating a good input, since voltage levels for the input are already known (i.e., the voltage levels are either full positive and full negative), the only variables that need to be determined are switch times for the voltage input. Switch times can be determined using a partial fraction expansion model of a system, such as equations 19, in which $F_1(t)$, $F_2(t)$ and $F_3(t)$ correspond to step responses to a unit voltage in each mode of the system. For a third order model such as this, three transitions between full positive and full negative are required. Switch times, namely $t_1$, $t_2$ and $t_{end}$, for the transitions are determined as follows.

Using equations 14, reproduced below as 39, $$XF_1(t_{end})=V_0F_1(t_{end}-t_0)-2V_0F_1(t_{end}-t_1)+2V_0F_1(t_{end}-t_2)$$

$$XF_2(t_{end})=V_0F_2(t_{end}-t_0)-2V_0F_2(t_{end}-t_1)+2V_0F_1(t_{end}-t_2)$$

$$XF_3(t_{end})=V_0F_3(t_{end}-t_0)-2V_0F_2(t_{end}-t_1)+2V_0F_1(t_{end}-t_2), \qquad (39)$$

and constraint equations 15, reproduced below as 40, $$XF_1(t_{end})=Finalpos$$

$$XF_2(t_{end})=0$$

$$XF_3(t_{end})=0, \qquad (40)$$

it is possible to solve for the three unknown transition times $t_1$, $t_2$ and $t_{end}$. A change of variables, i.e., $$et_1=t_{end}-t_0$$

$$et_2=t_{end}-t_1$$

$$et_3=t_{end}-t_2, \qquad (41)$$

further simplifies the solution for the switch times. In this case, $et_1$ corresponds to an elapsed time from onset of a first step until the end of the move, $et_2$ corresponds to the elapsed time from onset of the second step until the end of the move, and $et_3$ corresponds to the elapsed time from onset of the third step until the end of the move.

In view of the foregoing, equations 39 reduce to the following:

$$Finalpos=V_0F_1(et_1)-2V_0F_1(et_2)+2V_0F_1(et_3)$$

$$0=V_0F_2(et_1)-2V_0F_2(et_2)+2V_0F_1(et_3)$$

$$0=V_0F_3(et_1)-2V_0F_2(et_2)+2V_0F_1(et_3). \qquad (42)$$

Since equations for $F_1(t)$, $F_2(t)$ and $F_3(t)$ contain exponential terms, a numerical solution to the above equations for $XF_1(t_{end})$, $XF_2(t_{end})$ and $XF_3(t_{end})$ is not readily available. However, certain simplifications can be made to the equations in order to provide an iterative numerical solution, and thus to allow them to be solved for transition times $t_1$, $t_2$ and $t_{end}$ in real-time. More specifically, the duration of the third step of the input to a third order system does not vary significantly for relatively long moves. Therefore, for long moves, the third step duration is nearly independent of values of $et_1$ and $et_2$. Accordingly, the second equation (for $XF_2(t_{end})$) can be solved for $et_3$ using guesses for $et_1$ and $et_2$. The value of $et_3$ obtained in this manner is a close approximation to its exact value. The first equation (for $XF_1(t_{end})$) is used to eliminate $et_1$ from the third equation (for $XF_3(t_{end})$), whereafter the third equation is solved for $et_2$ as a function of $et_3$. The value obtained for $et_2$ is also a close approximation of its exact value. The first equation is then used to calculate an approximation for $et_1$ based on the approximate values of $et_2$ and $et_3$. If more accuracy is desired, another pass may be made through the equations. That is, the approximations calculated for $et_1$ and $et_2$ can be substituted back into the foregoing equations, and the process repeated for several iterations, where each iteration provides an increase in accuracy. In practice, four iterations through the equations resulted in 16 digit accuracy for $et_1$, $et_2$ and $et_3$. Once these values are determined, values for the transition times $t_1$, $t_2$ and $t_{end}$ can be calculated using the equations shown above.

The iterative solution presented above for determining switch times will converge faster for better initial guesses of $et_1$ and $et_2$. On short moves especially, convergence can be slow if initial guesses for $et_1$ and $et_2$ are not good. Accordingly, there exists a need for a way to provide a good initial guess. One such technique is to tabulate solutions for a range of short moves. Such a table may be then used to obtain a good guess, e.g., by looking-up a guess or by interpolation. Alternatively, a curve can be fit to solutions for a range of short moves, and initial guesses determined based on the curve. For example, it has been determined experimentally that a first switch time is a monotonically increasing function of move distance. Curves for other switch times can be determined in a similar manner.

The foregoing techniques for determining switch times can be expanded to include parameters other than just movement distance. For example, if resistance change is to be included in the solution, an initial guess for a switch time value can be determined based on both movement distance and resistance. Any number of system parameters can be used in this manner to determine an initial guess. In such cases, the initial guess can be determined based on a multidimensional table which includes these parameters, or computed using an empirically generated function. Switch times can also be generated by taking into account system parameters in addition to those set forth above. In such cases, conservative parameters may be used so that the actual system will move faster than the theoretical model on which the switch times are based. That is, in this case, the feedback will scale back the output voltage and the system will almost never be commanded past saturation.

As an alternative to the above approaches which rely on an initial guess, short move solutions can be determined based on the partial fraction expansion equations. Specifically, the exponential terms of the partial fraction expansion equations can be expressed in series form. The equations can then be solved for the short move solutions to the switch time problem.

A hardware implementation of this embodiment of the invention may be dictated by the design of many disk drive controllers. Specifically, in such disk drive controllers, the update rate of a processor in the controller is not fast enough to output voltages at precise desired time intervals. Accordingly, a hardware solution may be implemented, in which each next switch time is loaded into a hardware counter chip and a high frequency clock counts intervals until the desired switch time is achieved. At such time, the output of the counter chip changes and the new voltage value is output to the disk drive system.

Still another alternative to the forgoing method for determining switch times for a system input is provided in U.S. Provisional Application No. 60/076,951, entitled "Creating Time-Optimal Commands For Linear Systems", filed on Mar. 5, 1998 and its corresponding national application filed concurrently herewith. The contents of these two applications are hereby incorporated by reference into the subject application as if set forth in full.

7.0 Shaping™ Near or Beyond Nyquist

As noted above, control techniques in which trajectory is specified as a function of time involve determining an input which will generate a good move. As also noted above, this input may be determined using any other techniques, such as Input Shaping™, filtering, etc. In addition to these techniques, the present invention also provides a technique for shaping inputs having frequencies near or beyond the nyquist frequency. Shapers™ used to perform this shaping are referred to herein as "NBN" Shapers™.

Systems that use discrete time or digital control face a fundamental limitation due to the effects of sampling. That is, the sampling theorem states that any frequencies greater than the sampling frequency (or Nyquist frequency) will be aliased to other frequencies. Therefore system feedback control cannot suppress vibrations that are at a frequency greater than the Nyquist frequency. Because Input Shaping™ is a feedforward technique, it does not have this same limitation. Input Shapers™ can be designed to suppress vibrational frequencies that are near, or even well above, the Nyquist frequency. This section will demonstrate how to design Input Shapers™ which limit vibrational frequencies that are near or above the Nyquist frequency.

As background, disk drives systems with embedded servo information have a maximum position update rate that is determined by the density of the servo information and the drive's rotation speed. To demonstrate the difficulty in solving for an Input Shaper™, an example drive is presented. Assuming that the servo information on such a disk drive is updated at 5 KHz, and the drive's first resonant mode is at 2 KHz, only 2+ servo cycles exist for each vibrational cycle. This presents a computational problem. That is, only 2 unknowns exist per servo cycle and there are many more constraints to be solved (at a minimum no vibration constraints, among others). Accordingly, the problem is over-constrained.

However, more than one cycle can be used to solve for a system input. By expanding the number of unknowns until the problem becomes solvable, a solution can be obtained. Solutions obtained are unusual because they take more than one cycle of vibration to reduce vibrations to an acceptable level. Additionally, careful attention must be paid to insensitivity constraints because NBN solutions will be less sensitive than conventional solutions since fewer cycles of vibration are allowed to occur before cancellation. An alternative to this approach is to use an output or feedforward command rate that is different from the servo rate. This technique is presented in section 7.1 below.

Figure 32:
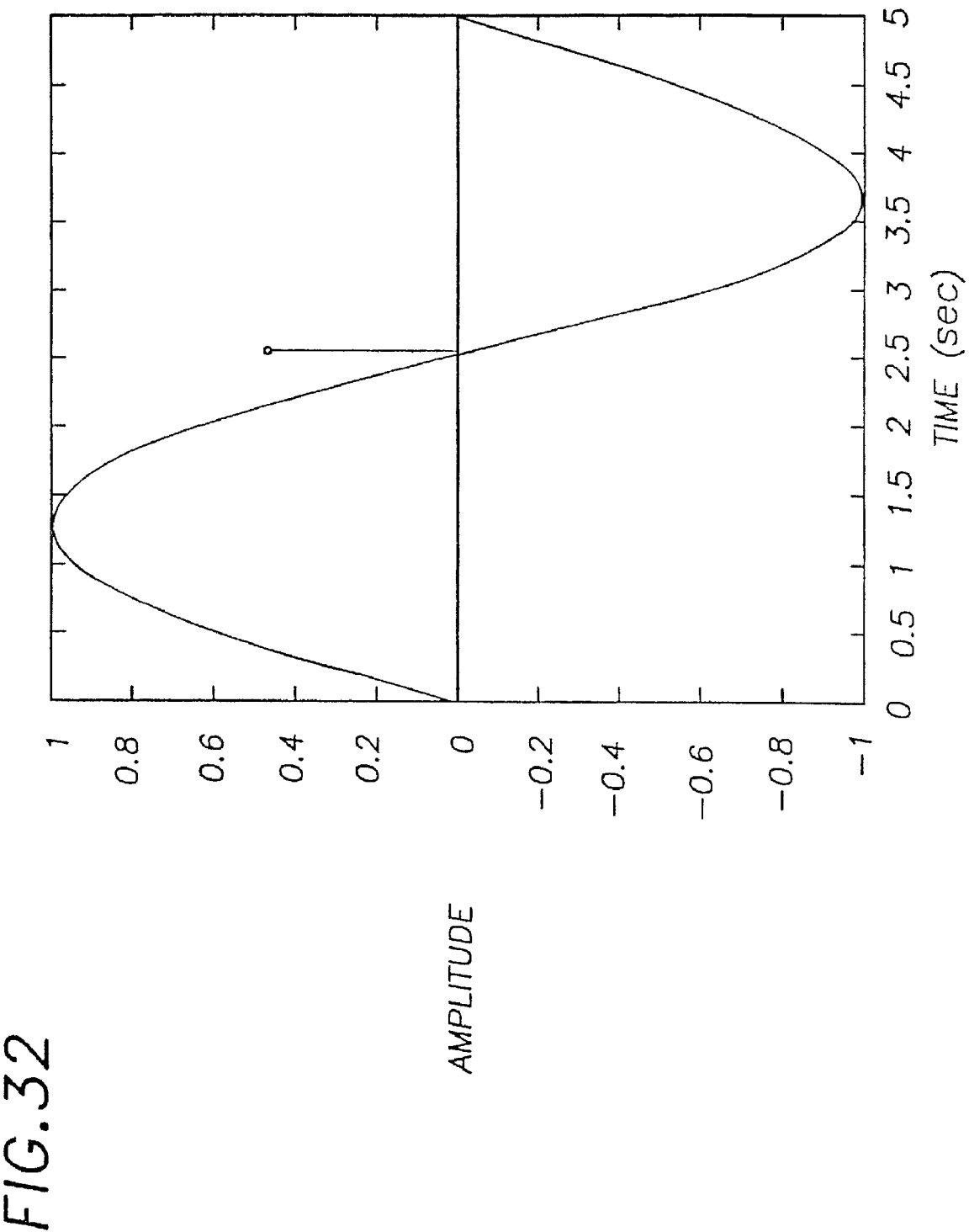
FIG. 32 shows a plot of impulses of a three pulse shaper together with a sine wave representation of undamped vibration.

The basic principle of the NBN shaper can be understood by examining the design of a three pulse shaper for a continuous system with zero damping. If we assume that the system is continuous, the shaper impulses can occur at exact times. When the damping ratio is zero, the amplitudes of the impulses for a three pulse shaper are [0.25 0.50 0.25]; the first pulse occurs at time zero, the second pulse at one half period of vibration, and the third pulse at one period of vibration. FIG. 32 shows a plot of the impulses of the three pulse shaper along with a sine wave representative of the undamped vibration. The combined plot shows the phasing of the impulses relative to the sine wave. In the continuous case, the pulses occur at the times shown in FIG. 32. In the digital case, the pulses are constrained to occur at integer multiples of the sample period, i.e. at the sample times. If the sample period is much shorter than the vibration period, then each of the shaper pulses can be split between the nearest sample times to achieve the same effect.

Figure 33:
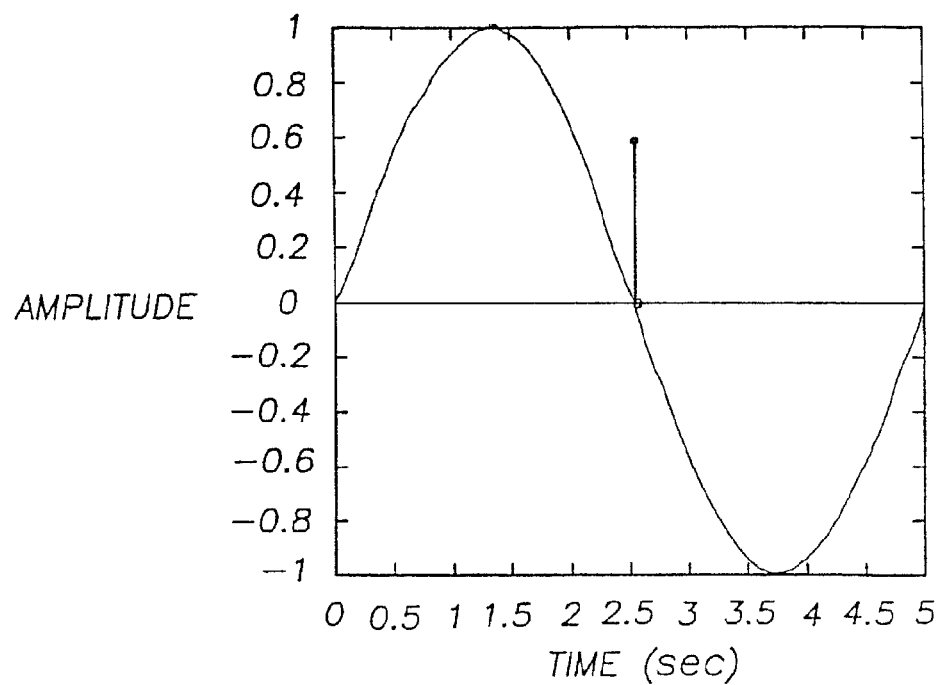
FIG. 33 shows a plot of digital pulse spacing for the three pulse shaper together with a sine wave representation of undamped vibration.

The Nyquist rate is equal to one half the sample rate and represents the lowest frequency that can be sampled by a digital system without alias. Thus, vibration occurring at the Nyquist rate is just at the theoretical limit of what input can be processed by a digital system without alias, and results in two sample points per sine wave period. Two sample points per period is exactly the ideal spacing for a three pulse shaper. FIG. 33 shows a plot of the digital pulse spacing for a three pulse shaper where the digital sample rate (4 KHz) results in the Nyquist rate (sample_rate/2=2 KHz) being equal to the vibration frequency (2 KHz). Thus, the three pulse shaper is easily implemented to attenuate frequencies at the Nyquist rate.

Figure 34:
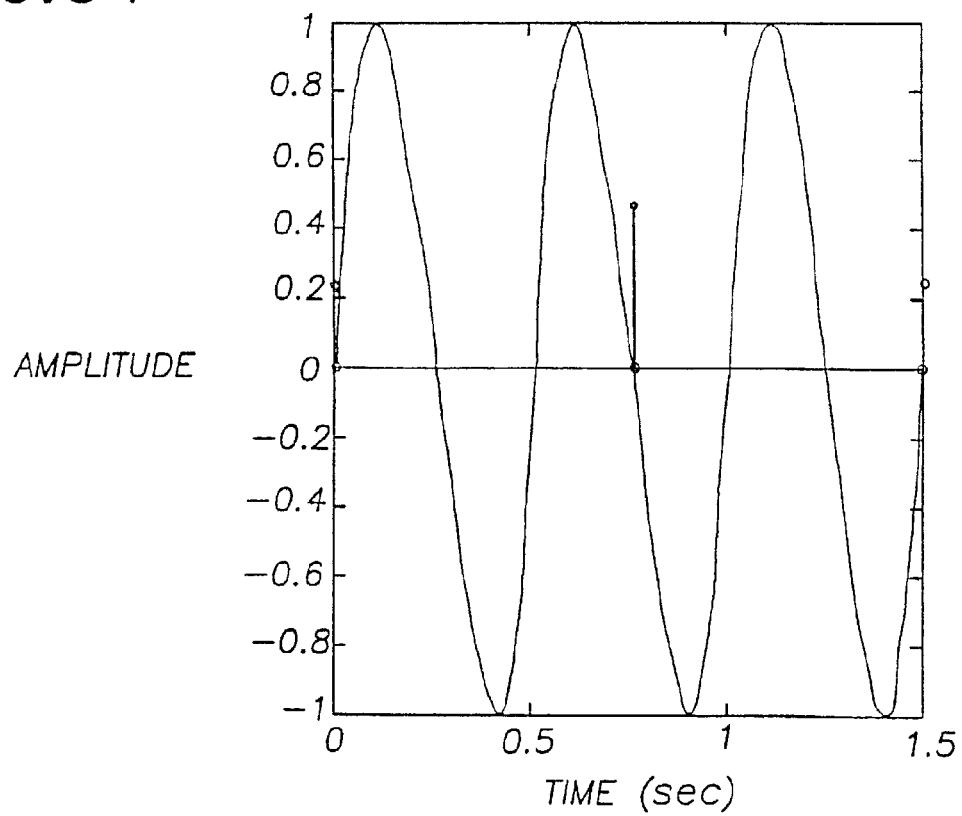
FIG. 34 shows pulse spacing for a three pulse shaper and a sine wave representation of vibration.

It is well known that vibration with frequency in excess of the Nyquist rate cannot be sampled by a digital system without aliasing, and that therefore a closed-loop digital sampled data system cannot use closed-loop control techniques to attenuate vibration at high (beyond Nyquist rate) frequency. However, the open-loop (feedforward) shaping technique can be applied to attenuate vibration at frequency well beyond the Nyquist rate. Shown in FIG. 34 is the pulse spacing for a three pulse shaper and a sine wave representative of vibration. The combined plot shows the timing of the shaper pulses relative to the phasing of the sine wave. The frequency of vibration is again 2 KHz, the sample rate for this example is 1.333 KHz, and the associated Nyquist rate is 1.333 KHz/2=0.666 KHz. The frequency of vibration is well in excess of the Nyquist rate (2 KHz/0.666 KHz=3) for this case.

Examination of the phasing of the sine wave relative to the timing of the shaper pulses reveals the same relation for the sub-Nyquist rate example as for the Nyquist rate example. That is, the first shaper pulse occurs at 0°, the second shaper pulse occurs at 180° and at each 360° thereafter, and the third shaper pulse occurs at 360° and at each 360° thereafter. Since the sine wave phase repeats each 360°, the superposition of responses yields the same result in both cases. It should be noted that the sub-Nyquist rate shaper will be more sensitive to errors in the vibration frequency estimate. The increased sensitivity is due to the fact that as more periods of vibration elapse between pulses, larger errors in phase (for a given error in frequency) will accumulate.

7.1 Effect of the Rate of Command Output

The rate that is chosen for issuing digital commands to the system is extremely important. A rate should be chosen that makes sense for the particular system being considered. In some cases, this rate is simply the servo rate of the control system. However, for disk drives, this rate must usually be higher because of the restrictions imposed by the use of embedded servo information for control. For systems in which the highest frequency of vibration to be suppressed is considerably lower than the servo rate, the servo rate is adequate for use as an output rate. For systems such as those considered in section 7.0 (such as most disk drives), the rate must be higher.

One approach is to send output commands to the system at a multiple of the servo rate. In this formulation, the output to the physical system might be performed at two, three, or more times the rate of the servo. In our example system, the servo rate is 5 KHz. The highest mode to be suppressed is 2 KHz. If the output to the system is performed at triple the servo rate (15 KHz), there are over seven digital outputs per vibration cycle; therefore, the shaping formulations become simple. Several possible architectures can be considered. Two possibilities are presented below.

In the first example, there is a separate output path from the controlling computer chip to the hardware for feedforward purposes. An example of this is a disk drive in which a voltage command can be fed forward directly to the amplifier while current commands are output by the closed-loop servo. In order to actually implement this, the following steps must be performed. At the servo rate (5 KHz), these steps comprise reading the sensors, executing the servo calculations, computing the servo output, and outputting this value to the servo output channel. At the higher rate (15 KHz), these steps comprise computing or looking-up the next trajectory value, executing the shaping method (if the correction for unwanted dynamics is not already included in the trajectory), and outputting the feedforward term to the feedforward output channel.

In the second example, there is only a single output path from the controlling computer chip to the hardware. An example of this is a disk drive in which a current is the output generated by the closed-loop servo and current is also used in the feedforward term. In order to actually implement this, the following steps are performed. At the servo rate (5 KHz), these steps comprise reading the sensors, executing the servo calculations, computing the servo output, and saving this value for use by the section below. At the higher rate (15 KHz), these steps comprise computing or looking up the next trajectory value, executing the shaping method (if the correction for unwanted dynamics is not already included in the trajectory), and adding the feedforward term to the feedforward term to the servo output computed above.

There are many related configurations which either combine the above two approaches or are variations of these approaches. One such variation uses continuous or near continuous time outputs from the feedforward term. If the control hardware for a disk drive or any other machine is constructed so that outputs can be scheduled in time, the feedforward outputs can run essentially asynchronously from the servo loop. In one such implementation, the voltages to the disk drive might be updated by a circuit at a high clock rate (e.g., 2 MHz). By loading a counter register with the time of the next voltage output, the hardware circuit can count down until the appropriate time and output the next voltage value. This enables an optimized trajectory to be computed using any of the techniques herein (or by any other process), and to be output at a rate sufficiently high so that the system can be commanded to move in an optimized (or near optimized) fashion without effecting the servo rate.

An additional variation on the approaches presented herein is to use one of the shaped switched formulations so that only full scale voltages (or any other parameter) are output. For example, it is possible to use unity magnitude Shapers™ to take a switching voltage command signal designed only for a rigid body system, and to modify the switching voltage command signal so that the switching voltage command signal moves the system with little vibration. This approach enables the circuit to become a simple counter driven switch that changes its output at a preset time.

A further variation is to use an interrupt-driven approach in which times to output values are scheduled and an interrupt is generated (using state of the art computer techniques) at the appropriate time. At the time of the interrupt, an appropriate output (or voltage switch) is provided by the controller chip or other device. Single or multiple hardware timers may be used to interrupt a DSP or microcontroller in the disk drive. Still another variation is to use a separate device, such as a programmable logic array, that is issued a single command which, in turn, generates a series of precisely-timed commands to the current loop. The DSP or microcontroller can be programmed in an asynchronous control loop that maintains a list of switch times and required transitions.

8.0 PV Approach

A PV table comprises a trajectory curve which defines the velocity of a system component, such as head 76, in terms of that component's position i.e., the distance that the component has yet to go in order to reach its final position. To use a PV table, an actual position of the component is compared to its desired position. The difference between these two values is then used to look up a velocity in the PV table for the component. Many disk drive systems rely on a PV table to determine their inputs. These inputs, however, can result in unwanted vibrations in the system. The techniques presented below can be used to reduce and/or limit such vibrations.

This aspect of the invention is a method of generating a trajectory for inclusion in a PV table which is used in controlling movement of a component in a dynamic system. The method generates a trajectory in accordance with a technique for reducing unwanted dynamics of the component, i.e., generating a good move. The trajectory is then stored in the PV table, and the component is controlled to move along the trajectory stored in the PV table.

In more detail, a good move is generated for the system using any of the techniques described in section 5 above. Specifically, the system is modeled, a "good" input is applied to the system, and the system's reaction to the good input is stored in a PV table as a trajectory for the system. In this manner, good moves can be re-cast into a PV table for a system, thereby providing a way to reduce unwanted system dynamics while staying within a PV formulation. Taking this approach one step further, a series of good moves can be generated using this technique, and the series of good moves can be stored in a series of parameterized PV tables.

9.0 PV Feedback Approach

Figure 13:
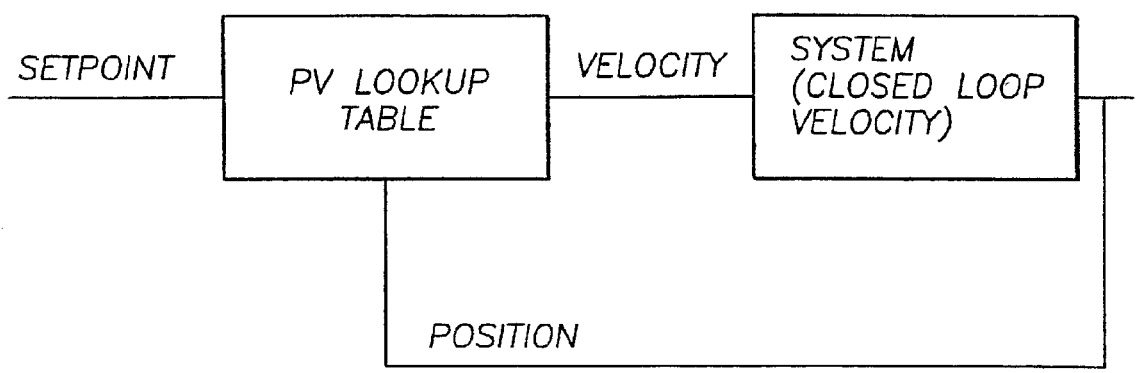
FIG. 13 is a feedback diagram of a prior art disk drive system.

In prior art disk drive systems, the velocity determined from a PV table is merely fed forward into the system, as shown, for example, in the conventional disk drive system diagram depicted in FIG. 13. This could lead to unwanted system vibrations. This aspect of the invention, however, shapes the velocity before it is provided to the system and, in addition, performs inverse shaping in the system's feedback loop, thereby correcting the feedback so as not to co-opt the operation of the PV table.

Figure 14:
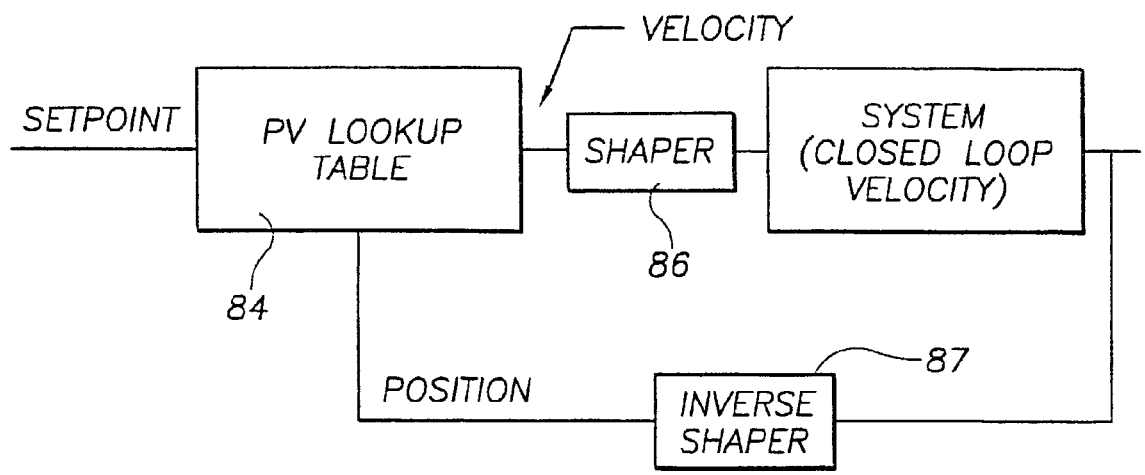
FIG. 14 is a feedback diagram of a disk drive system in accordance with the present invention.

FIG. 14 shows an example of a system diagram for a disk drive that is controlled in accordance with this aspect of the invention. The disk drive includes PV table 84, shaper 86, and inverse shaper 87. Shaper 86 is placed in the feedforward loop following PV table 84 so as to shape the velocity output therefrom. Inverse shaper 87, which comprises the inverse of shaper 86, is placed in the feedback loop. The relationship between inverse shape 87 and shaper 86, in either the time domain or the frequency domain, is as follows:

if shaper=$A/B$, then shaper$^{-1}$=$B/A$.

The combination of shaper 86 and inverse shaper 87 reduce unwanted system dynamics, such as vibrations of head 76. Specifically, shaper 86 alters the velocity input to the system so as to reduce vibrations in head 76 resulting from system movement, and inverse shaper 87 operates to restore loop stability to what it was prior to insertion of the shaper 86 in the forward loop. Shaper 86 and inverse shaper 87 are not limited to the Input Shapers™ and inverse Input Shapers™ described in U.S. Pat. Nos. 4,916,635 and 5,638,635. In fact, shaper 86 and inverse shaper 87 can be any pole-zero dynamic block, IIR filter, FIR filter, tapped continuous delay line filter, or the like.

Figure 15:
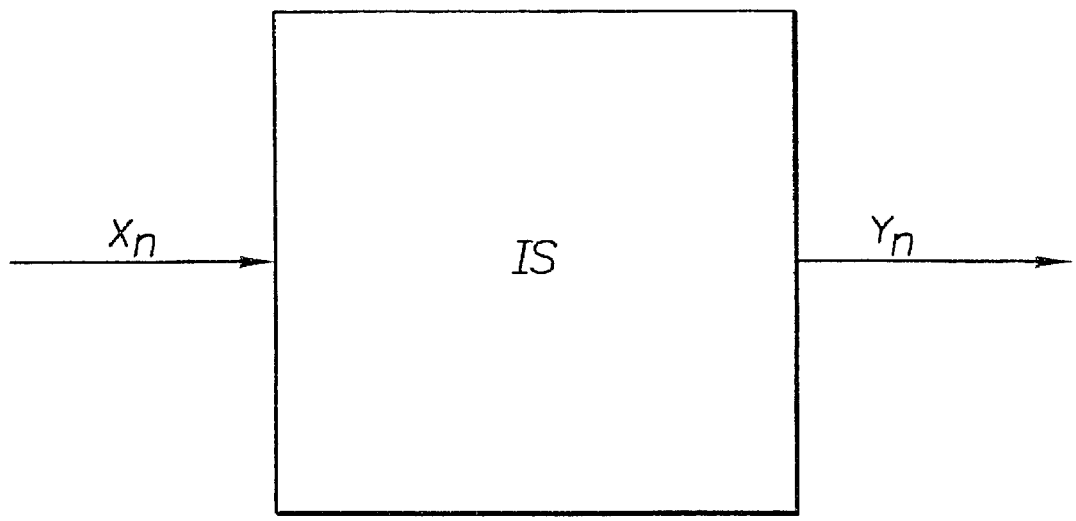
FIG. 15 is a block diagram showing the relationship between an input and an output of a finite impulse response filter shaping technique.
Figure 16:
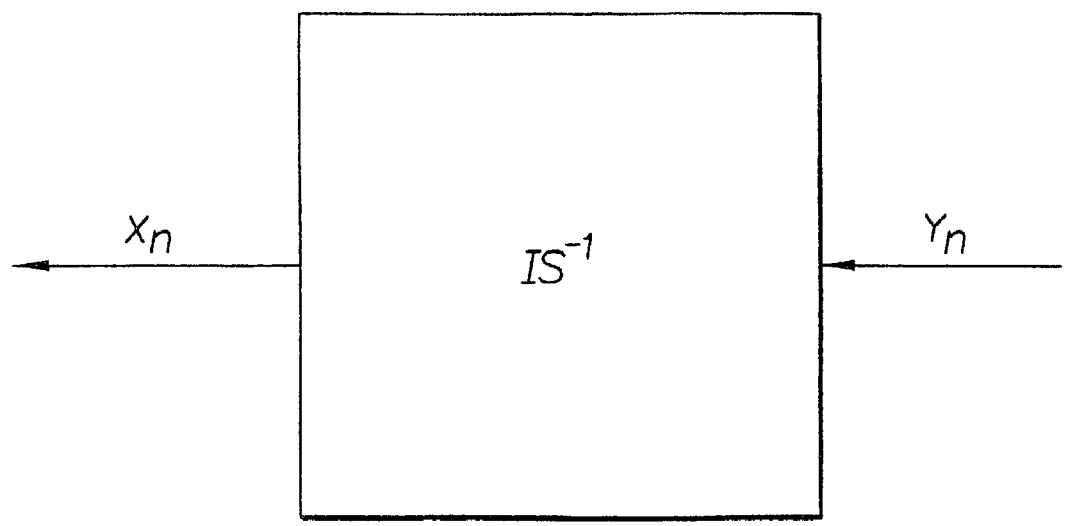
FIG. 16 is a block diagram showing the relationship between an input and an output of a finite impulse response filter inverse shaping technique.

FIGS. 15 and 16 show relationships between inputs and outputs of a shaper ("IS") and inverse shaper ("IS$^{-1}$"), respectively, formed using an FIR filter, with A as the input. Specifically, relationships between the inputs and outputs of IS and IS$^{-1}$ are as follows:

$$y_n = \sum_{i=0}^{N} A_i x_{n-i} \tag{43}$$

$$x_n = \frac{y_n}{A_0} - \frac{1}{A_0}\sum_{i=1}^{N} A_i x_{n-i}$$

Figure 17:
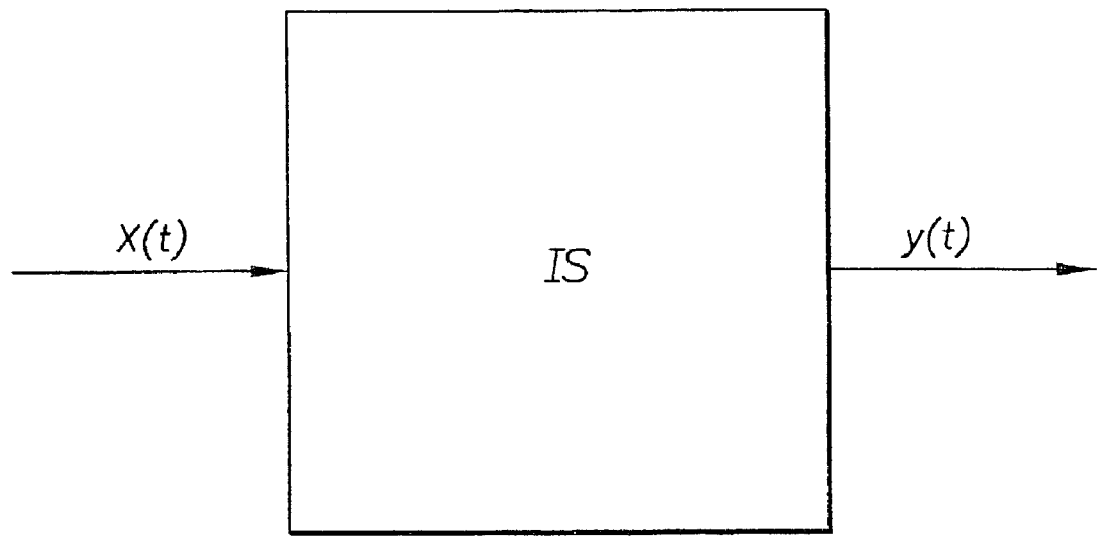
FIG. 17 is a block diagram showing the relationship between an input and output of a tapped continuous delay line filter shaping technique.
Figure 18:
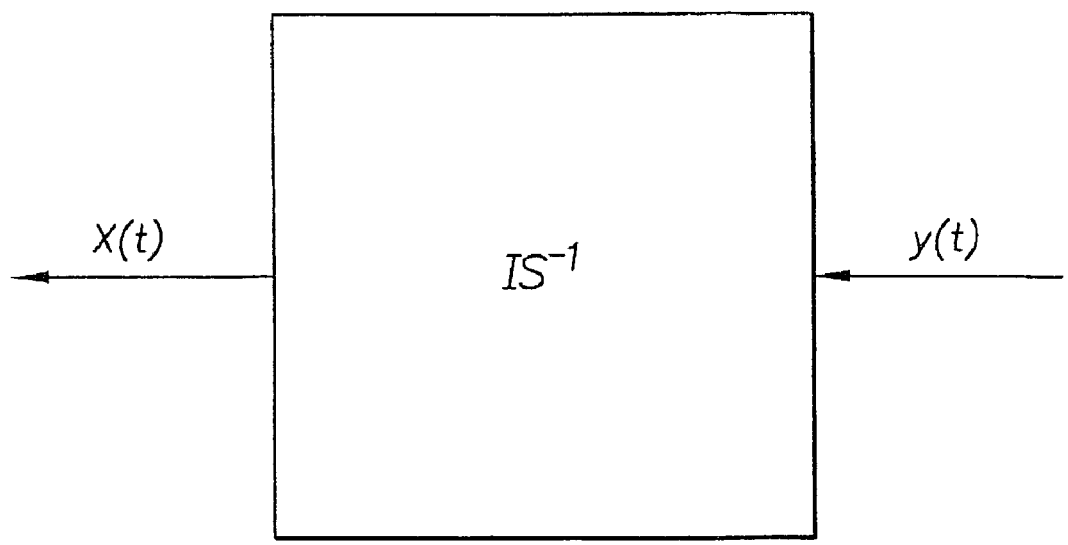
FIG. 18 is a block diagram showing the relationship between an input and an output of a tapped continuous delay line filter inverse shaping technique.

FIGS. 17 and 18, show relationships between inputs and outputs of a shaper and an inverse shaper ("IS$^{-1}$"), respectively, which are formed using a tapped continuous delay line filter. Specifically, relationships between inputs and outputs of IS and IS$^{-1}$ are as follows:

$$y(t) = A_0 x(t) + \sum_{i=1}^{N} A_i x(t-T_i) \tag{44}$$

$$x(t) = \frac{1}{A_0} y(t) - \frac{1}{A_0}\sum_{i=1}^{N} A_i x(t-T_i)$$

Figure 19:
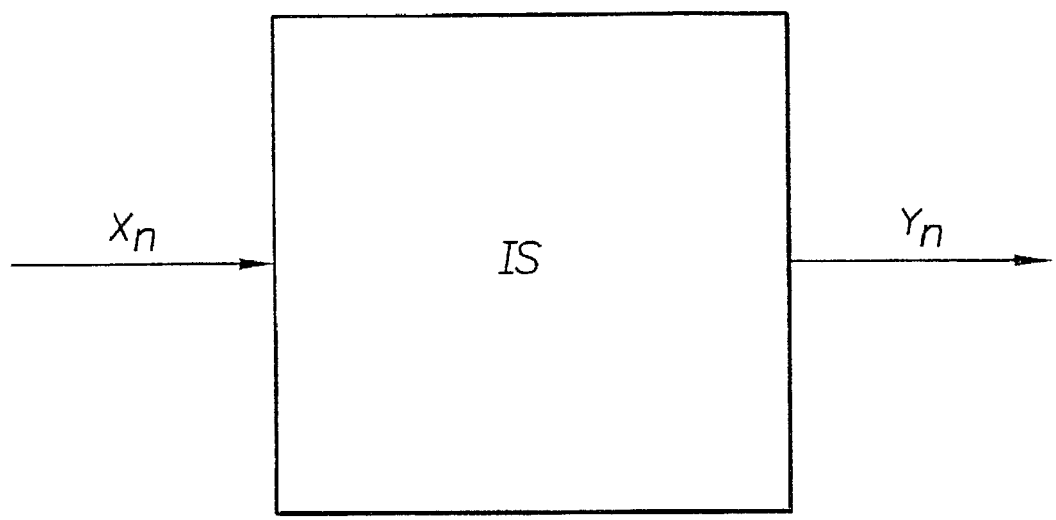
FIG. 19 is a block diagram showing the relationship between an input and an output of an infinite impulse response filter shaping technique.
Figure 20:
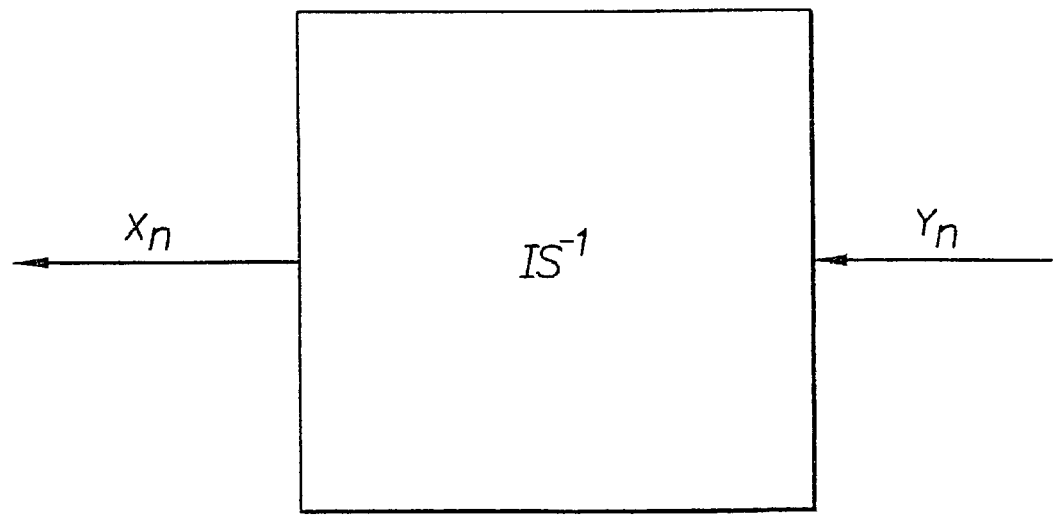
FIG. 20 is a block diagram showing the relationship between an input and an output of an infinite impulse response filter inverse shaping technique.

FIGS. 19 and 20, show relationships between inputs and outputs of a shaper ("IS") and an inverse shaper ("IS$^{-1}$"), respectively, which are formed using an IIR filter. Specifically, relationships between inputs and outputs of IS and IS$^{-1}$ are as follows:

$$y_n = \frac{1}{B_0}\sum_{i=1}^{N} A_i x_{n-i} - \frac{1}{B_0}\sum_{j=1}^{M} B_j y_{n-j} \tag{45}$$

$$x_n = \frac{1}{A_0}\sum_{j=0}^{M} B_j y_{n-j} - \frac{1}{A_0}\sum_{i=1}^{N} A_i x_{n-i}$$

To summarize, this aspect of the invention is directed to a method and corresponding apparatus for using a PV table to control a component, such as head 76, in a dynamic system, such as disk drive 10. The invention generates a position variable for the component and determines a velocity command for the component using the PV table, where the velocity command is determined based on the position variable. The velocity command is then shaped using an Input Shaper™ or the like in order to generate a shaped velocity command, whereafter the component is controlled to move based on the shaped velocity command. In the invention, a preset position of the component is compared to a measured position of the component in order to determine the position variable, and inverse shaping is performed on the measured position prior to comparing the measured position to the preset position.

10.0 N-Dimensional PV Table

The present invention also provides an enhanced PV table which may, or may not, be used in connection with the foregoing feedback approach and the foregoing techniques for generating good moves. As background, the same 20 PV table may not produce accurate results for different distance moves, among other things. To address this problem, conventional disk drive systems typically include one, two or maybe even three PV tables, i.e., one table for short moves, one table for medium-distance moves, and one table for long moves. Which table is selected depends upon the distance of the desired move. Since only three discrete values are provided for the movement distance, the system may not reach its final destination as quickly as desired.

The present invention provides a better approach, namely to generate an N-dimensional (N>2) PV table in which velocity is a function of position and a function of a third (fourth, fifth, etc.) variable, such as movement distance, resistance, temperature, etc. This approach effectively provides increased movement speed, since the requested velocity values more closely represent physical limitations of the disk drive for substantially all movement distances. Moreover, this approach makes more sense than the conventional formulation, especially in the disk drive area, since disk drive systems are third order in nature and a conventional PV approach is second order in nature. Although the present invention may use a PV table having any number N (N>2) of dimensions, for the sake of simplicity, the examples provided herein refer usually to a three-dimensional PV table.

In order to determine trajectories for a PV table, a dynamic model of the system must be determined. An example of such a model is partial fraction expansion equations 19. A system input, which is a function of time and which will move the model a desired distance, is then generated based on the model. For example, the system input may consist of a series of switch times and voltage levels, or a digital sequence of voltage levels. The input, in conjunction with the system model, is used to simulate the desired motion of the system. Any form of the model that yields both a position and a velocity output is suitable. As an example, the third order voltage-to-position transfer function $$H(s) = \frac{A}{s} * \frac{a}{s+a} * \frac{b'}{s+b} \quad (46)$$

could be transformed and manipulated so that position and velocity are available as outputs. Using the commutative property of multiplication, the transfer function can be rearranged and then broken up to yield a "block diagram" with voltage input and position and velocity outputs as follows:

$$\text{Voltage} \rightarrow A \rightarrow \frac{a}{s+a} \rightarrow \frac{b}{s+b} \rightarrow \text{Velocity} \quad (47)$$

$$\text{Velocity} \rightarrow \frac{1}{s} \rightarrow \text{Position}$$

The above "block diagram" is then used as the basis of a computer simulation that yields the velocity and position outputs corresponding the voltage input. The integration is performed forward in time. If both the form of the input (e.g. three switch times and three voltage levels) and the model are simple, then direct analytical solution of the system model to time domain equations can be used as an alternative approach to simulation. The velocity, and position outputs of the simulation are then tabulated to form one version of the PV table.

The present invention enables three approaches to PV table generation. First, a shaped input can be integrated forward to generate a PV table—in the above block diagram a shaper would be inserted following the voltage input. Second, an unshaped input can be integrated forward and an output of the integration can be shaped and stored in a table. Third, a vibration-reducing trajectory can be computed using a constraint-based approach, this input can be integrated forward, and the output thereof stored in a table. Prior to the derivation of the partial fraction expansion equations shown above, there was no way to generate an input that was guaranteed to get the system to its final destination; therefore forward integration was not a viable approach. Reverse integration from a final condition was commonly used.

Using the generated input, system outputs are then determined over time so as to generate values of position as a function of time and velocity as a function of time. These values are then re-cast as velocity as a function of position. To generate a three-dimensional PV table, the above process is repeated for the third variable in order to generate velocity as a function of both position and the third variable. The process may then be repeated for additional variables.

Since a three-dimensional PV table may require large amounts of memory space, and therefore may not be practical in all circumstances, the present invention provides several ways in which to approximate operation of a three-dimensional PV table using a series of PV trajectories. For example, the invention generates a series of PV trajectories for various movement distances, stores these trajectories, and selects trajectories corresponding to a desired movement distance while ignoring all other trajectories. Thus, in this case, one of the series trajectories is selected from the position-velocity table based on the desired movement distance and the system is controlled accordingly.

Figure 21:
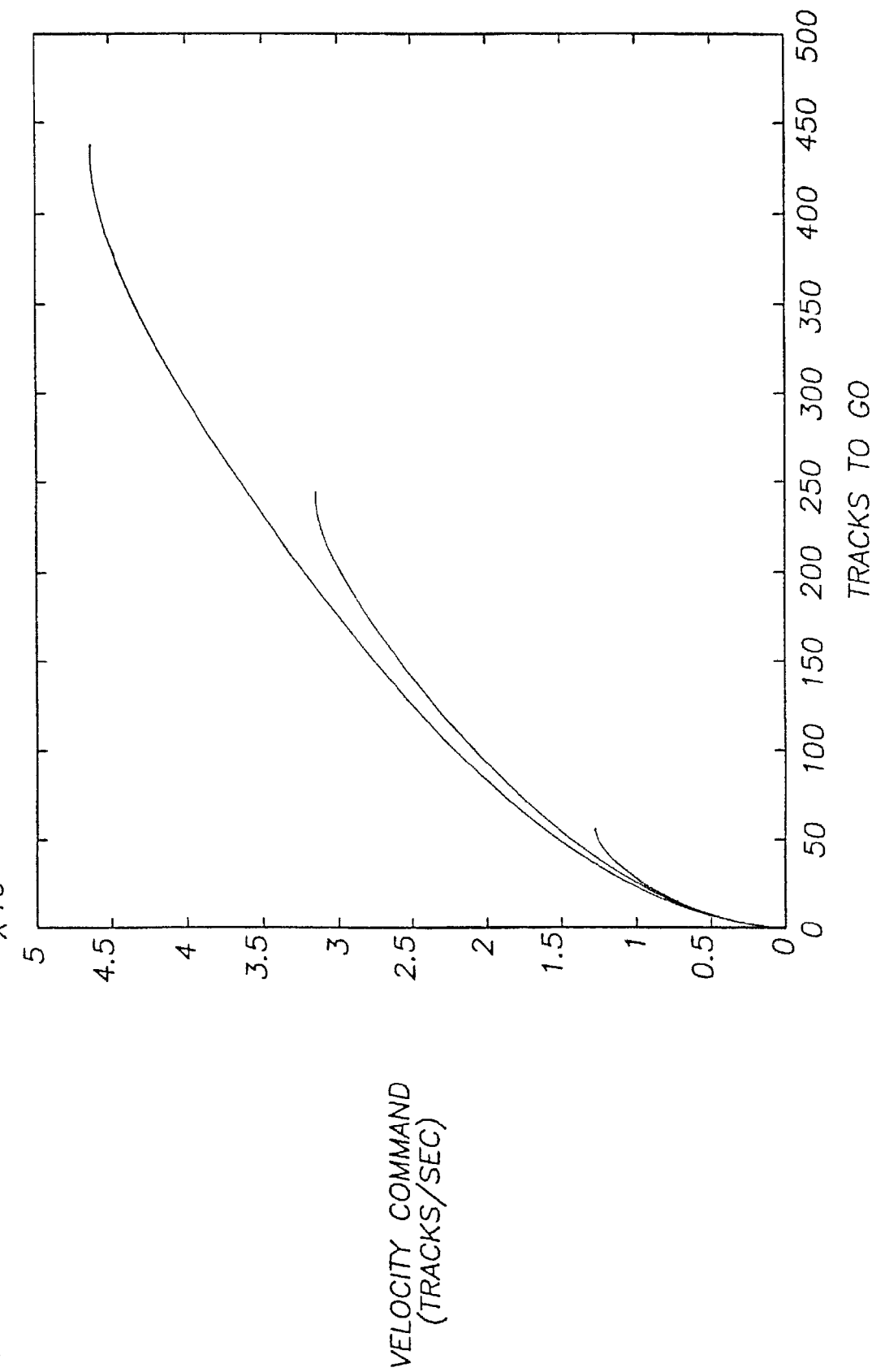
FIG. 21 shows examples of trajectories in a position-velocity table used in embodiments of the present invention.

Another way to approximate a three-dimensional PV table is to perform curve fitting on a series trajectories in a PV table, such as those shown in the PV table of FIG. 21. With regard to FIG. 21, it is noted that, in the realm of computer disk drives, an actual target velocity is typically not included in the PV table. Instead, a velocity command, comprising a target velocity plus an additional term relating to the actuator arm's effort to stay on track, is included in the PV table. With regard to curve fitting, since the curves shown in FIG. 21 are substantially regular, it is possible to parameterize the curves and to generate a function which can be used to generate a single PV trajectory to control the system.

Figure 22:
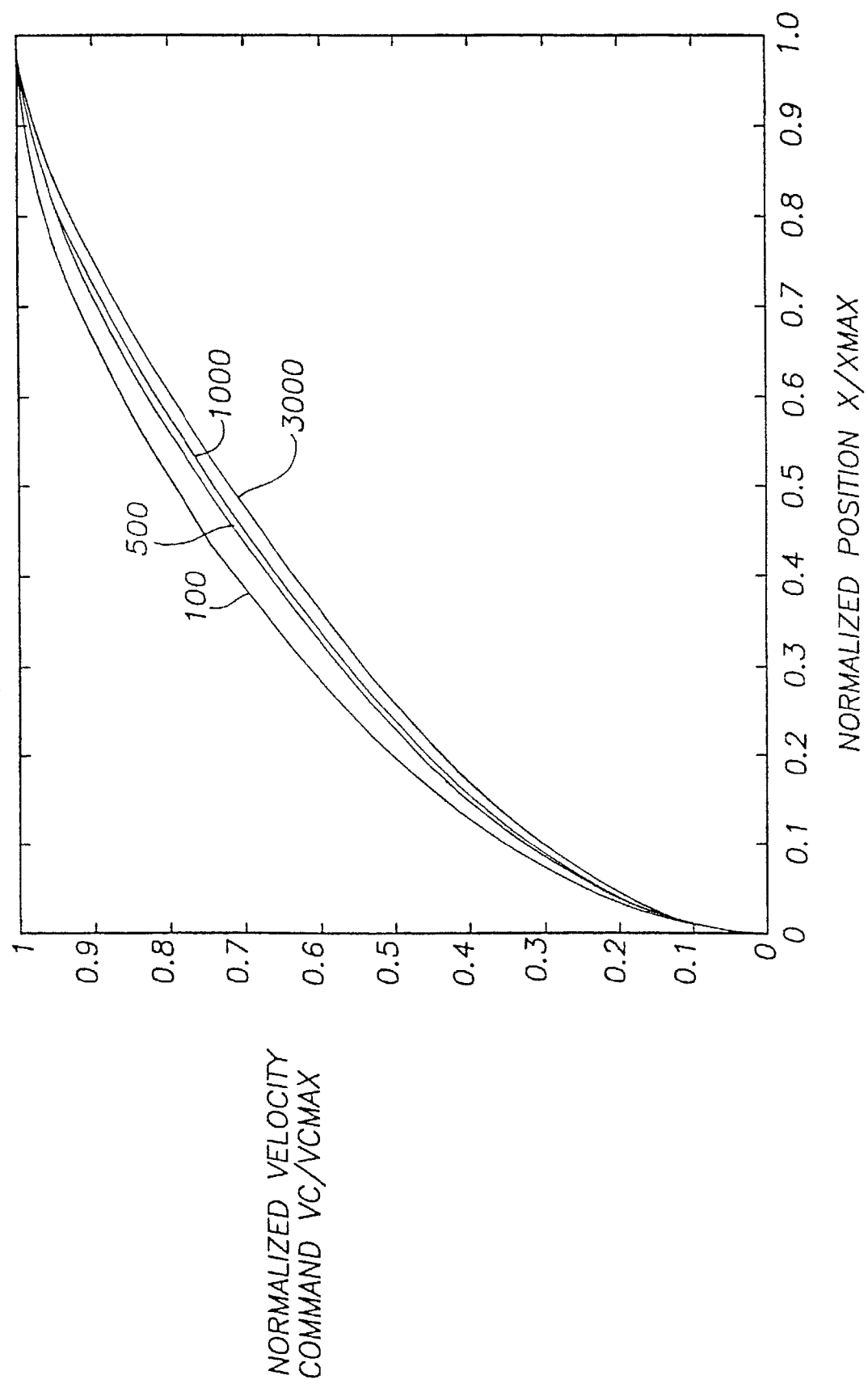
FIG. 22 depicts parameterization of trajectories in a position-velocity table in accordance with the present invention.

FIG. 22 shows examples of parameterized curves which were generated from the curves shown in FIG. 21. For the example shown in FIG. 22, an estimate of curves between the lowest (3000) and the highest (100) curve could be obtained by taking a weighted average of the lowest and highest curves based on movement distance. Consequently, in this example, an entire series of curves can be estimated by taking a weighted average of only two curves and using original movement distance to adjust the weights in the weighted average. Another way to approximate a three-dimensional PV table is to generate a custom PV table for each movement distance in real-time. This can be done using the system equations 19 for a computer disk drive set forth in section 4 above.

It is also possible to modify a series of trajectories in a PV table based on measurements of system parameter variations, such as variations in temperature, resistance, etc. This is done by estimating system parameters while motion is in progress, and determining whether the system parameters have varied from predetermined system parameters. Trajectories in the PV table are then modified based on any determined system parameter variations, whereafter the modified trajectories are stored in the PV table. Any method of estimating the system parameters may be used in connection with the present invention, including a conventional parameter estimator. For example, as a disk drive heats up, resistance therein changes. By looking at prior move responses, it is possible to estimate the resistance, to determine whether the resistance has changed, and to recalculate the drive's PV table, if necessary.

More specifically, in a disk drive system, during a first part of a move, the system is in saturation and, therefore, the PV table is inactive. This corresponds to issuing a step command in voltage to accelerate movement as rapidly as possible. During this acceleration phase, the actual current flowing through a voice coil motor used to convert electrical energy to mechanical energy can be measured. Knowing this, it is possible to perform an energy balance calculation to determine energy losses in the system due to resistance. The energy lost due to resistance equals the energy input to the disk drive minus kinetic energy of the voice coil motor minus energy stored in the voice coil inductor. This determination is made assuming that the inertia of the voice coil motor and the inductance of the voice coil are known or can be determined.

In real-time, the following steps are performed in order to estimate resistance: (i) for each time step, measure the actual current and the actual voltage applied to the drive's voice coil motor, (ii) integrate power in the drive (determined by multiplying voltage by current) over time to determine the total energy input to the system, (iii) calculate the instantaneous kinetic energy of the voice coil motor, (iv) calculate the instantaneous energy in the motor inductance, (v) calculate the integral of drive current squared over time, (vi) determine the estimated resistance by subtracting, from the energy input, the kinetic energy and the energy in the inductor divided by the integral of the current over time. Thus, after each integration, an estimated resistance for the disk drive is calculated. This can then be used to update the PV table.

Similar energy of momentum balance equations can be used to estimate other system parameters. For example, the following equation can be used to estimate motor torque:

$$K_i = \frac{J\Omega}{\int idt}. \tag{48}$$

This equation can be solved in real-time, and can be solved over a whole move or incrementally starting at any time during the move.

The foregoing techniques for generating PV tables can be calculated off-line, thereby making it possible to parameterize or curve-fit PV tables as a function of system parameters as well as movement distance. Consequently, it is then possible to retrieve a PV table based on movement distance and system parameters. Moreover, it is noted that an N-dimensional PV table can be used outside of the context of the vibration reduction methods described herein, and that a non-dimensional PV table can be used in connection with all aspects of the present invention. A non-dimensional PV table comprises a PV table in which the independent variable on the X-axis of the PV table has been scaled using a predetermined scaling factor. Such a factor may be, for example, a maximum number of tracks moved, or the like.

11.0 Shape on Transient ("SHOT")

Conventional implementations of the PV approach to controlling a disk drive encompass variations of the following steps: (i) ramping the current command to saturation (various techniques are used for this); (ii) commanding full, saturated current until some braking condition is satisfied, (iii) transitioning to full, saturated deceleration until the PV curve is crossed; (iv) following the PV curve until the drive is close to the final destination; and (v) turning on a terminal controller to bring the system on track. The preponderance of vibration, both mechanical and acoustic, is created by the sudden transitions at the beginning and middle of the PV move. Consequently, Input Shaping™ (or any other vibration-reducing technique) need be applied to only these portions of the trajectory.

A new sequence of operations, using SHOT, is as follows: (i) Input Shape™ the current command to saturation; (ii) command full, saturated current until some braking condition is satisfied; (iii) Input Shape™ the transition to full, saturated deceleration until the PV curve is crossed; (iv) follow the PV curve until the drive is close to its final destination; and (v) turn on a terminal controller to bring the system on track. Since the transitions to saturation are both just steps, the shaped transitions become shaped steps (or staircases).

Shaping can be rendered less effective if the input results in saturation and the command generator is unaware of the saturation. There are several methods for dealing with this situation. It is possible to command the system into saturation using estimates of when saturation should occur based on previous moves. For example, by estimating the maximum voltage and the coil resistance (or the quotient of maximum voltage/coil resistance) the maximum current in saturation can be obtained. Once the system is shaped into saturation, the saturation current can be calculated by measuring the acceleration and the velocity, since current is related to acceleration by a constant and the effective voltage is the saturation voltage minus the back EMF constant times the velocity.

Based on these calculations, it is possible to compute the actual saturation level. It is then important to command only enough of an input to keep the system in saturation and not exceed this level by too great of a value. If this value is exceeded by a considerable amount, the shaping that is applied when the command is reversed to slow the system down will be "chopped-off" at the beginning. For example, if an output command of 5 volts from a DAC will saturate the current amplifier in steady state at the current velocity, then a command of 6 volts would be undesirable. During the transition to deceleration, if this error is left uncorrected, the shaper will reduce the voltage to, e.g., 5.5 volts as the first part of the shaping process, yet the amplifier will remain saturated. Therefore, the effect of shaping is degraded.

While the SHOT technique is well suited for adding to the PV approach, it is by no means limited to PV. Any method of commanding a disk drive to move that causes significant transitions in the command to the system is a candidate for SHOT. The user need simply use shaped transitions instead of sudden or ramped transitions. The key to this approach is that while sudden transitions cause vibrations and noise, and smooth transitions often cause vibrations and noise (although less so than sudden transitions); shaped transitions can be constructed to yield any level of vibrations and noise. This makes the use of shaped transitions desirable because the effects are predictable and the move is lengthened by the minimum amount. SHOT can also be used for transitions caused by sudden gain changes as well as command changes. In this application, the gain is altered in a shaped manner from one level to another using any one of the shaping techniques described herein or from the literature.

12.0 CONCLUSION

At this point, it is reiterated that all aspects of the present invention can be implemented in hardware, software or a combination of thereof. Moreover, although the invention has been described in the context of computer disk drives, it may apply equally to other types of data storage devices (of which a computer disk drive is one), including, but not limited to, optical drives, tape drives, dual-actuated disk drives, and holographic storage devices which read from, and write to, data storage media other than magnetic disks.

The present invention has been described with respect to particular illustrative embodiments. It is to be understood that the invention is not limited to the above-described embodiments and modifications thereto, and that various changes and modifications may be made by those of ordinary skill in the art without departing from the spirit and scope of the appended claims.

APPENDIX A

Beginning of Pseudo Code
computer scale factor A, and time constants a, b from physical system parameters $A = Vmax * Kt/(Re*Rm+Kt*Kb)*1*k;$ $p1 = 1/Jm/Ie*(-Ie*Rm-Re*Jm+\operatorname{sqrt}(Ie^2Rm^2-2*Re*Rm*Ie*Jm+Re^2*Jm^2-4*Kt*Kb*Ie*Jm))/2;$ $p2 = 1/Jm/Ie*(-Ie*Rm-Re*Jm-\operatorname{sqrt}(Ie^2*Rm^2-2*Re*Rm*Ie*Jm+Re^2*Jm^2-4*Kt*Kb*Ie*Jm))/2;$ $a = \max(-p1, -p2)$ $b = \min(-p1, -p2)$ % make initial guesses for step durations $et1 - 1;$ $et2 = 0.005;$ $et3 = 1;$ % set maximum iteration count Nmax=1000;

for j=1:Nmax

% save old values of step time intervals et3old=et3;

et2old=et2;

et1old=et1;

% iterate for switch times using fixed voltage level Vmax $et3 = -\log(1.0/2.0 - \exp(-et1*a)/2 + \exp(-et2*a))/a;$ $et2 = 1/b*\log(2.0) + 3*et3 - 1/b*\log(2*\exp(1/A*b*X)*\exp(et3*b) - \operatorname{sqrt}(4.0)*\operatorname{sqrt}(\exp(1A*b*X)*\exp(et3*b)\operatorname{sqrt}(\exp(1A*b*X) + \exp(et3*b)^2 - 2*\exp(et3*b)));$ $et1 = -(-2*A*et2 + 2A*et3 - X)/A;$ if norm([et3old−et3et2old−et2et1old−et1], inf)<eps * 2 break end if j==Nmax error(['error–failure to converge after', num2str(Nmax)'iterations '])

end
end

% round up pulse duration to nearest sample interval,
% convert to intervals between steps to make sure that voltage
% requirements will not increase (beyond Vmax).

$dt1 = \operatorname{ceil}((et1 - et2)/dt)*dt;$ $dt2 = \operatorname{ceil}((et2 - et3)/dt)*dt;$ $dt3 = \operatorname{ceil}((et3)/dt)*dt;$ $et123 = [et1, et2, et3]$ % convert back to total step duration.

$et1 = dt1 + dt2 + dt3;$ $et2 = dt2 + dt3;$ $et3 = dt3;$

% In the following, the following, the original constraints equations involving XF1, XF2,
% and XF3 have been midified to include a variable voltage level applied at
% each step (instead of the fixed maximum (+/−) Vmax.
% The original equations for XF1, XF2, and XF3 follow:

% $XF_1(t_{end}) = V_0F_1(t_{tend}-t_0) - 2V_0F_1(t_{end}-t_1) + 2V_0F_1(t_{end}-t_2)$ % $XF_2(t_{end}) = V_0F_2(t_{tend}-t_0) - 2V_0F_2(t_{end}-t_1) + 2V_0F_1(t_{end}-t_2)$ % $XF_3(t_{end}) = V_0F_3(t_{tend}-t_0) - 2V_0F_2(t_{end}-t_1) + 2V_0F_1(t_{end}-t_2)$ % And the modified equation including adjustable relative levesl of voltage
L1, L2 and L3 are:

% $XF_1(t_{end}) = L_1V_0F_1(t_{tend}-t_0) 31 L_2V_0F_1(t_{end}-t_1) + L_3V_0F_1(t_{end}-t_2)$ % $XF_2(t_{end}) = L_1V_0F_2(t_{tend}-t_0) - L_2V_0F_2(t_{end}-t_1) + L_3V_0F_1(t_{end}-t_2)$ % $XF_3(t_{end}) = L_1V_0F_3(t_{tend}-t_0) - L_2V_0F_2(t_{end}-t_1) + L_3V_0F_1(t_{end}-t_2)$ % And the corresponding constraint equation are:

% $XF_1(t_{end}) = \text{Finalpos}$

% $XF_2(t_{end}) = 0$

% $XF_3(t_{end}) = 0$

% Where all of the times indicated have discrete values, e.g. corresponding to
% the controll update rate.
% It should be noted that after digital switch times are fixed, the constraint
% equations derived from the equations above form a linear set of equations in
% the unknown relative voltage levels L1, L2 and L3 and any standard linear
% method can be used to solve for the relative voltage levels. In the equations
% for (L1, L2 and L3) that follow, the solution was obtained by algebraic
% means (and are not particularly compact.)
% compute new relative voltage step levels
L1, L2 and L3 are nominally assigned to "1", "−2" and "+2", respectively $s1 = X*(\exp(-et3*b)*\exp(-et2*a) + \exp(-et3*a) + \exp(-et2*b) - \exp(-et2*b)*\exp(-et3*a) - \exp(-et2*a) - \exp(-et3*b));$ $s2=1/(et2*\exp(et1*b)*\exp(-et3*a)+\exp(-et2*b)*et3*$
   $\exp(-et1*a)-et2*\exp(-et3*a)-et2*\exp(-et1*b)-$
   $et3* \exp(-et1*a)-\exp(-et2*b)*et3+\exp(-et3*b)*$
   $et1*\exp(-et2*a)+\exp(-et3*a)*et1+\exp(-et2*b)*$
   $et1-\exp(-et2*b)*et1* \exp(-et3*a)-et3*$
   $\exp(-et1*b)*\exp(-et2*a)-\exp(-et2*a)*$
   $et1-\exp(-et3*b)*et1-\exp(-et3*b)*et2*$
   $\exp(-et1*a)+et3* \exp(-et1*b)+et2*$
   $\exp(-et1*a)+\exp(-i\ et3*b)*et2+et3*$
   $\exp(-et2*a))/A;$ $L1=s1*s2;$ $s1=1/(et2*\exp(-et1*b)*\exp(-et3*a)+\exp(-et2*b)*$
   $et3* \exp(-et1*a)-et2*\exp(-et3*a)-et2*$
   $\exp(-et1*b)-et3* \exp(-et1*a)-\exp(-et2*b)*$
   $et3+\exp(-et3*b)*et1* \exp(-et2*a)+\exp(-et3*a)*$
   $et1+\exp(-et2*b)*et1-\exp(-et2*b)*et1*$
   $\exp(-et3*a)-et3\exp(-et1*b)* \exp(-et2*a)-$
   $\exp(-et2*a)*et1-\exp(-et3*b)*et1-\exp(-et3*b)*$
   $et2*\exp(-et1*a)+et3*\exp(-et1b)+et2*$
   $\exp(-et1*a)+\exp(-et3*b)*et2+et3*$
   $\exp(-et2*a))*X;$ $s2=(\exp(-et2*b)*\exp(-et1*a)-\exp(-et1*a)-$
   $\exp(-et2*b)-\exp(-et1*b)*\exp(-et2*a)+$
   $\exp(-et1*b)+\exp(-et2*a))/A;$ $L3=s1*s2;$ $s1=\exp(-et1*a)-\exp(-et3*a)+\exp(-et3*b)-$
   $\exp(-et1*b)-\exp(-et3*b)*\exp(-et1*a)+$
   $\exp(-et1*b)*\exp(-et3*a);$ $s2=X/(et2*\exp(-et1*b)*\exp(-et3*a)+\exp(-et2*b)*$
   $et3* \exp(-et1*a)-et2*\exp(-et3*a)-et2*$
   $\exp(-et1*b)-et3* \exp(-et1*a)-\exp(-et2*b)*$
   $et3+\exp(-et3*b)*et1*\exp(-et2*a)+\exp(-et3*a)*$
   $et1+\exp(-et2*b)*et1-\exp(-et2*b)*et1*$
   $\exp(-et3*a)-et3*\exp(-et1*b)*\exp(-et2*a)-$
   $\exp(-et2*a)*et1-\exp(-et3*b)*et1-\exp(-et3*b)*$
   $et2*\exp(-et1*a)+et3* \exp(-et1*b)+et2*$
   $\exp(-et1*a)+\exp(-et3*b)et2+et3*$
   $\exp(-et2*a))/A;$ $L2=s1*s2;$ % convert accumulated voltage steps to sequential voltage level $V1=V\max*(L1);$ $V2=V\max*(L1+L2);$ $V3=V\max*(L1+L2+L3);$

% END OF PSEUDO CODE

APPENDIX B

AREA ... SUM$(I,A(I))=E=0;$

VELOCITY(VINDX) ... VEL(VINDX)=
   $E$=VSCALE*SUM$(I\$(ORD(I)$LE ORD
   (VINDX)), $A(I));$

POSITION ... SUM$(I,$VEL$(I))=$
   $E$=FINALPOS*SCALEFACT;

VLIMITP$(I)$ ... SUM(VINDX\$(ORD(VINDX)LE
   ORD$(I)),A(I-($ORD(VINDX)$+1))*($VOLTS
   (VINDX)+KBACK*VSCALE)) $=L=$VOLTLIM;

VLIMITN$(I)$ ... SUM(VINDX\$(ORD(VINDX)LE
   ORD$(I)), A(I-($ORD(VINDX)$+1))*($VOLTS
   (VINDX)+KBACK*VSCALE))=$G=-$VOLTLIM

% A(I) are the current commands at time T(I) spaced equally at time DT.

% VOLTS(VINDX) is a table of voltages representing the unit pulse response to

% a unit output in current command. VOLTLIM is the voltage limit at saturation.

APPENDIX C

GOALPOS ... SUM$(I,A(I)*$MODELAA*DT$)=$
   $E=$FINALPOS;

MODE1(ILAST) ... SUM$(I,-A(I)*$
   MODELAA*MODELb/(MODELb$-$MODELa)*
   (EXP(-MODELa*$(T($ILAST$)+$DT$-T(I)))-$
   EXP(-MODELa*$(T($ILAST$)-T(I)))))=E=0.0;$

MODE2(ILAST) ... SUM$(I,A(I)*$
   MODELAA*MODELa/(MODELb$-$MODELa)*
   (EXP(-MODELb*$(T($ILAST$)+$DT$-T(I)))-$
   EXP(-MODELb*$(T($ILAST$)-T(I)))))=E=0.0;$

DERIV1$(J)$ ... 1000.0*SUM$(I,A(I)*T(I)*$EXP(ZETA
   $(J)*W(J)*T(I))*$ SIN(WD$(J)*T(I)))=E=0.0;$

DERIV2$(J)$ ... 1000.0*SUM$(I,A(I)*T(I)*$EXP(ZETA
   $(J)*W(J)*T(I))*$ COS(WD$(J)*T(I)))=E=0.0;$

% MODELAA is the mechanical gain of the system, MODELb, and MODELa

% are the two time constants of the system in radians. One time constant is

% associated with the L/R rise time of the motor inductance and the other is

% the mechanical time constant of the rigid system. The A(I) are the voltages

% which need to be determined. The T(I) are the times for each of the A(I).

% DT is the time spacing of the outputs. W(J) are the undamped flexible

% modes, WD(J) are the damped flexible modes (in radians/s).

What is claimed is

1. A method of operating a disc drive for improved acoustic management, comprising steps of:
   (a) receiving an acoustic/performance comprising factor from a host;
   (b) tuning performance of a disc drive according to the compromising factor, the step of tuning including applying the compromising factor to at least one control parameter for the disc drive to generate at least one modified control parameter; and
   (c) executing a control loop for controlling an operation of the disc drive, the control loop using the at least one modified control parameter.

2. A method of operating an apparatus comprising steps of:
   (a) receiving an acoustic adjusting factor, the apparatus being adapted to receive the acoustic adjusting factor externally;
   (b) modifying at least one control parameter for only an actuator of the apparatus responsive to the acoustic adjusting factor; and
   (c) controlling the actuator using the at least one modified control parameter.

* * * * *